United States Patent
Kara et al.

(10) Patent No.: US 9,734,217 B2
(45) Date of Patent: Aug. 15, 2017

(54) METHODS AND SYSTEMS FOR ANALYZING ENTITY PERFORMANCE

(71) Applicant: PALANTIR TECHNOLOGIES INC., Palo Alto, CA (US)

(72) Inventors: Feridun Arda Kara, New York, NY (US); Eli Bingham, New York, NY (US); John Garrod, Palo Alto, CA (US); Daniel Erenrich, Mountain View, CA (US); Anirvan Mukherjee, Mountain View, CA (US); Ted Mabrey, New York, NY (US); Andrew Ash, Menlo Park, CA (US); Zachary Bush, Palo Alto, CA (US); Allen Cai, Menlo Park, CA (US); Winnie Chai, Los Altos, CA (US); Greg Cohan, Newton, MA (US); Chris Dorsey, San Francisco, CA (US); William Dwyer, Palo Alto, CA (US); Gilad Gray, Redwood City, CA (US); Sean Kelley, San Francisco, CA (US); Dennis Kwon, Fort Lee, NJ (US); Chris Lewis, East Palo Alto, CA (US); Greg Martin, Royal Oak, MI (US); Parvathy Menon, San Francisco, CA (US); Brian Ngo, San Francisco, CA (US); Asli Ozyar, Palo Alto, CA (US); Mike Reilly, New York, NY (US); Jacob Scott, Berkeley, CA (US); Ankit Shankar, Millbrae, CA (US); Matt Sills, San Francisco, CA (US); Spencer Stamats, Palo Alto, CA (US); Geoff Stowe, San Francisco, CA (US); Samir Talwar, London (GB); Engin Ural, Brooklyn, NY (US); P J Valez, Palo Alto, CA (US); Holt Wilkins, New York, NY (US); Diane Wu, Palo Alto, CA (US); Drausin Wulsin, New York, NY (US); Di Wu, Palo Alto, CA (US); Joyce Yu-Hsin Chen, Palo Alto, CA (US); Bar Kaya, Istanbul (TR)

(73) Assignee: PALANTIR TECHNOLOGIES INC., Palo Alto, CA (US)

(*) Notice: Subject to any disclaimer, the term of this patent is extended or adjusted under 35 U.S.C. 154(b) by 0 days.

(21) Appl. No.: 14/306,138

(22) Filed: Jun. 16, 2014

(65) Prior Publication Data

US 2015/0169726 A1   Jun. 18, 2015

Related U.S. Application Data

(60) Provisional application No. 61/916,795, filed on Dec. 16, 2013, provisional application No. 61/916,796, (Continued)

(51) Int. Cl.
*G06F 17/30* (2006.01)
*G06Q 10/06* (2012.01)

(52) U.S. Cl.
CPC .. *G06F 17/30554* (2013.01); *G06F 17/30572* (2013.01); *G06F 17/30598* (2013.01); *G06Q 10/0639* (2013.01)

(58) Field of Classification Search
CPC ........... G06F 17/30867; G06F 17/3087; G06F 17/3071; G06F 17/30864; G06F 17/30598; G06F 17/30705; G06F 17/30265

(Continued)

(56) References Cited

U.S. PATENT DOCUMENTS

| 5,109,399 A | 4/1992 | Thompson |
|---|---|---|
| 5,329,108 A | 7/1994 | Lamoure |

(Continued)

FOREIGN PATENT DOCUMENTS

| AU | 2014250678 | 2/2016 |
|---|---|---|
| CN | 102546446 | 7/2012 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Cam-Y Truong
(74) *Attorney, Agent, or Firm* — Finnegan, Henderson, Farabow, Garrett & Dunner, LLP

(57) ABSTRACT

Systems and methods are provided for analyzing entity performance. In one implementation, a method is provided that includes receiving a request with one or more filter selections and accessing a data structure comprising a plurality of categories of information showing interactions associated with multiple entities. The method also comprises identifying a set of categories of the plurality of categories within the data structure based on the one or more filter selections. The method further comprises processing the information of the identified categories to analyze a performance of one or more entities of the multiple entities in accordance with the one or more filter selections and providing the processed information to display the performance of the one or more entities on a user interface.

17 Claims, 27 Drawing Sheets

Related U.S. Application Data filed on Dec. 16, 2013, provisional application No. 61/916,797, filed on Dec. 16, 2013.

(58) Field of Classification Search
USPC .......................................................... 707/736
See application file for complete search history.

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |

(56) References Cited

U.S. PATENT DOCUMENTS

| | | |
|---|---|---|
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 * | 7/2014 | Papakipos et al. ........ 455/456.3 |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,100,428 B1 | 8/2015 | Visbal |
| 9,116,975 B2 | 8/2015 | Shankar et al. |
| 9,129,219 B1 | 9/2015 | Robertson et al. |
| 9,146,954 B1 | 9/2015 | Boe et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0036848 A1 * | 2/2003 | Sheha ................ G01C 21/3679 701/468 |
| 2003/0039948 A1 | 2/2003 | Donahue |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 * | 2/2005 | Sadri ................ G06F 17/30994 |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0184889 A1 | 8/2006 | Molander |
| 2006/0203337 A1 | 9/2006 | White |
| 2006/0209085 A1 | 9/2006 | Wong et al. |
| 2006/0218637 A1 | 9/2006 | Thomas et al. |
| 2006/0241974 A1 | 10/2006 | Chao et al. |
| 2006/0242040 A1 * | 10/2006 | Rader ........................ 705/35 |
| 2006/0242630 A1 | 10/2006 | Koike et al. |

(56) References Cited

U.S. PATENT DOCUMENTS

| | | |
|---|---|---|
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1* | 6/2007 | Zivin ............................. 705/26 |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0243711 A1 | 10/2008 | Aymeloglu et al. |
| 2008/0249983 A1* | 10/2008 | Meisels ............. G06F 17/30241 |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1* | 2/2009 | Shah et al. .................... 705/14 |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1* | 9/2010 | Uomini ........................ 709/203 |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0185316 A1 | 7/2011 | Reid et al. |
| 2011/0208565 A1 | 8/2011 | Ross et al. |
| 2011/0208724 A1 | 8/2011 | Jones et al. |

(56) References Cited

U.S. PATENT DOCUMENTS

| | | |
|---|---|---|
| 2011/0213655 A1 | 9/2011 | Henkin |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0110746 A1 | 5/2013 | Ahn |
| 2013/0110822 A1* | 5/2013 | Ikeda et al. .................. 707/722 |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1* | 6/2013 | Parundekar et al. ......... 701/521 |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0208565 A1 | 10/2013 | Castellanos et al. |
| 2013/0262527 A1 | 10/2013 | Hunter et al. |
| 2013/0263019 A1 | 10/2013 | Castellanos et al. |
| 2013/0267207 A1* | 10/2013 | Hao et al. .................. 455/414.1 |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1* | 4/2014 | Tang et al. .................. 705/14.1 |
| 2014/0095509 A1 | 4/2014 | Patton |
| 2014/0108068 A1* | 4/2014 | Williams .......................... 705/5 |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1* | 6/2014 | Grigg et al. .................... 705/44 |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |

(56) References Cited

U.S. PATENT DOCUMENTS

| | | | |
|---|---|---|---|
| 2014/0222793 A1 | 8/2014 | Sadkin et al. | |
| 2014/0229554 A1 | 8/2014 | Grunin et al. | |
| 2014/0244388 A1 | 8/2014 | Manouchehri et al. | |
| 2014/0258246 A1 | 9/2014 | Lo Faro et al. | |
| 2014/0267294 A1 | 9/2014 | Ma | |
| 2014/0267295 A1 | 9/2014 | Sharma | |
| 2014/0279824 A1 | 9/2014 | Tamayo | |
| 2014/0310266 A1* | 10/2014 | Greenfield | G06F 17/3053 707/723 |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2014/0344230 A1 | 11/2014 | Krause et al. | |
| 2014/0351070 A1 | 11/2014 | Christner et al. | |
| 2014/0358829 A1 | 12/2014 | Hurwitz | |
| 2014/0366132 A1 | 12/2014 | Stiansen et al. | |
| 2015/0019394 A1 | 1/2015 | Unser et al. | |
| 2015/0046870 A1 | 2/2015 | Goldenberg et al. | |
| 2015/0073929 A1 | 3/2015 | Psota et al. | |
| 2015/0073954 A1 | 3/2015 | Braff | |
| 2015/0089424 A1 | 3/2015 | Duffield et al. | |
| 2015/0095773 A1 | 4/2015 | Gonsalves et al. | |
| 2015/0100897 A1 | 4/2015 | Sun et al. | |
| 2015/0100907 A1 | 4/2015 | Erenrich et al. | |
| 2015/0106379 A1 | 4/2015 | Elliot et al. | |
| 2015/0134666 A1 | 5/2015 | Gattiker et al. | |
| 2015/0135256 A1 | 5/2015 | Hoy et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0188872 A1 | 7/2015 | White | |
| 2015/0309719 A1 | 10/2015 | Ma et al. | |
| 2015/0317342 A1 | 11/2015 | Grossman et al. | |
| 2015/0324868 A1 | 11/2015 | Kaftan et al. | |
| 2015/0338233 A1 | 11/2015 | Cervelli et al. | |
| 2015/0347903 A1 | 12/2015 | Saxena et al. | |
| 2015/0378996 A1 | 12/2015 | Kesin et al. | |
| 2015/0379413 A1 | 12/2015 | Robertson et al. | |
| 2016/0004667 A1 | 1/2016 | Chakerian et al. | |
| 2016/0004764 A1 | 1/2016 | Chakerian et al. | |
| 2016/0026923 A1 | 1/2016 | Erenrich et al. | |
| 2016/0034545 A1 | 2/2016 | Shankar et al. | |
| 2016/0055501 A1 | 2/2016 | Mukherjee et al. | |
| 2016/0098173 A1 | 4/2016 | Slawinski et al. | |

FOREIGN PATENT DOCUMENTS

| | | |
|---|---|---|
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2487610 | 8/2012 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2940603 | 11/2015 |
| EP | 2940609 | 11/2015 |
| EP | 2963595 | 1/2016 |
| EP | 2988258 | 2/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 02/065353 | 8/2002 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Conner, Nancy, "Google Apps: The Missing Manual," May 1, 2008, pp. 15.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Hansen et al. "Analyzing Social Media Networks with NodeXL: Insights from a Connected World", Chapter 4, pp. 53-67 and Chapter 10, pp. 143-164, published Sep. 2010.

Hibbert et al., "Prediction of Shopping Behavior Using a Huff Model Within a GIS Framework," Healthy Eating in Context, Mar. 18, 2011, pp. 16.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

(56) References Cited

OTHER PUBLICATIONS

Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Palmas et al., "An Edge-Bunding Layout for Interactive Parallel Coordinates" 2014 IEEE Pacific Visualization Symposium, pp. 57-64.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Vose et al., "Help File for ModelRisk Version 5," 2007, Vose Software, pp. 349-353. [Uploaded in 2 Parts].
Yang et al., "HTML Page Analysis Based on Visual Cues," 2001, pp. 859-864.
Issue Notification for U.S. Appl. No. 13/917,571 dated Aug. 5, 2014.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Application No. 628495 dated Aug. 19, 2014.
Official Communication for Great Britain Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.

(56) References Cited

OTHER PUBLICATIONS

Official Communication for U.S. Appl. No. 14/225,160 dated Oct. 22, 2014.
Hardesty, "Privacy Challenges—Analysis: It's surprisingly easy to identify individuals from credit-card metadata", *MIT News*, Jan. 29, 2015 (3 pages).
Official Communication for U.S. Appl. No. 14/319,765 dated Feb. 4, 2015.
"A Word About Banks and the Laundering of Drug Money," Aug. 18, 2012, http://www.golemxiv.co.uk/2012/08/a-word-about-banks-and-the-laundering-of-drug-money/.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Li et al., "Interactive Multimodal Visual Search on Mobile Device," IEEE Transactions on Multimedia, vol. 15, No. 3, Apr. 1, 2013, pp. 594-607.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Official Communication for Australian Patent Application No. 2014213553 dated May 7, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014250678 dated Jun. 17, 2015.
Official Communication for European Patent Application No. 14189802.3 dated May 11, 2015.
Official Communication for European Patent Application No. 14191540.5 dated May 27, 2015.
Official Communication for European Patent Application No. 14180432.8 dated Jun. 23, 2015.
Official Communication for European Patent Application No. 14187739.9 dated Jul. 6, 2015.
Official Communication for Netherlands Patent Application No. 2013306 dated Apr. 24, 2015.
Notice of Allowance for U.S. Appl. No. 14/504,103 dated May 18, 2015.
Notice of Allowance for U.S. Appl. No. 14/473,552 dated Jul. 24, 2015.
Official Communication for U.S. Appl. No. 14/289,596 dated Apr. 30, 2015.
Official Communication for U.S. Appl. No. 14/196,814 dated May 5, 2015.
Official Communication for U.S. Appl. No. 14/306,154 dated May 15, 2015.
Official Communication for U.S. Appl. No. 14/639,606 dated May 18, 2015.
Official Communication for U.S. Appl. No. 14/225,160 dated May 20, 2015.
Official Communication for U.S. Appl. No. 14/579,752 dated May 26, 2015.
Official Communication for U.S. Appl. No. 14/289,599 dated May 29, 2015.
Official Communication for U.S. Appl. No. 14/319,765 dated Jun. 16, 2015.
Official Communication for U.S. Appl. No. 13/835,688 dated Jun. 17, 2015.
Official Communication for U.S. Appl. No. 14/323,935 dated Jun. 22, 2015.
Official Communication for U.S. Appl. No. 12/556,318 dated Jul. 2, 2015.
Official Communication for U.S. Appl. No. 14/306,154 dated Jul. 6, 2015.
Official Communication for U.S. Appl. No. 14/639,606 dated Jul. 24, 2015.
Official Communication for U.S. Appl. No. 14/326,738 dated Jul. 31, 2015.
Official Communication for U.S. Appl. No. 13/839,026 dated Aug. 4, 2015.
Official Communication for U.S. Appl. No. 14/306,147 dated Aug. 7, 2015.
Official Communication for U.S. Appl. No. 14/225,160 dated Aug. 12, 2015.
Official Communication for U.S. Appl. No. 14/579,752 dated Aug. 19, 2015.
Alur et al., "Chapter 2: IBM InfoSphere DataStage Stages," IBM InfoSphere DataStage Data Flow and Job Design, Jul. 1, 2008, pp. 35-137.
Nolan et al., "MCARTA: A Malicious Code Automated Run-Time Analysis Framework," Homeland Security, 2012 IEEE Conference on Technologies for, Nov. 13, 2012, pp. 13-17.
Perdisci et al., "Behavioral Clustering of HTTP-Based Malware and Signature Generation Using Malicious Network Traces," USENIX, Mar. 18, 2010, pp. 1-14.
Quest, "Toad for Oracle 11.6—Guide to Using Toad," Sep. 24, 2012, pp. 1-162.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Symantec Corporation, "E-Security Begins with Sound Security Policies," Announcement Symantec, Jun. 14, 2001.
Notice of Acceptance for Australian Patent Application No. 2014250678 dated Oct. 7, 2015.
Official Communication for European Patent Application No. 15155845.9 dated Oct. 6, 2015.
Official Communication for European Patent Application No. 15175106.2 dated Nov. 5, 2015.
Official Communication for European Patent Application No. 15183721.8 dated Nov. 23, 2015.
Official Communication for European Patent Application No. 15175151.8 dated Nov. 25, 2015.
Official Communication for Netherlands Patent Application No. 2012437 dated Sep. 18, 2015.
APPACTS, "Smart Thinking for Super Apps," <http://www.appacts.com> Printed Jul. 18, 2013 in 4 pages.
APSALAR, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Chaudhuri et al., "An Overview of Business Intelligence Technology," Communications of the ACM, Aug. 2011, vol. 54, No. 8.
Cohn et al., "Semi-supervised Clustering with User Feedback," Constrained Clustering: Advances in Algorithms, Theory, and Applications 4.1, 2003, pp. 17-32.
Countly Mobile Analytics, <http://count.ly/> Printed Jul. 18, 2013 in 9 pages.
DISTIMO—App Analytics, <http://www.distimo.com/app-analytics> Printed Jul. 18, 2013 in 5 pages.
Flurry Analytics, <http://www.flurry.com/> Printed Jul. 18, 2013 in 14 pages.

(56) References Cited

OTHER PUBLICATIONS

Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Notice of Allowance for U.S. Appl. No. 14/479,863 dated Mar. 31, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/552,336 dated Nov. 3, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/571,098 dated Mar. 11, 2015.
Official Communication for U.S. Appl. No. 14/463,615 dated May 21, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 14/552,336 dated Jul. 20, 2015.
Official Communication for U.S. Appl. No. 14/676,621 dated Jul. 30, 2015.
Official Communication for U.S. Appl. No. 14/571,098 dated Aug. 5, 2015.
Official Communication for U.S. Appl. No. 14/571,098 dated Aug. 24, 2015.
Official Communication for U.S. Appl. No. 14/225,006 dated Sep. 2, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/319,765 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/746,671 dated Sep. 28, 2015.
Official Communication for U.S. Appl. No. 14/141,252 dated Oct. 8, 2015.
Official Communication for U.S. Appl. No. 13/827,491 dated Oct. 9, 2015.
Official Communication for U.S. Appl. No. 14/483,527 dated Oct. 28, 2015.
Official Communication for U.S. Appl. No. 14/676,621 dated Oct. 29, 2015.
Official Communication for U.S. Appl. No. 14/571,098 dated Nov. 10, 2015.
Official Communication for U.S. Appl. No. 14/562,524 dated Nov. 10, 2015.
Official Communication for U.S. Appl. No. 14/746,671 dated Nov. 12, 2015.
Official Communication for U.S. Appl. No. 14/842,734 dated Nov. 19, 2015.
Official Communication for U.S. Appl. No. 14/463,615 dated Dec. 9, 2015.
Official Communication for U.S. Appl. No. 14/800,447 dated Dec. 10, 2015.
Official Communication for U.S. Appl. No. 14/225,006 dated Dec. 21, 2015.
Official Communication for U.S. Appl. No. 14/874,690 dated Dec. 21, 2015.
Official Communication for U.S. Appl. No. 14/306,147 dated Dec. 24, 2015.
Official Communication for U.S. Appl. No. 14/225,084 dated Jan. 4, 2016.
Official Communication for European Patent Application No. 14197938.5 dated Apr. 28, 2015.
Official Communication for European Patent Application No. 14200298.9 dated May 13, 2015.
Official Communication for European Patent Application No. 14200246.8 dated May 29, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated May 21, 2015.

(56) References Cited

OTHER PUBLICATIONS

Official Communication for Great Britain Patent Application No. 1404489.5 dated May 21, 2015.
Official Communication for Great Britain Patent Application No. 1404499.4 dated Jun. 11, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for New Zealand Patent Application No. 622473 dated Mar. 27, 2014.
Official Communication for New Zealand Patent Application No. 622473 dated Jun. 19, 2014.
"Money Laundering Risks and E-Gaming: A European Overview and Assessment," 2009, http://www.cf.ac.uk/socsi/resources/Levi_Final_Money_Laundering_Risks_egaming.pdf.
"Using Whois Based Geolocation and Google Maps API for Support Cybercrime Investigations," http://wseas.us/e-library/conferences/2013/Dubrovnik/TELECIR/TELECIRC-32.pdf.
Notice of Allowance for U.S. Appl. No. 12/556,318 dated Nov. 2, 2015.
Notice of Allowance for U.S. Appl. No. 14/326,738 dated Nov. 18, 2015.
Official Communication for U.S. Appl. No. 13/247,987 dated Sep. 22, 2015.
Official Communication for U.S. Appl. No. 14/813,749 dated Sep. 28, 2015.
Official Communication for U.S. Appl. No. 14/134,558 dated Oct. 7, 2015.
Official Communication for U.S. Appl. No. 14/639,606 dated Oct. 16, 2015.
Official Communication for U.S. Appl. No. 14/306,154 dated Nov. 16, 2015.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Jelen, Bill, "Excell 2013 in Depth, Video Enhanced Edition," Jan. 25, 2013.
Palantir Technolgies, "Palantir Labs—Timeline," Oct. 1, 2010, retrieved from the internet https://www.youtube.com/watch?v=JCgDW5bru9M retrieved on Aug. 19, 2015.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Notice of Allowance for U.S. Appl. No. 14/746,671 dated Jan. 21, 2016.
Notice of Allowance for U.S. Appl. No. 13/247,987 dated Mar. 17, 2016.
Notice of Allowance for U.S. Appl. No. 14/948,009 dated May 6, 2016.
Official Communication for U.S. Appl. No. 14/645,304 dated Jan. 25, 2016.
Official Communincation for U.S. Appl. No. 14/948,009 dated Feb. 25, 2016.
Official Communication for U.S. Appl. No. 14/562,524 dated Feb. 18, 2016.
Official Communication for U.S. Appl. No. 14/306,147 dated Mar. 4, 2016.
Official Communication for U.S. Appl. No. 14/306,154 dated Feb. 1, 2016.
Official Communication for U.S. Appl. No. 14/319,765 dated Feb. 1, 2016.
Official Communication for U.S. Appl. No. 14/306,154 dated Mar. 17, 2016.
Official Communication for U.S. Appl. No. 14/463,615 dated Mar. 21, 2016.
Official Communication for U.S. Appl. No. 14/800,447 dated Mar. 3, 2016.
Official Communication for European Patent Application No. 15165244.3 dated Aug. 27, 2015.
Official Communication for European Patent Application No. 15166137.8 dated Sep. 14, 2015.
Boyce, Jim, "Microsoft Outlook 2010 Inside Out," Aug. 1, 2010, retrieved from the internet https://capdtron.files.wordpress.com/2013/01/outlook-2010-inside_out.pdf.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Definition "Identify" downloaded Jan. 22, 2015, 1 page.
Definition "Overlay" downloaded Jan. 22, 2015, 1 page.
Hogue et al., "Thresher: Automating the Unwrapping of Semantic Content from the World Wide Web," 14$^{th}$ International Conference on World Wide Web, WWW 2005: Chiba, Japan, May 10-14, 2005, pp. 86-95.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for Australian Patent Application No. 2014201511 dated Feb. 27, 2015.
Official Communication for Australian Patent Application No. 2014202442 dated Mar. 19, 2015.
Official Communication for European Patent Application No. 14180281.9 dated Jan. 26, 2015.
Official Communication for European Patent Application No. 14180142.3 dated Feb. 6, 2015.
Official Communication for European Patent Application No. 14187996.5 dated Feb. 12, 2015.
Official Communication for European Patent Application No. 14186225.0 dated Feb. 13, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14199182.8 dated Mar. 13, 2015.
Official Communication for European Patent Application No. 14180321.3 dated Apr. 17, 2015.
Official Communication for European Patent Application No. 14197879.1 dated Apr. 28, 2015.
Official Communication for European Patent Application No. 14197895.7 dated Apr. 28, 2015.
Official Communication for Great Britain Patent Application No. 1413935.6 dated Jan. 27, 2015.
Notice of Allowance for U.S. Appl. No. 14/616,080 dated Apr. 2, 2015.
Notice of Allowance for U.S. Appl. No. 14/486,991 dated May 1, 2015.
Notice of Allowance for U.S. Appl. No. 14/225,084 dated May 4, 2015.
Official Communication for U.S. Appl. No. 14/289,596 dated Jan. 26, 2015.
Official Communication for U.S. Appl. No. 14/504,103 dated Feb. 5, 2015.
Official Communication for U.S. Appl. No. 14/225,160 dated Feb. 11, 2015.
Official Communication for U.S. Appl. No. 14/306,147 dated Feb. 19, 2015.

(56) References Cited

OTHER PUBLICATIONS

Official Communication for U.S. Appl. No. 14/225,084 dated Feb. 20, 2015.
Official Communication for U.S. Appl. No. 14/473,552 dated Feb. 24, 2015.
Official Communication for U.S. Appl. No. 14/225,006 dated Feb. 27, 2015.
Official Communication for U.S. Appl. No. 13/831,791 dated Mar. 4, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 14/148,568 dated Mar. 26, 2015.
Official Communication for U.S. Appl. No. 14/504,103 dated Mar. 31, 2015.
Official Communication for U.S. Appl. No. 14/323,935 dated Mar. 31, 2015.
Official Communication for U.S. Appl. No. 14/326,738 dated Mar. 31, 2015.
Official Communication for U.S. Appl. No. 13/247,987 dated Apr. 2, 2015.
Restriction Requirement for U.S. Appl. No. 13/839,026 dated Apr. 2, 2015.

* cited by examiner

FIG. 4

| Number | Consuming Entity ID (e.g., name or code) | Consuming Entity Location | | | | Provisioning Entity ID (e.g., name or code) | Provisioning Entity Location | | | | Type of Provisioning Entity (e.g., name or code) | Interaction Amount (e.g., in Dollars) | Time of Interaction | |
|---|---|---|---|---|---|---|---|---|---|---|---|---|---|---|
| | | State | City | Zip Code | Street Address | | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 10:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE123 | 32.11 | 2013/11/21 | 19:00 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:03 |
| ... | ... | ... | ... | ... | ... | ... | ... | ... | ... | ... | ... | ... | ... | ... |
| 50,000,000,000 | User N | California | Beverly Hills | 90210 | 123 Wilshire Blvd | Merchant N | California | Beverly Hills | 90210 | 789 Wilshire Blvd | TPE789 | 89.23 | 2013/10/28 | 14:00 |

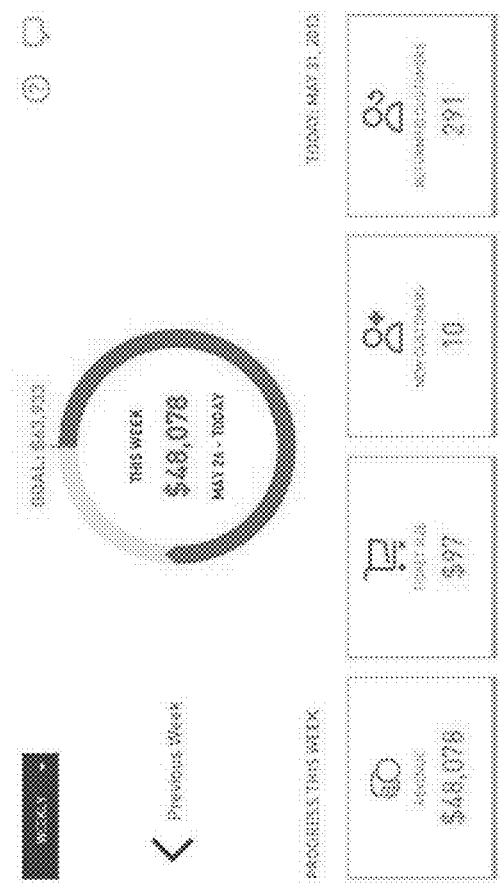
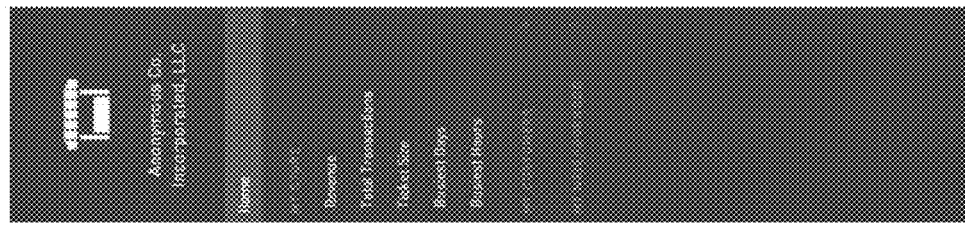
FIG. 17

METHODS AND SYSTEMS FOR ANALYZING ENTITY PERFORMANCE

CROSS REFERENCE TO RELATED APPLICATIONS

This application claims priority to U.S. Provisional Patent Application No. 61/916,795, U.S. Provisional Patent Application No. 61/916,796, and U.S. Provisional Patent Application No. 61/916,797, each of which were filed on Dec. 16, 2013, and the disclosures of which are expressly incorporated herein by reference in their entirety.

BACKGROUND

The amount of information being processed and stored is rapidly increasing as technology advances present an ever-increasing ability to generate and store data. This data is commonly stored in computer-based systems in structured data stores. For example, one common type of data store is a so-called "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Numerous organizations, including industry, retail, and government entities, recognize that important information and decisions can be drawn if massive data sets can be analyzed to identify patterns of behavior. Collecting and classifying large sets of data in an appropriate manner allows these entities to more quickly and efficiently identify these patterns, thereby allowing them to make more informed decisions.

BRIEF DESCRIPTION OF THE DRAWINGS

Reference will now be made to the accompanying drawings which illustrate exemplary embodiments of the present disclosure and in which:

FIG. 4 is a block diagram of an exemplary data structure accessed in the process of analyzing entity performance, consistent with embodiments of the present disclosure.

FIGS. 17-26 are screenshots of exemplary user interfaces, consistent with the embodiments of the present disclosure.

DETAILED DESCRIPTION OF EXEMPLARY EMBODIMENTS

This application expressly incorporates herein by reference the entirety of U.S. Non-Provisional patent application Ser. No. 14/045,720, titled "Systems and Methods for Analyzing Performance of an Entity", filed on Oct. 3, 2013.

Reference will now be made in detail to the embodiments, the examples of which are illustrated in the accompanying drawings. Whenever possible, the same reference numbers will be used throughout the drawings to refer to the same or like parts. The terms interactions and transactions are intended to covey the same meaning and can be used interchangeably throughout this disclosure.

Figure 1:
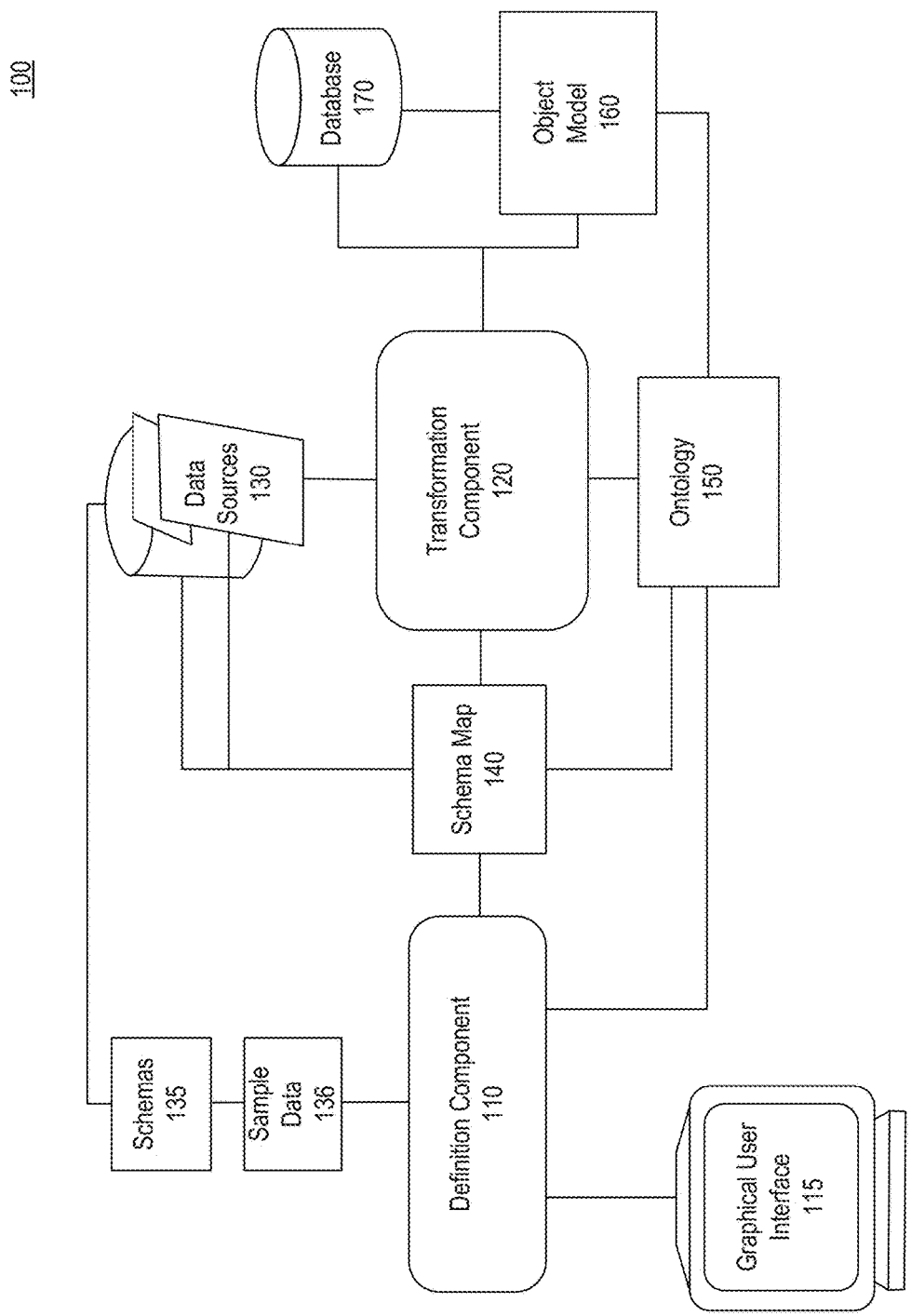
FIG. 1 illustrates, in block diagram form, an exemplary data fusion system for providing interactive data analysis, consistent with embodiments of the present disclosure.
Figure 2:
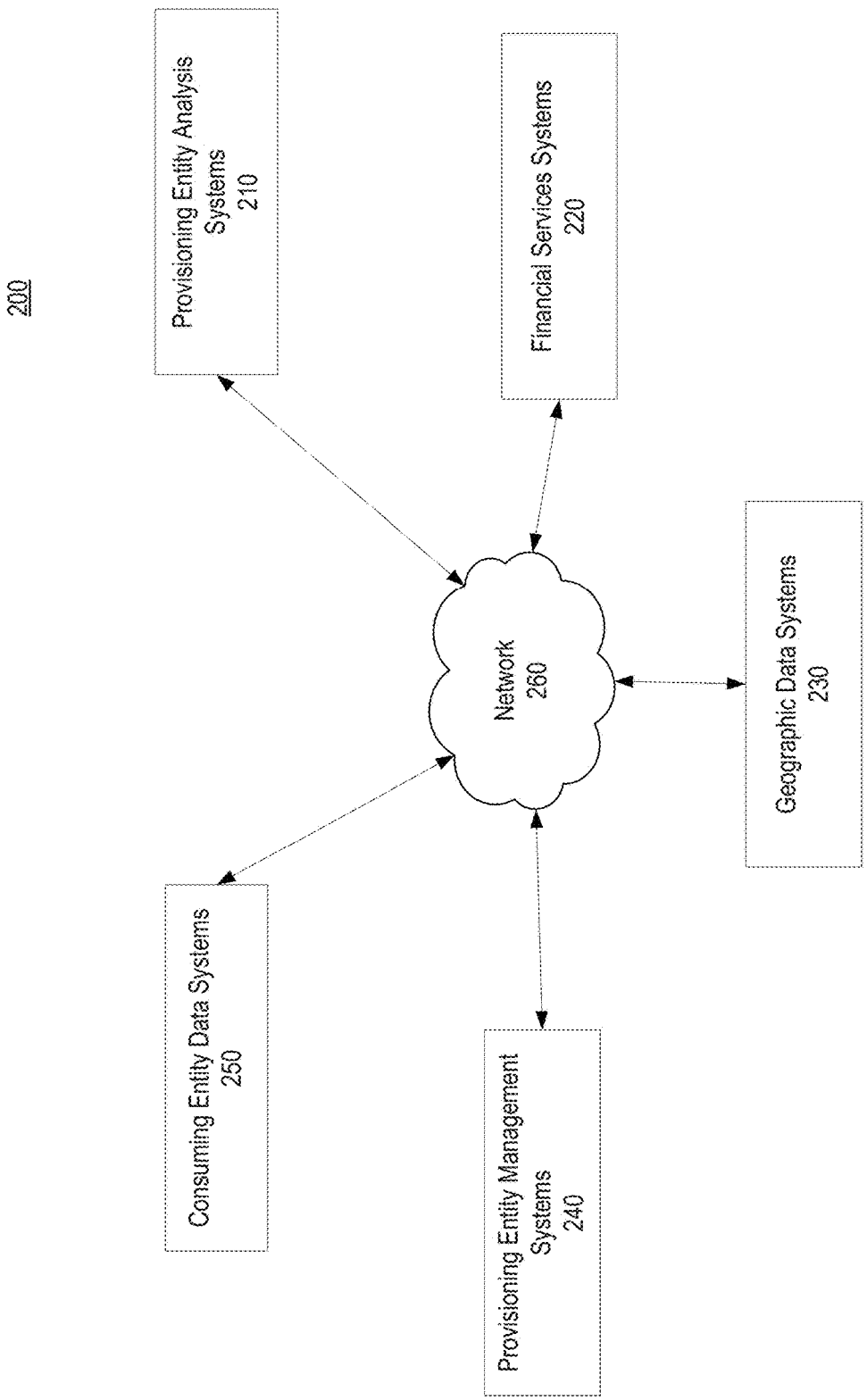
FIG. 2 is a block diagram of an exemplary system for analyzing performance of an entity, consistent with embodiments of the present disclosure.

FIG. 1 illustrates, in block diagram form, an exemplary data fusion system 100 for providing interactive data analysis, consistent with embodiments of the present disclosure. Among other things, data fusion system 100 facilitates transformation of one or more data sources, such as data sources 130 (e.g., financial services systems 220, geographic data systems 230, provisioning entity management systems 240 and/or consuming entity data systems 250, as shown in FIG. 2) into an object model 160 whose semantics are defined by an ontology 150. The transformation can be performed for a variety of reasons. For example, a database administrator can import data from data sources 130 into a database 170 for persistently storing object model 160. As another example, a data presentation component (not depicted) can transform input data from data sources 130 "on the fly" into object model 160. The object model 160 can then be utilized, in conjunction with ontology 150, for analysis through graphs and/or other data visualization techniques.

Data fusion system 100 comprises a definition component 110 and a translation component 120, both implemented by one or more processors of one or more computing devices or systems executing hardware and/or software-based logic for providing various functionality and features of the present disclosure, as described herein. As will be appreciated from the present disclosure, data fusion system 100 can comprise fewer or additional components that provide the various functionalities and features described herein. Moreover, the number and arrangement of the components of data fusion system 100 responsible for providing the various functionalities and features described herein can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued on Jun. 14, 2011, the entire contents of which are expressly incorporated herein by reference for all purposes. Consistent with certain embodiments disclosed in the '495 patent, a dynamic ontology may be used to create a database. To create a database ontology, one or more object types may be defined, where each object type includes one or more properties. The attributes of object types or property types of the ontology can be edited or modified at any time. And, for each property type, at least one parser definition may be created. The attributes of a parser definition can be edited or modified at any time.

In some embodiments, each property type is declared to be representative of one or more object types. A property type is representative of an object type when the property type is intuitively associated with the object type. Alternatively, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an Address property having a City component and a State component. An example of raw input data is "Los Angeles, Calif." An example parser definition specifies an association of imported input data to object property components as follows: {CITY}, {STATE}→Address:State, Address:City. In some embodiments, the association {CITY}, {STATE} is defined in a parser definition using regular expression symbology. The association {CITY}, {STATE} indicates that a city string followed by a state string, and separated by a comma, comprises valid input data for a property of type Address. In contrast, input data of "Los Angeles CA" would not be valid for the specified parser definition, but a user could create a second parser definition that does match input data of "Los Angeles CA." The definition Address:City, Address:State specifies that matching input data values map to components named "City" and "State" of the Address property. As a result, parsing the input data using the parser definition results in assigning the value "Los Angeles" to the Address:City component of the Address property, and the value "CA" to the Address:State component of the Address property.

According to some embodiments, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130; for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical user interface 115. Graphical user interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 115 features a visual workspace that visually depicts representations of the elements of ontology 150 for which mappings are defined in schema map 140.

In some embodiments, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or alternatively include temporary data structures generated from underlying data sources via data extraction components, such as a result set returned from a database server executing an database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. Alternatively, the elements of object model 160 are stored within database 170 in a different underlying format, such as in a series of object, property, and relationship tables in a relational database.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

Throughout this disclosure, reference will be made to an entity such as, for example, a provisioning entity and a consuming entity. It will be understood that a provisioning entity can include, for example, a merchant, a retail provisioning entity or the like, and a consuming entity can include, for example, a consumer user buying products or services from a provisioning entity. It will be understood that a consuming entity can represent either individual persons or can represent a group of persons (e.g., a group of persons living under one roof as part of a family). In some embodiments, a consuming entity can be a credit card number of an individual or a credit card number for an entire family sharing one credit card. It will also be understood that a provisioning entity can represent either the entity itself or individual persons involved with the entity.

In embodiments described herein, data fusion system 100 can provide a provisioning entity, such as a retail provisioning entity, to analyze information to identify behaviors to allow that provisioning entity to make more informed decisions. Such information can allow retail entities, such as a retail provisioning entity, to determine where to place their retail locations. Provisioning entities having more than one location (e.g., a merchant with a chain store or a franchise model) typically evaluate the performance of their locations and may adjust their business models or work flows when the locations under-perform. Typically, provisioning entities evaluate the performance of their locations based on period-to-period metrics. For example, a provisioning entity can evaluate a location's performance by comparing the current month's sales to the previous month's sales. In addition, provisioning entites can evaluate each of its locations' performance using comparative analysis. For example, a provisioning entity might compare the sales at an area location with the sales at a second location. As provisioning entities generally measure the performance of its locations based on their own interaction data (e.g., the entity's sales across some or all of its locations), current methods of measuring performance do not consider sales made by competitors or demographic features of the areas of the provisioning entity's locations.

Since current performance evaluation methods do not consider the sales of competitors or the demographic features of the region of the provisioning entity location, measured performance may not represent the true performance of a provisioning entity. For instance, although a provisioning entity location in a low consumer spend capacity area might have less sales than a provisioning entity location in a high consumer spend capacity area, it may be performing better than what could be expected for that area in light of, for example, the low number of consumers residing in the area or the low income of the area. A performance of a provisioning entity at an area location can be adversely impacted by the close proximity of a second location of the provisioning entity, but the provisioning entity at the area location can be performing better than expected given the competition from the provisioning entity's second location. Conversely, while a provisioning entity location in a dense, high-income area might have the highest sales of all provisioning entity locations, it can still be under-performing because, for instance, consumer spend capacity is high and the provisioning entity location could generate more sales.

Consistent with embodiments of the present disclosure, the performance of provisioning entities can be analyzed based on how the provisioning entity is expected to perform given the location of the provisioning entity. For a given provisioning entity location, the disclosed embodiments may be implemented to consider, for example, consumer demographic features of the provisioning entity location's area and the proximity of competitors to the provisioning entity location (including the proximity of the provisioning entity's other close-by locations). In some embodiments, the provisioning entity can be a merchant. For purposes of illustration, exemplary embodiments for analyzing entity performance are described herein with reference to "merchants." The exemplary embodiments and techniques described herein, however, may be applied to other types of entities (e.g., service providers, governmental agencies, etc.) within the spirit and scope of this disclosure.

FIG. 2 is a block diagram of an exemplary system 200 for performing one or more operations for analyzing performance of a provisioning entity and/or a consuming entity, consistent with disclosed embodiments. In some embodiments, the provisioning entity is a merchant and system 200 can include provisioning entity analysis system 210, one or more financial services systems 220, one or more geographic data systems 230, one or more provisioning entity management systems 240, and one or more consuming entity data systems 250. The components and arrangement of the components included in system 200 can vary depending on the embodiment. For example, the functionality described below with respect to financial services systems 220 can be embodied in consuming entity data systems 250, or vice-versa. Thus, system 200 can include fewer or additional components that perform or assist in the performance of one or more processes to analyze provisioning entity's, consistent with the disclosed embodiments.

One or more components of system 200 can be computing systems configured to analyze provisioning entity performance. As further described herein, components of system 200 can include one or more computing devices (e.g., computer(s), server(s), etc.), memory storing data and/or software instructions (e.g., database(s), memory devices, etc.), and other known computing components. In some embodiments, the one or more computing devices are configured to execute software or a set of programmable instructions stored on one or more memory devices to perform one or more operations, consistent with the disclosed embodiments. Components of system 200 can be configured to communicate with one or more other components of system 200, including provisioning entity analysis system 210, one or more financial services systems 220, one or more geographic data systems 230, one or more provisioning entity management systems 240, and one or more consumer data systems 250. In certain aspects, users can operate one or more components of system 200. The one or more users can be employees of, or associated with, the entity corresponding to the respective component(s) (e.g., someone authorized to use the underlying computing systems or otherwise act on behalf of the entity).

Figure 3:
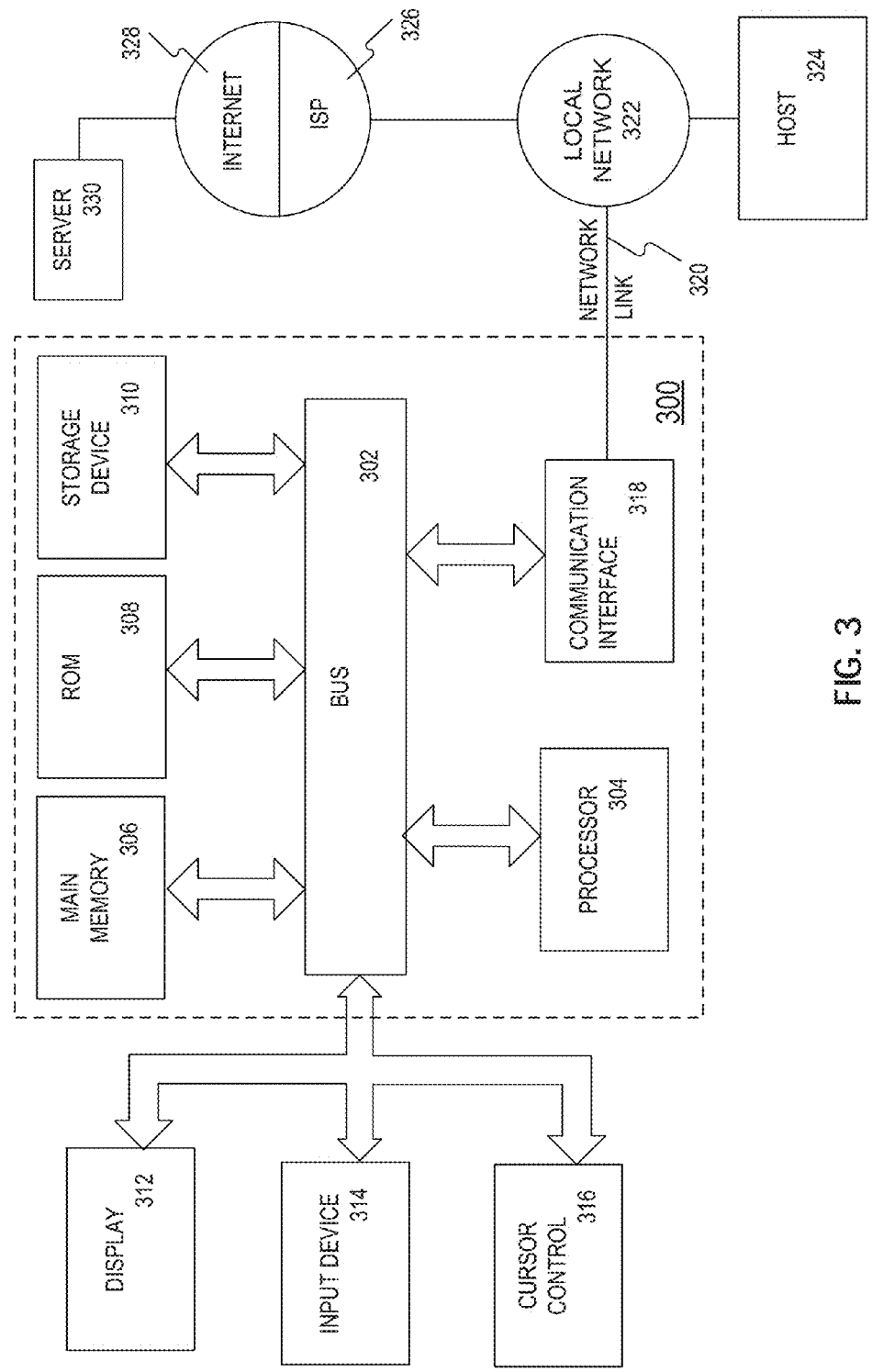
FIG. 3 is a block diagram of an exemplary computer system, consistent with embodiments of the present disclosure.

Provisioning entity analysis system 210 can be a computing system configured to analyze provisioning entity performance. For example, provisioning entity analysis system 210 can be a computer system configured to execute software or a set of programmable instructions that collect or receive financial interaction data, consumer data, and provisioning entity data and process it to determine the actual transaction amount of each transaction associated with the provisioning entity. Provisioning entity analysis system 210 can be configured, in some embodiments, to utilize, include, or be a data fusion system 100 (see, e.g., FIG. 1) to transform data from various data sources (such as, financial services systems 220, geographic data systems 230, provisioning entity management systems 240, and consuming entity data systems 250) for processing. In some embodiments, provisioning entity analysis system 210 can be implemented using a computer system 300, as shown in FIG. 3 and described below.

Provisioning entity analysis system 210 can include one or more computing devices (e.g., server(s)), memory storing data and/or software instructions (e.g., database(s), memory devices, etc.) and other known computing components. According to some embodiments, provisioning entity analysis system 210 can include one or more networked computers that execute processing in parallel or use a distributed computing architecture. Provisioning entity analysis system 210 can be configured to communicate with one or more components of system 200, and it can be configured to provide analysis of provisioning entities via an interface(s) accessible by users over a network (e.g., the Internet). For example, provisioning entity analysis system 210 can include a web server that hosts a web page accessible through network 260 by provisioning entity management systems 240. In some embodiments, provisioning entity analysis system 210 can include an application server configured to provide data to one or more client applications executing on computing systems connected to provisioning entity analysis system 210 via network 260.

In some embodiments, provisioning entity analysis system 210 can be configured to determine the actual sales for a provisioning entity or specific provisioning entity location by processing and analyzing data collected from one or more components of system 200. For example, provisioning entity analysis system 210 can determine that the Big Box Merchant store located at 123 Main St, in Burbank, Calif. is actually generating $60,000 of sales per month. Provisioning entity analysis system 210 can provide an analysis of a provisioning entity or provisioning entity location's performance based on a target for sales and the actual sales for the provisioning entity or provisioning entity location. For example, for the Big Box Merchant store located at 123 Main St., Burbank, Calif., the provisioning entity analysis system 210 can provide an analysis that the store is performing above expectations. Exemplary processes that can be used by provisioning entity analysis system 210 are described below with respect to FIGS. 6, 10A, 11, 13, 14, and 15.

Provisioning entity analysis system 210 can, in some embodiments, generate a user interface communicating data related to one or more provisioning entities or provisioning entity locations. For example, in some embodiments, provisioning entity analysis system 210 includes a web server that generates HTML code, or scripts capable of generating HTML code, that can be displayed in a web browser executing on computing device. Provisioning entity analysis system 210 can also execute an application server that provides user interface objects to a client application executing on a computing device, or it can provide data that is capable of being displayed in a user interface in a client application executing on a computing device. In some embodiments, provisioning entity analysis system 210 can generate user interfaces that can be displayed within another user interface. For example, provisioning entity analysis system 210 can generate a user interface for display within a parent user interface that is part of a word processing application, a presentation development application, a web browser, or an illustration application, among others. In some embodiments, generating a user interface can include generating the code that when executed displays information (e.g., HTML) on the user interface. Alternatively, generating interface can include providing commands and/or data to a set of instructions that when executed render a user interface capable of being shown on a display connected to a computing device. In some embodiments, the user interface can include a map, indications of the provisioning entity locations on a map, and indications of the sales or interactions associated with the provisioning entity locations. Examples of some (although not all) user interfaces that can be generated by provisioning entity analysis system 210 are described below with respect to FIGS. 7-9, 10B and 12.

Referring again to FIG. 2, financial services system 220 can be a computing system associated with a financial service provider, such as a bank, credit card issuer, credit bureau, credit agency, or other entity that generates, provides, manages, and/or maintains financial service accounts for one or more users. Financial services system 220 can generate, maintain, store, provide, and/or process financial data associated with one or more financial service accounts. Financial data can include, for example, financial service account data, such as financial service account identification data, account balance, available credit, existing fees, reward points, user profile information, and financial service account interaction data, such as interaction dates, interaction amounts, interaction types, and location of interaction. In some embodiments, each interaction of financial data can include several categories of information associated with the interaction. For example, each interaction can include categories such as number category; consuming entity identification category; consuming entity location category; provisioning entity identification category; provisioning entity location category; type of provisioning entity category; interaction amount category; and time of interaction category, as described in FIG. 4. It will be appreciated that financial data can comprise either additional or fewer categories than the exemplary categories listed above. Financial services system 220 can include infrastructure and components that are configured to generate and/or provide financial service accounts such as credit card accounts, checking accounts, savings account, debit card accounts, loyalty or reward programs, lines of credit, and the like.

Geographic data systems 230 can include one or more computing devices configured to provide geographic data to other computing systems in system 200 such as provisioning entity analysis system 210. For example, geographic data systems 230 can provide geodetic coordinates when provided with a street address of vice-versa. In some embodiments, geographic data systems 230 exposes an application programming interface (API) including one or more methods or functions that can be called remotely over a network, such as network 260. According to some embodiments, geographic data systems 230 can provide information concerning routes between two geographic points. For example, provisioning entity analysis system 210 can provide two addresses and geographic data systems 230 can provide, in response, the aerial distance between the two addresses, the distance between the two addresses using roads, and/or a suggested route between the two addresses and the route's distance.

According to some embodiments, geographic data systems 230 can also provide map data to provisioning entity analysis system 210 and/or other components of system 200. The map data can include, for example, satellite or overhead images of a geographic region or a graphic representing a geographic region. The map data can also include points of interest, such as landmarks, malls, shopping centers, schools, or popular restaurants or retailers, for example.

Provisioning entity management systems 240 can be one or more computing devices configured to perform one or more operations consistent with disclosed embodiments. For example, provisioning entity management systems 240 can be a desktop computer, a laptop, a server, a mobile device (e.g., tablet, smart phone, etc.), or any other type of computing device configured to request provisioning entity analysis from provisioning entity analysis system 210. According to some embodiments, provisioning entity management systems 240 can comprise a network-enabled computing device operably connected to one or more other presentation devices, which can themselves constitute a computing system. For example, provisioning entity management systems 240 can be connected to a mobile device, telephone, laptop, tablet, or other computing device.

Provisioning entity management systems 240 can include one or more processors configured to execute software instructions stored in memory. Provisioning entity management systems 240 can include software or a set of programmable instructions that when executed by a processor performs known Internet-related communication and content presentation processes. For example, provisioning entity management systems 240 can execute software or a set of instructions that generates and displays interfaces and/or content on a presentation device included in, or connected to, provisioning entity management systems 240. In some embodiments, provisioning entity management systems 240 can be a mobile device that executes mobile device applications and/or mobile device communication software that allows provisioning entity management systems 240 to communicate with components of system 200 over network 260. The disclosed embodiments are not limited to any particular configuration of provisioning entity management systems 240.

Provisioning entity management systems 240 can be one or more computing systems associated with a provisioning entity that provides products (e.g., goods and/or services), such as a restaurant (e.g., Outback Steakhouse®, Burger King®, etc.), retailer (e.g., Amazon.com®, Target®, etc.), grocery store, mall, shopping center, service provider (e.g., utility company, insurance company, financial service provider, automobile repair services, movie theater, etc.), non-profit organization (ACLU™, AARP®, etc.) or any other type of entity that provides goods, services, and/or information that consuming entities (i.e., end-users or other business entities) can purchase, consume, use, etc. For ease of discussion, the exemplary embodiments presented herein relate to purchase interactions involving goods from retail provisioning entity systems. Provisioning entity management systems 240, however, is not limited to systems associated with retail provisioning entities that conduct business in any particular industry or field.

Provisioning entity management systems 240 can be associated with computer systems installed and used at a brick and mortar provisioning entity locations where a consumer can physically visit and purchase goods and services. Such locations can include computing devices that perform financial service interactions with consumers (e.g., Point of Sale (POS) terminal(s), kiosks, etc.). Provisioning entity management systems 240 can also include back-and/or front-end computing components that store data and execute software or a set of instructions to perform operations consistent with disclosed embodiments, such as computers that are operated by employees of the provisioning entity (e.g., back office systems, etc.). Provisioning entity management systems 240 can also be associated with a provisioning entity that provides goods and/or service via known online or e-commerce types of solutions. For example, such a provisioning entity can sell products via a website using known online or e-commerce systems and solutions to market, sell, and process online interactions. Provisioning entity management systems 240 can include one or more servers that are configured to execute stored software or a set of instructions to perform operations associated with a provisioning entity, including one or more processes associated with processing purchase interactions, generating interaction data, generating product data (e.g., SKU data) relating to purchase interactions, for example.

Consuming entity data systems 250 can include one or more computing devices configured to provide demographic data regarding consumers. For example, consuming entity data systems 250 can provide information regarding the name, address, gender, income level, age, email address, or other information about consumers. Consuming entity data systems 250 can include public computing systems such as computing systems affiliated with the U.S. Bureau of the Census, the U.S. Bureau of Labor Statistics, or FedStats, or it can include private computing systems such as computing systems affiliated with financial institutions, credit bureaus, social media sites, marketing services, or some other organization that collects and provides demographic data.

Network 260 can be any type of network or combination of networks configured to provide electronic communications between components of system 200. For example, network 260 can be any type of network (including infrastructure) that provides communications, exchanges information, and/or facilitates the exchange of information, such as the Internet, a Local Area Network, or other suitable connection(s) that enables the sending and receiving of information between the components of system 200. Network 260 may also comprise any combination of wired and wireless networks. In other embodiments, one or more components of system 200 can communicate directly through a dedicated communication link(s), such as links between provisioning entity analysis system 210, financial services system 220, geographic data systems 230, provisioning entity management systems 240, and consuming entity data systems 250.

As noted above, provisioning entity analysis system 210 can include a data fusion system (e.g., data fusion system 100) for organizing data received from one or more of the components of system 200.

FIG. 3 is a block diagram of an exemplary computer system 300, consistent with embodiments of the present disclosure. The components of system 200 such as provisioning entity analysis system 210, financial service systems 220, geographic data systems 230, provisioning entity management systems 240, and consuming entity data systems 250 may include the architecture based on or similar to that of computer system 300.

As illustrated in FIG. 3, computer system 300 includes a bus 302 or other communication mechanism for communicating information, and one or more hardware processors 304 (denoted as processor 304 for purposes of simplicity) coupled with bus 302 for processing information. Hardware processor 304 can be, for example, one or more general-purpose microprocessors or it can be a reduced instruction set of one or more microprocessors.

Computer system 300 also includes a main memory 306, such as a random access memory (RAM) or other dynamic storage device, coupled to bus 302 for storing information and instructions to be executed by processor 304. Main memory 306 also can be used for storing temporary variables or other intermediate information during execution of instructions to be executed by processor 304. Such instructions, after being stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc. is provided and coupled to bus 302 for storing information and instructions.

Computer system 300 can be coupled via bus 302 to a display 312, such as a cathode ray tube (CRT), liquid crystal display, or touch screen, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 300 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques and other features described herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 310. Volatile media can include dynamic memory, such as main memory 306. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 302. Transmission media can also take the form of acoustic or light waves, such as those generated during radio-wave and infra-red data communications.

Various forms of media can be involved in carrying one or more sequences of one or more instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 can also include a communication interface 318 coupled to bus 302. Communication interface 318 can provide a two-way data communication coupling to a network link 320 that can be connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN. Wireless links can also be implemented. In any such implementation, communication interface 318 can send and receives electrical, electromagnetic or optical signals that carry digital data streams representing various types of information.

Network link 320 can typically provide data communication through one or more networks to other data devices. For example, network link 320 can provide a connection through local network 322 to a host computer 324 or to data equipment operated by an Internet Service Provider (ISP) 326. ISP 326 in turn can provide data communication services through the world wide packet data communication network now commonly referred to as the "Internet" 328. Local network 322 and Internet 328 can both use electrical, electromagnetic or optical signals that carry digital data streams. The signals through the various networks and the signals on network link 320 and through communication interface 318, which carry the digital data to and from computer system 300, can be example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution. In some embodiments, server 330 can provide information for being displayed on a display.

FIG. 4 is a block diagram of an exemplary data structure 400, consistent with embodiments of the present disclosure. Data structure 400 can store data records associated with interactions involving multiple entities. Data structure 400 can be, for example, a database (e.g., database 170) that can store elements of an object model (e.g., object model 160). In some embodiments, data structure 400 can be a Relational Database Management System (RDBMS) that stores interaction data as sections of rows of data in relational tables. An RDBMS can be designed to efficiently return data for an entire row, or record, in as few operations as possible. An RDBMS can store data by serializing each row of data of data structure 400. For example, in an RDBMS, data associated with interaction 1 of FIG. 4 can be stored serially such that data associated with all categories of interaction 1 can be accessed in one operation.

Alternatively, data structure 400 can be a column-oriented database management system that stores data as sections of columns of data rather than rows of data. This column-oriented DBMS can have advantages, for example, for data warehouses, customer relationship management systems, and library card catalogs, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of data structure 400. For example, in a column-oriented DBMS, data associated with a category (e.g., consuming entity identification category 420) can be stored serially such that data associated with that category for all interactions of data structure 400 can be accessed in one operation.

As shown in FIG. 4, data structure 400 can comprise data associated with a very large number of interactions associated with multiple entities. For example, data structure 400 can include 50 billion interactions. In some embodiments, interactions associated with multiple entities can be referred to as transactions between multiple entities. Where appropriate, the terms interactions and transactions are intended to convey the same meaning and can be used interchangeably throughout this disclosure. While each interaction of data structure 400 is depicted as a separate row in FIG. 4, it will be understood that each such interaction can be represented by a column or any other known technique in the art. Each interaction data can include several categories of information. For example, the several categories can include, number category 410; consuming entity identification category 420; consuming entity location category 430; provisioning entity identification category 440; provisioning entity location category 450; type of provisioning entity category 460; interaction amount category 470; and time of interaction category 480. It will be understood that FIG. 4 is merely exemplary and that data structure 400 can include even more categories of information associated with an interaction.

Number category 410 can uniquely identify each interaction of data structure 400. For example, data structure 400 depicts 50 billion interactions as illustrated by number category 410 of the last row of data structure 400 as 50,000,000,000. In FIG. 4, each row depicting a interaction can be identified by an element number. For example, interaction number 1 can be identified by element 401; interaction number 2 can be identified by element 402; and so on such that interaction 50,000,000,000 can be identified by 499B. It will be understood that this disclosure is not limited to any number of interactions and further that this disclosure can extend to a data structure with more or fewer than 50 billion interactions. It is also appreciated that number category 410 need not exist in data structure 400.

Consuming entity identification category 420 can identify a consuming entity. In some embodiments, consuming entity identification category 420 can represent a name (e.g., User 1 for interaction 401; User N for interaction 499B) of the consuming entity. Alternatively, consuming entity identification category 420 can represent a code uniquely identifying the consuming entity (e.g., CE002 for interaction 402). For example, the identifiers under the consuming entity identification category 420 can be a credit card number that can identify a person or a family, a social security number that can identify a person, a phone number or a MAC address associated with a cell phone of a user or family, or any other identifier.

Consuming entity location category 430 can represent a location information of the consuming entity. In some embodiments, consuming entity location category 430 can represent the location information by providing at least one of: a state of residence (e.g., state sub-category 432; California for element 401; unknown for interaction 405) of the consuming entity; a city of residence (e.g., city sub-category 434; Palo Alto for interaction 401; unknown for interaction 405) of the consuming entity; a zip code of residence (e.g., zip code sub-category 436; 94304 for interaction 401; unknown for interaction 405) of the consuming entity; and a street address of residence (e.g., street address sub-category 438; 123 Main St. for interaction 401; unknown for interaction 405) of the consuming entity.

Provisioning entity identification category 440 can identify a provisioning entity (e.g., a merchant or a coffee shop). In some embodiments, provisioning entity identification category 440 can represent a name of the provisioning entity (e.g., Merchant 2 for interaction 402). Alternatively, provisioning entity identification category 440 can represent a code uniquely identifying the provisioning entity (e.g., PE001 for interaction 401). Provisioning entity location category 450 can represent a location information of the provisioning entity. In some embodiments, provisioning entity location category 450 can represent the location information by providing at least one of: a state where the provisioning entity is located (e.g., state sub-category 452; California for interaction 401; unknown for interaction 402); a city where the provisioning entity is located (e.g., city sub-category 454; Palo Alto for interaction 401; unknown for interaction 402); a zip code where the provisioning entity is located (e.g., zip code sub-category 456; 94304 for interaction 401; unknown for interaction 402); and a street address where the provisioning entity is located (e.g., street address sub-category 458; 234 University Ave. for interaction 401; unknown for interaction 402).

Type of provisioning entity category 460 can identify a type of the provisioning entity involved in each interaction. In some embodiments, type of provisioning entity category 460 of the provisioning entity can be identified by a category name customarily used in the industry (e.g., Gas Station for interaction 401) or by an identification code that can identify a type of the provisioning entity (e.g., TPE123 for interaction 403). Alternatively, type of the provisioning entity category 460 can include a merchant category code ("MCC") used by credit card companies to identify any business that accepts one of their credit cards as a form of payment. For example, MCC can be a four-digit number assigned to a business by credit card companies (e.g., American Express™, MasterCard™, VISA™) when the business first starts accepting one of their credit cards as a form of payment.

In some embodiments, type of provisioning entity category 460 can further include a sub-category (not shown in FIG. 4), for example, type of provisioning entity sub-category 461 that can further identify a particular sub-category of provisioning entity. For example, an interaction can comprise a type of provisioning entity category 460 as a hotel and type of provisioning entity sub-category 461 as either a bed and breakfast hotel or a transit hotel. It will be understood that the above-described examples for type of provisioning entity category 460 and type of provisioning entity sub-category 461 are non-limiting and that data structure 400 can include other kinds of such categories and sub-categories associated with an interaction.

Interaction amount category 470 can represent a transaction amount (e.g., $74.56 for interaction 401) involved in each interaction. Time of interaction category 480 can represent a time at which the interaction was executed. In some embodiments, time of interaction category 480 can be represented by a date (e.g., date sub-category 482; Nov. 23, 2013, for interaction 401) and time of the day (e.g., time sub-category 484; 10:32 AM local time for interaction 401). Time sub-category 484 can be represented in either military time or some other format. Alternatively, time sub-category 484 can be represented with a local time zone of either provisioning entity location category 450 or consuming entity location category 430.

In some embodiments, each interaction data can include categories of information including (not shown in FIG. 4), for example, consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™. Consuming entity credit card type category can represent the type of credit card used by the consuming entity for a particular interaction. For example, consuming entity credit card type category can represent that the credit card used by the consuming entity for that particular interaction can be one either American Express™, MasterCard™, VISA™, or Discover™ credit cards. In some embodiments, consuming entity credit card type category can represent a kind of MasterCard™ (e.g., Gold MasterCard™ or Platinum MasterCard™) used for a particular interaction.

In some embodiments, consuming entity demographic information can be stored in each interaction. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not has children under 18, a negative indication can be stored. In some embodiments, consuming entity with children category can store information representing a number of children associated with the consuming entity.

Product information category can represent information associated with a product that is involved in an interaction. For example, product information category can represent that the product involved in the interaction is a particular type of product based on a stock keeping unit ("SKU") of the product. In some embodiments, the product's SKU can be unique to a particular provisioning entity involved in that particular interaction. Alternatively, product information category can represent the product involved in the interaction with a at least one of a Universal Product Code, International Article Number, Global Trade Item Number, and Australian Product Number. Service information category can represent information associated with a service that is involved in an interaction. For example, service information category can represent that the service involved in the interaction is a particular type of service based on an SKU of the service. It will be appreciated that an SKU can uniquely represent either a product or a service. Some examples of services can be warranties, delivery fees, installation fees, and licenses.

Figure 5:
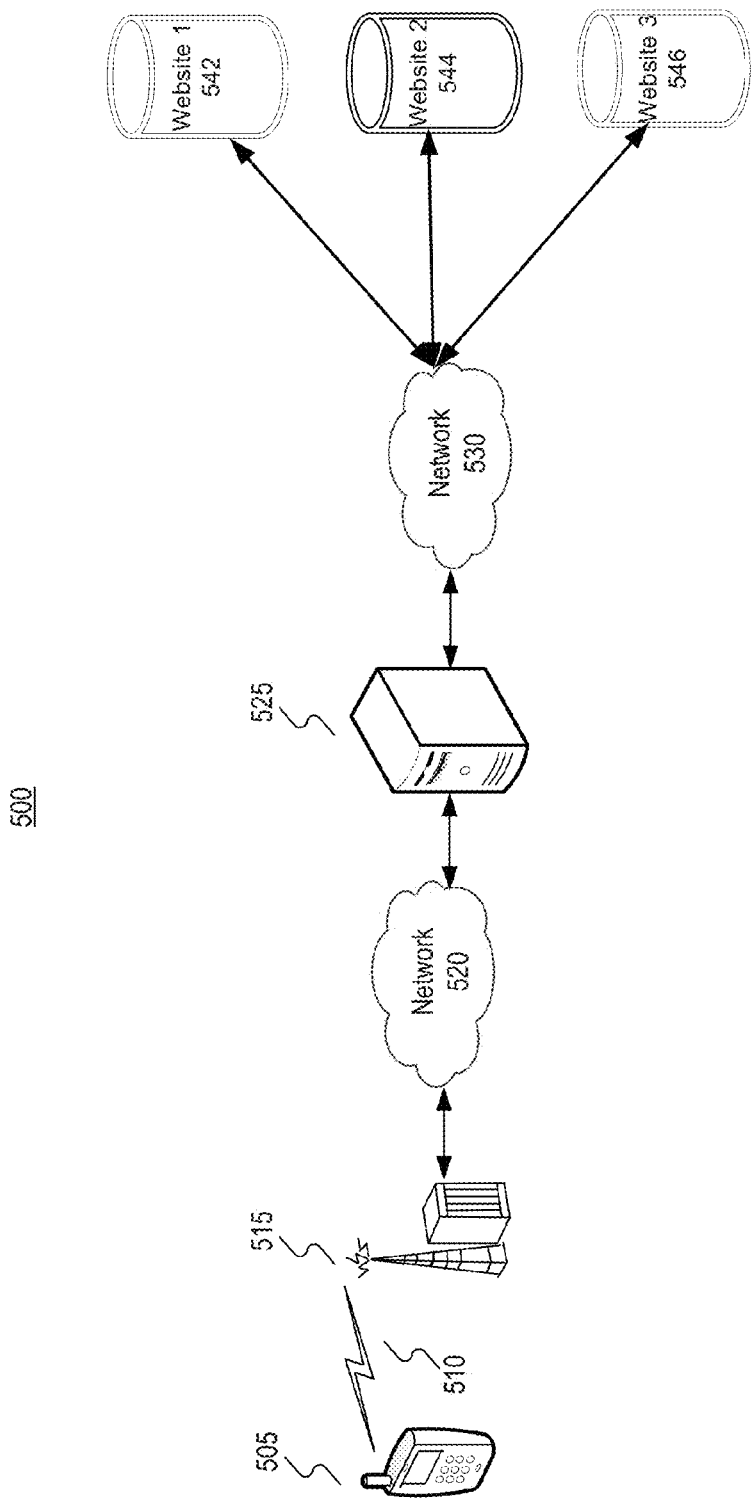
FIG. 5 is a block diagram of an exemplary scenario depicting a system for analyzing entity performance, consistent with the embodiments of the present disclosure.

FIG. 5 is a block diagram of an exemplary scenario depicting a system for analyzing entity performance, consistent with embodiments of the present disclosure. System 500 depicts a scenario where a consuming entity (e.g., user of cell phone 505) can attempt to access a service at one or more provisioning entities (e.g., Website 1 542, Website 2 544, and/or Website 3 546). To access one of the provisioning entities, the consuming entity can initiate an access request from cell phone 505. The access request can include a consuming entity identification such as, for example, a cell phone number or a MAC address associated with cell phone 505. The access request can then reach a cellular base station 515 through a communication link 510. It will be understood that communication link 510 can either be a wireless link (as shown in the exemplary embodiment of FIG. 5) or a wired link (not shown). Next, the access request can reach server 525 through network 520. Network 520 can be, for example, the Internet. In some embodiments, network 520 can be one of either a local area network, a wide area network, or an entity's intranet. Server 525 can be a server located at a service provider (e.g., Verizon Wireless™) Server 525 can be, in some embodiments, an authentication, authorization, and accounting server (AAA server). In some embodiments, server 525 can be a proxy server that can facilitate a communication between cell phone 505 and a server device at the provisioning entities (e.g., Website 1 542).

Access request can reach one of the provisioning entities after an authorization, authentication, and accounting process is complete. Access request can traverse to one of the provisioning entities through network 530. Network 530 can be similar to network 520, as described above. After the authorized and authenticated access request reaches one of the provisioning entities, the consuming entity is allowed to access the provisioning entities. In this exemplary embodiment, user of cell phone 505 can access either Website 1 542, Website 2 544, or Website 3 546, depending on details of the access request. For example, provisioning entities can be one of the websites Google™, Facebook™, and Twitter™.

After a consuming entity (e.g., user of cell phone 505 or cell phone 505) accesses one of the provisioning entities, server 525 can store information regarding the user and/or cell phone accessing these provisioning entities. Each access by a user of a website can be stored as an interaction in a data structure in Server 525. Server 525 can store such information in a data structure (e.g., data structure 400) comprising several categories of information including, but not limited to, an interaction number; consuming entity identification; consuming entity location; provisioning entity identification; provisioning entity location; type of provisioning entity; duration of interaction; and time of interaction. The data structure can be analyzed to analyze a performance of provisioning entities, for example, to estimate a number of unique consuming entities (e.g., users) per month, average amount of time a consuming entity spends on their website, time of the day where consuming entity traffic is highest or lowest, etc. It will be understood that any number of useful insights can be drawn by analyzing the data structure comprising interactions associated with consuming entities and provisioning entities. While FIG. 5, depicts a use case scenario of a cell phone user (exemplary consuming entity) accessing a website (exemplary provisioning entity), it will be understood that a process of analyzing interaction between a consuming entity and a provisioning entity can be extended to any number of scenarios, including, financial transactions between consumers and banks; credit card transactions between a consumer and a provisioning entity like a grocery store, movie theatre, gas station, mall, etc.

Figure 6:
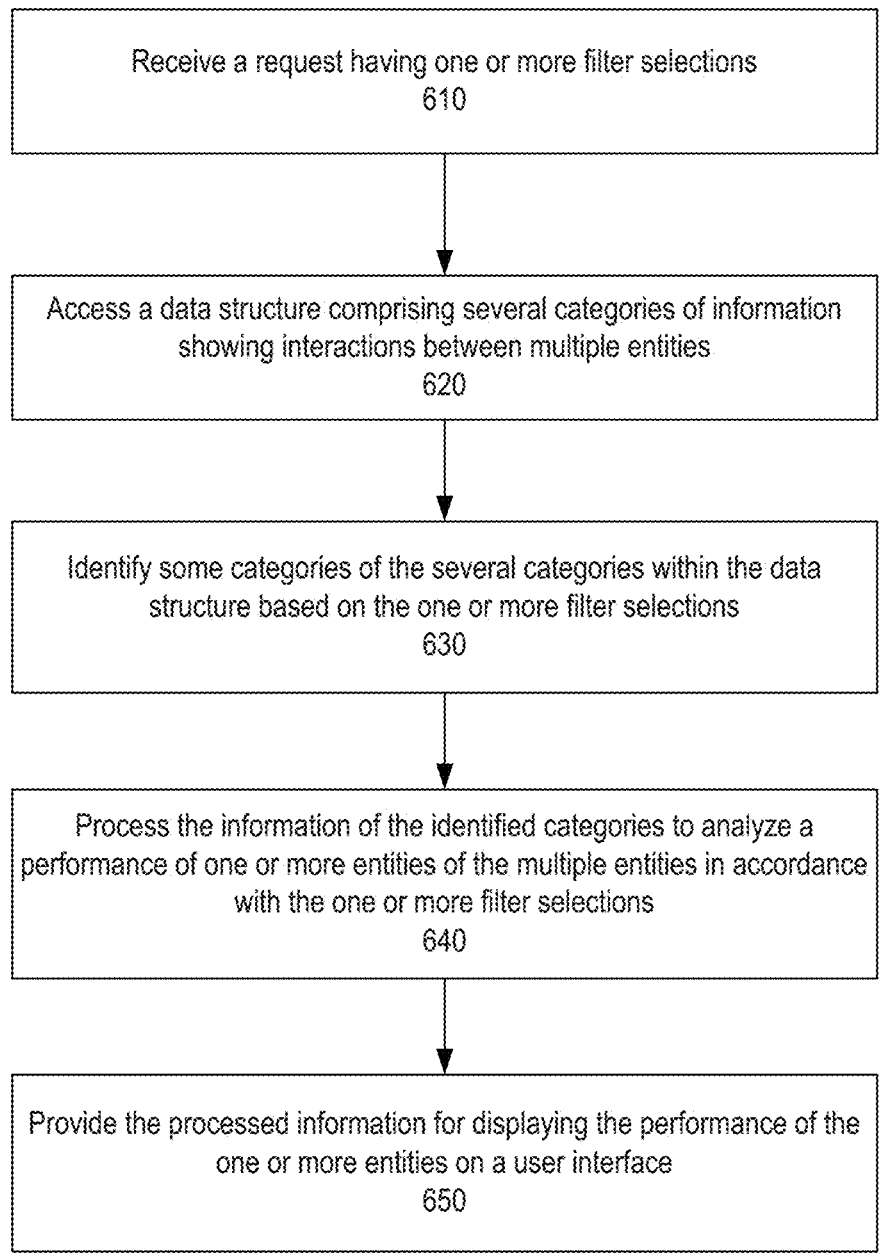
FIG. 6 is a flowchart representing an exemplary process for analyzing entity performance, consistent with the embodiments of the present disclosure.

FIG. 6 depicts a flowchart representing an exemplary process for analyzing entity performance, consistent with embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by a provisioning entity analysis system (e.g., provisioning entity analysis system 210). It is appreciated that some of these steps can be performed in full or in part by other systems (e.g., such as those systems identified above in FIG. 2).

Figure 7:
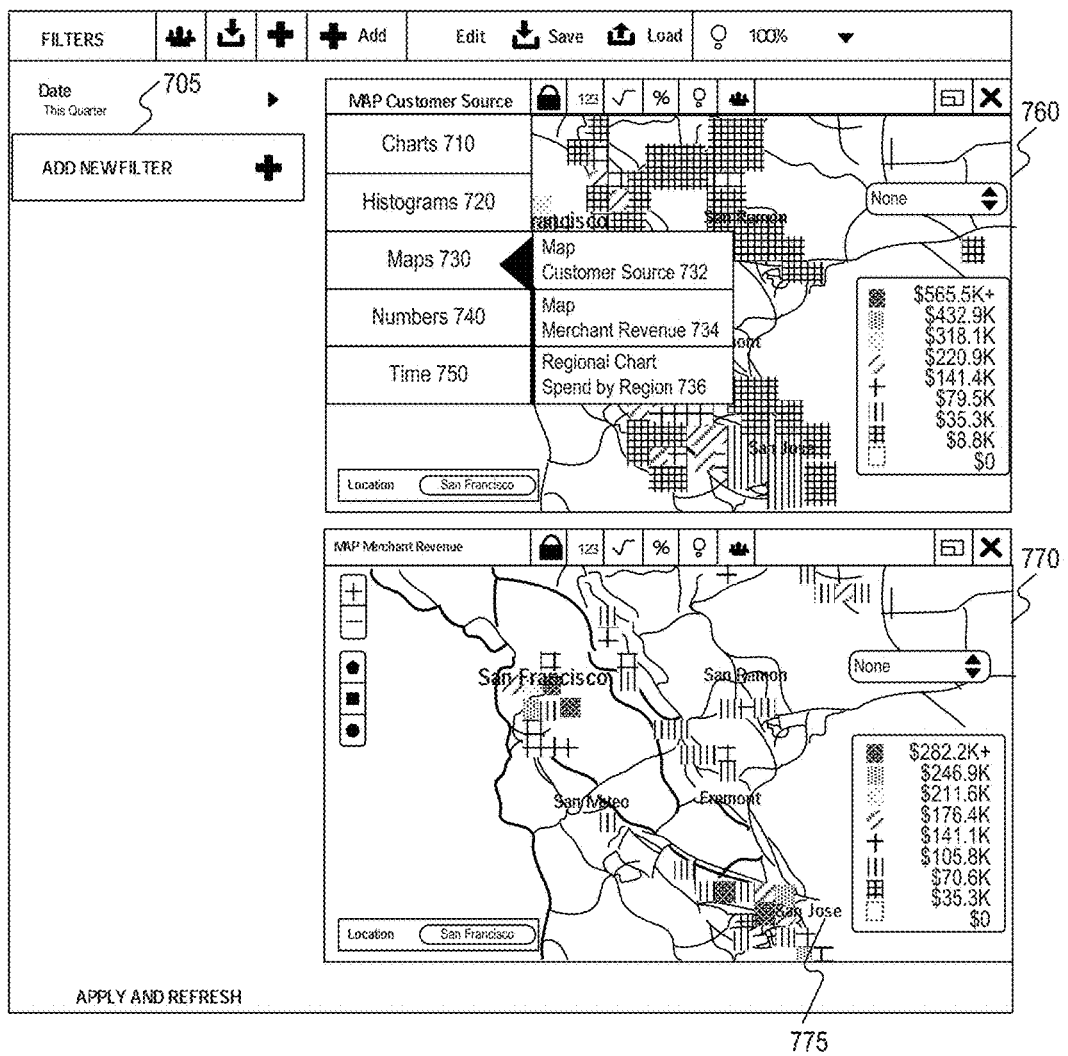
FIG. 7 is a screenshot of an exemplary user interface representing an entity performance, consistent with embodiments of the present disclosure.
Figure 8:
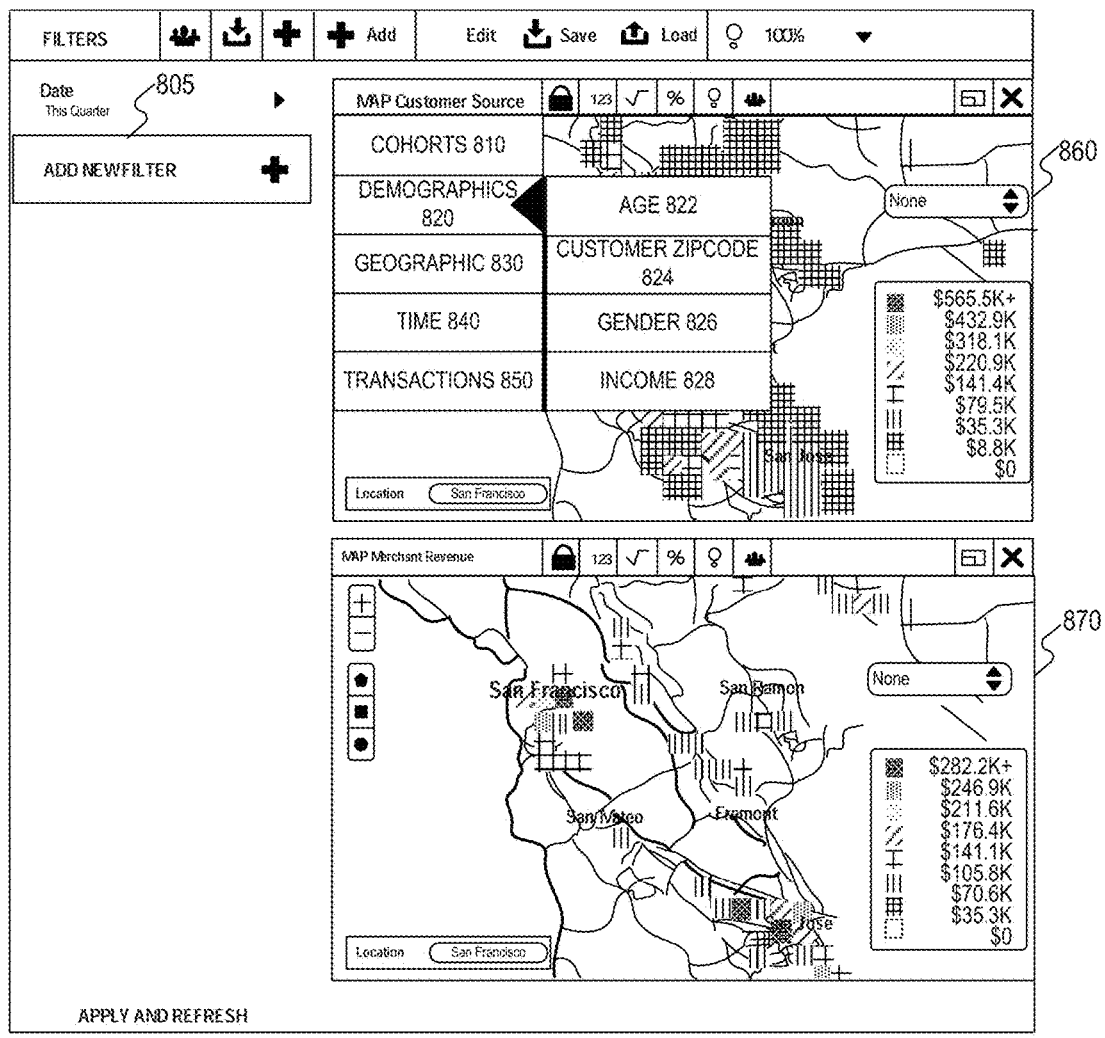
FIG. 8 is a screenshot of an exemplary user interface representing an entity performance, consistent with embodiments of the present disclosure.

In step 610, a request having one or more filter selections can be received at a provisioning entity analysis system implementing a process for analyzing a performance of one or more entities of multiple entities. In some embodiments, the request can be received from a provisioning entity (e.g., a merchant like Lowes™) which can be interested in analyzing its performance with regards the one or more filter selections. In some embodiments, one or more filter selections of the received request can comprise a selection to represent data associated with at least one of: cohorts; demographics; geographic; time; and transactions. Alternatively, the one or more filter selections can comprise a selection to represent data associated with at least one of: charts; histograms; maps; numbers; and time. In some embodiments, the one or more filter selections can comprise a selection to represent data associated with at least one of: a location information associated with the occurrence of an interaction; a location information associated with the consuming entity; a location information associated with the provisioning entity; demographic information representing at least one of: age, gender, income, and location associated with the consuming entity; an amount associated with an interaction; and a time associated with an interaction. An exemplary screenshot of a user interface with exemplary filter selections is shown in FIGS. 7 and 8, described below.

In some embodiments, the process for analyzing a performance of one or more entities of multiple entities can be implemented without having to receive one or more filter selections. Such a process can be implemented, for example, by having the provisioning entity analysis system (e.g., provisioning entity analysis system 210) comprise one or more predetermined filter selections. These exemplary one or more predetermined filter selections can include the same selections as the one or more filters (e.g., add new filter 705 shown in FIG. 7) that can be selected by a user as described above. For example, the one or more predetermined filter selections can comprise at least one of: cohorts; demographics; geographic; time; and transactions. In another exemplary embodiment, the one or more predetermined filter selections can comprise at least one of: charts; histograms; maps; numbers; and time.

Next, in step 620, a data structure (e.g., data structure 400) comprising several categories of information showing interactions associated with multiple entities can be accessed. The data structure can represent information associated with a very large number of interactions. In some embodiments, the data structure can represent information for tens of billions of interactions (e.g., data structure 400 depicting 50 billion interactions). The data structure can be similar to the exemplary data structure 400 described in FIG. 4 above. In exemplary embodiments comprising one or more predetermined filter selections, accessing step 620 can be implemented in the same fashion as that of the exemplary embodiments where one or more filter selections can be received from a user.

Next, in step 630, some categories of the several categories within the data structure can be identified based on the one or more filter selections of the received request. The identified categories, for example, can be one or more of the several categories of the data structure (e.g., data structure 400). In some embodiments, there can be a mapping between the one or more filter selections and the several categories. For example, a filter selection for customer zip code can be mapped to consuming entity location category 430 and further to zip code sub-category 436. Another exemplary mapping can exist between a filter selection for gender and a category or a sub-category associated with a gender of consuming entity (not shown in FIG. 4). It will be appreciated that the exemplary mapping techniques described above are merely exemplary and other mapping techniques can be defined within the scope of this disclosure. In some embodiments, one or more filter selections can include "demographics and customer zip code" selections, as depicted in FIG. 8. When the provisioning entity (e.g., a home improvement store such as Lowes™) is interested in analyzing its performance at a particular location with respect to consuming entities (e.g., a consumer buying home improvement products at Lowes™) that buy products at the location, the provisioning entity can select one or more filters such as demographics 820 and further zip code 824 (associated with a zip code representing location of consuming entity).

Based on the one or more filter selections, the provisioning entity analysis system (e.g., provisioning entity analysis system 210) can identify some categories of the data structure that are relevant for analyzing the performance of the one or more entities (e.g., provisioning entity) regarding customer demographics including a location (e.g., zip code) of the consuming entities. In this example, the provisioning entity analysis system can identify categories associated with a number of interaction (e.g., number category 410), an identity of consuming entities (e.g., consuming entity identification category 420), and a location of consuming entities (e.g., consuming entity location category 430 including at least zip code sub-category 436). In some embodiments, consuming entity location category 430 can be identified along with one or more categories of state sub-category 432, city sub-category 434, zip code sub-category 436, and street address sub-category 438. In exemplary embodiments comprising one or more predetermined filter selections, identifying step 630 can be implemented in the same fashion as that of the exemplary embodiments where one or more filter selections can be received from a user.

Next, in step 640, information associated with the identified categories can be processed to analyze a performance of one or more entities of the multiple entities in accordance with the one or more filter selections. In some embodiments, a first entity of the one or more entities can be a provisioning entity (e.g., a home improvement store such as Lowes™). One or more entities of the multiple entities can comprise one or more groups of entities of the multiple entities. For example, a group of entities can be defined such that the group of entities can have similar characteristics such as all grocery stores within a given zip code or all Safeway™ locations within a city (e.g., San Jose, Calif.). In some embodiments, a group of entities can include all entities associated with the same MCC (e.g., 5542 for Automated Fuel Dispensers at a Gas Station) within a given zip code. Processing the identified categories can comprise creating a new data structure that is different from the data structure of step 620, and comprising only the identified categories of step 630 or one or more subsets of those categories. Alternatively, processing the identified categories can be performed on the existing data structure of step 620 (e.g., data structure 400).

By way of example, when the one or more filter selections is "demographics and customer zip code," the system can process information that is associated with identified categories based on the filter selections such as a number of interaction (e.g., number category 410), an identity of consuming entities (e.g., consuming entity identification category 420), a location of consuming entities (e.g., consuming entity location category 430 including at least zip code sub-category 436), and categories associated with consuming entity demographics including consuming entity age category, consuming entity gender category, and consuming entity income category. In some embodiments, data associated with identified categories can be stored in either a row-oriented database or a column-oriented database, as described above with respect to data structure 400. Processing information can involve performing statistical analysis on data stored in the identified categories. Performing statistical analysis, for example, can include various computations of data associated with identified categories. For example, if an identified category is interaction amount category 470, processing information can include performing an aggregate of the interaction amount to compute a total amount for all interactions associated with the provisioning entity. It will be understood that processing information can include other examples of performing statistical analysis, including but not limited to, computing an average, mean, maximum, minimum, or standard deviation for a series of data.

In some embodiments, processing the information of the identified categories can result in a multitude of useful insights regarding the behavior of consuming entities. Some of such insights, for example, can relate to the kinds of products bought by consuming entities, a location where consuming entities buy the products, a time as to when consuming entities buy the products, the frequency with which consuming entities buy the products, a location of residence of consuming entities, demographics information of consuming entities including their age and income level. It will be understood that the above-listed insights are merely exemplary and a number of other insights can be drawn within the scope and spirit of this disclosure.

In some embodiments, processing the information of the identified categories can result in a multitude of useful insights regarding the performance of provisioning entities. Some of such insights, for example, can relate to the kinds of products being sold by provisioning entities, a location where provisioning entities sell the products, a time as to when provisioning entities sell the products, a performance comparison between different locations of the same provisioning entity. It will be understood that the above-listed insights are merely exemplary and a number of other insights can be drawn within the scope and spirit of this disclosure. In exemplary embodiments comprising one or more predetermined filter selections, processing step 640 can be implemented in the same fashion as that of the exemplary embodiments where one or more filter selections can be received from a user.

In some embodiments, step 640 can process information of a data structure that is updated in real-time. That is, processing of information can occur on the data structure that comprises up-to-date interaction data at the time of an execution of step 640. Alternatively, step 640 can process information of a data structure that is not updated in real-time. That is, processing of information can occur on the data structure that does not comprise up-to-date interaction data at the time of an execution of step 640. For example, processing of information can occur on a data structure that is updated only periodically (e.g., on a daily or weekly basis) and not in real-time.

Next, in step 650, the processed information can be provided for displaying the performance of the one or more entities (e.g., provisioning entity) on a user interface. In some embodiments, the user interface can comprise a representation of a geographic region. The user interface can also comprise a representation of locations of the one or more entities overlaid on the geographic region; and further a representation of sub-geographic regions overlaid on a geographic region. Alternatively, the user interface can include a representation of the performance of the one or more entities over geographic or sub-geographic regions associated with a location of the one or more entities. For example, geographic or sub-geographic regions can be associated with a location of either a consuming entity or a provisioning entity.

Figure 9:
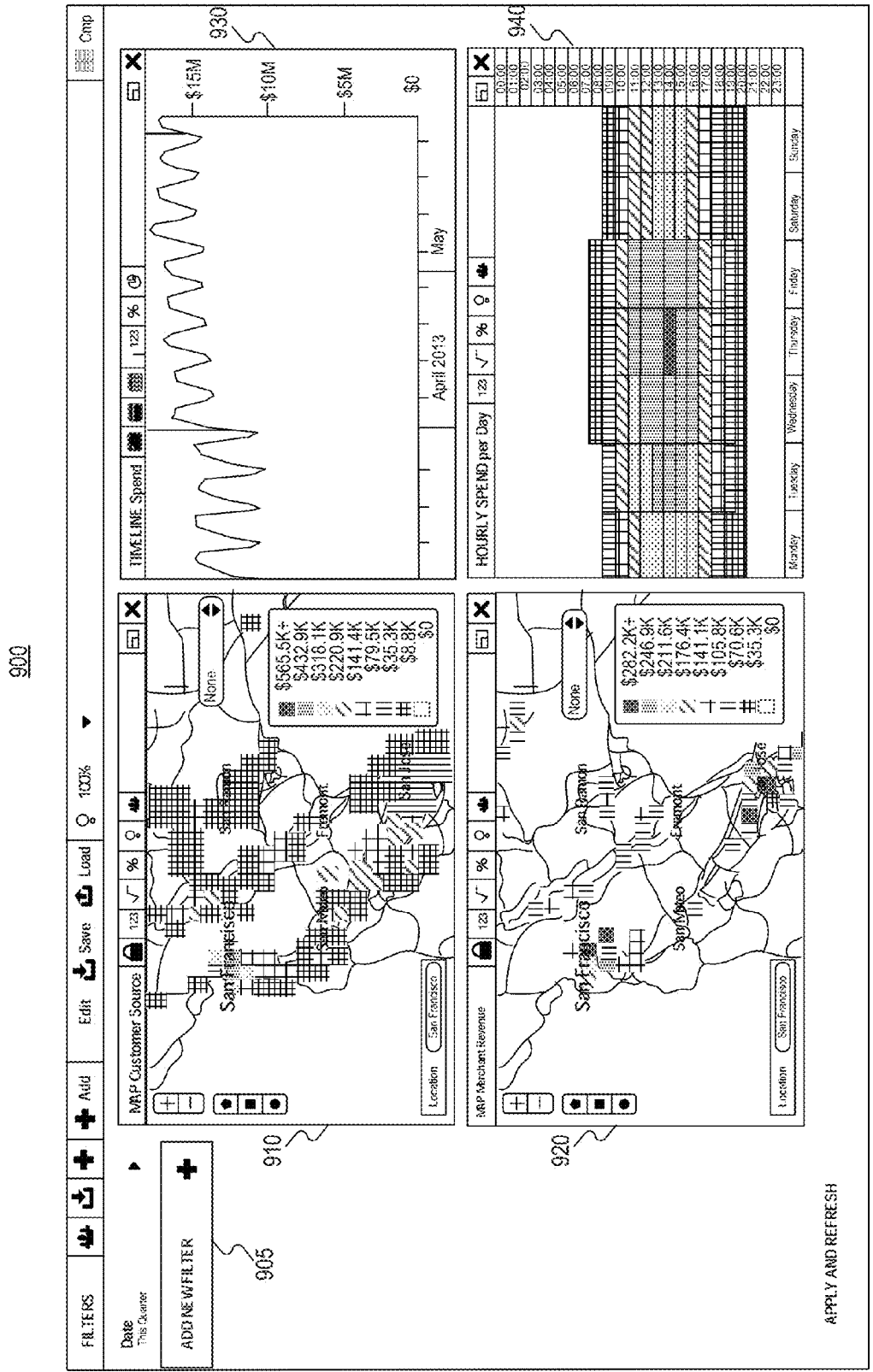
FIG. 9 is a screenshot of an exemplary user interface representing an entity performance, consistent with embodiments of the present disclosure.

In exemplary embodiments comprising one or more predetermined filter selections, providing step 650 can be implemented in the same fashion as that of the exemplary embodiments where one or more filter selections can be received from a user. Exemplary user interfaces are depicted in FIGS. 7-9 that illustrate a performance of a provisioning entity based on one or more filter selections. As shown in FIGS. 7-9, user interface can either be a graph-based, map-based, or any other related interface.

FIGS. 7-9 illustrate several exemplary user interfaces that can be generated by provisioning entity analysis system, consistent with embodiments of the present disclosure. The exemplary user interfaces of FIGS. 7-9 are meant to help illustrate and describe certain features of disclosed embodiments, and are not meant to limit the scope of the user interfaces that can be generated or provided by the provisioning entity analysis system.

FIG. 7 shows an exemplary user interface 700 generated by a provisioning entity analysis system (e.g., provisioning entity analysis system 210), according to some embodiments. User interface 700 includes an option to add one or more new filters (e.g., add new filter 705). In some embodiments, a provisioning entity (or a user of a provisioning entity) can select the option to select the one or more new filters. Alternatively, a consuming entity can select the option to select the one or more filters. In some embodiments, the option to add one or more filters can include adding filters associated with charts 710, histograms 720, maps 730, numbers 740, and time 750. Each of the above-recited filters can further comprise sub-filters. For example, filter maps 730 can further comprise sub-filters associated with Map-Consuming Entity Source 732, Map-Provisioning Entity Revenue 734, and Regional Chart-Spend by Region 736. It will be understood that one or more filters (and sub-filters) can include any other filters associated with interactions associated with multiple entities stored in a data structure (e.g., data structure 400).

User interface 700 can include map 760, which shows consuming entity source and geohash regions (while shown as shaded rectangles, they can also include any unshaded rectangles). A geohash region, or geohash bucket, is a region associated with a latitude/longitude, hierarchal geocode system that subdivides regions of the Earth into grid shaped buckets. The level of granularity of geohash regions can vary depending on the length of the geohash code corresponding to that region. For example, a geohash code that is one bit in length can correspond to a geohash region of roughly 20 million square kilometers, and a geohash code that is six bits in length can correspond to a geohash region of roughly 1.2 square kilometers. In some embodiments, a geohash region of five bits (roughly 18 square kilometers) is preferred, although the size of the geohash region can depend on the character of the overall region which is being geohashed. For example, a six bit geohash can be more suitable for a densely populated urban area, while a four bit geohash can be more suitable for a sparsely populated rural area. In some embodiments, location information of an entity can be represented by a geohash region. For example, a geohash region of five bits representing San Jose, Calif., can comprise the latitude/longitude coordinates, N 37.3394° W 121.8950°, and can be depicted as shaded region 775 as illustrated on map 770. Alternatively, location information can be represented using a zip code. For example, a portion of San Jose, Calif., can be represented by using a zip code, 95113. It will be appreciated that location information can be represented in other ways such as street address, city, state, Global Positioning Satellite coordinates, etc.

In some embodiments, after a user enters information into the add new filter (e.g., add new filter 705), the provisioning entity analysis system receives a message to regenerate or modify the user interface. For example, if a user entered Maps 730 and then Map-Consuming Entity Source 732 into the add new filter box, the provisioning entity analysis system could receive a message indicating that a user interface should display a map with a location of each consuming entity for the given region of the map (e.g., San Francisco Bay Area), and it can generate a user interface with map 760 showing a location information for each consuming entity. For example, map 760 can display consuming entity location as shaded and unshaded rectangles in geo-hash regions. In some embodiments, a region of the map can be selected by a user by using an input device such as mouse, key board, or touch pad.

In some embodiments, after a user selects Maps 730 and then Map-Provisioning Entity Revenue 734 into the add new filter box, the provisioning entity analysis system could receive a message indicating that a user interface should display a map with revenue information of provisioning entity for the given region of the map (e.g., San Francisco Bay Area), and it can generate a user interface with map 770 showing revenue information of provisioning entity over the given region of map. For example, map 770 displays provisioning entity revenue as shaded and unshaded rectangles in geo-hash regions. It will be understood that user interface 700 can further comprise representations associated with other filter (and sub-filter) selections, including but not limited to, charts 710, histograms 720, numbers 740, and time 750.

FIG. 8 shows an exemplary user interface 800 generated by a provisioning entity analysis system (e.g., provisioning entity analysis system 210), according to some embodiments. User interface 800 includes an option to add one or more new filters (e.g., add new filter 805). In some embodiments, the option to add one or more filters can include adding filters to display an entity's performance comprising either cohort analysis (e.g., cohorts 810), demographic analysis (e.g., demographics 820), geographic analysis (e.g., geographics 830), time-based analysis (e.g., time 840), and interaction analysis (e.g., interactions 850). Each of the above-recited filters can further comprise sub-filters. For example, filter demographics 820 can further comprise sub-filters associated with age of consuming entity (e.g., age 822), location of consuming entity (e.g., consuming entity zipcode 824), gender of consuming entity (e.g., gender 826), and income of consuming entity (e.g., income 828).

User interface 800 can include map 860, which can show, for example, a representation of income of consuming entities in terms of geohash regions (while shown as shaded rectangles, they can also include any unshaded rectangles). In some embodiments, after a user enters information into the add new filter (e.g., add new filter 805), the provisioning entity analysis system receives a message to regenerate or modify the user interface. For example, if a user entered demographics 820 and then income 828 into the add new filter box, the provisioning entity analysis system would receive a message indicating that a user interface should display a map with income information of consuming entity for the given region of the map (e.g., San Francisco Bay Area), and it can generate a user interface with map 860 showing a representation of income information of consuming entity using geohash regions. For example, map 860 displays consuming entity income as shaded and unshaded rectangles in geo-hash regions. In some embodiments, if a user selects geograhics 830 and then revenue 828 (to display a provisioning entity's revenue over the selected region) into the add new filter box, the provisioning entity analysis system would receive a request indicating that a user interface should display a map with revenue information of provisioning entity revenue for the given region of the map (e.g., San Francisco Bay Area), and it can generate a user interface with map 870 showing a representation of revenue information of provisioning entity revenue using geohash regions. For example, map 870 displays provisioning entity revenue as shaded and unshaded rectangles in geo-hash regions.

FIG. 9 shows an exemplary user interface 900 generated by a provisioning entity analysis system (e.g., provisioning entity analysis system 210), according to some embodiments. In addition to map-based representation (e.g., map 910 and map 920), user interface 900 can also depict an entity performance as either a graph-based representation (e.g., graph 930) or a heat-map representation (e.g., heat-map 940). In some embodiments, a user can select one or more filters (e.g., add new filter 905) to display a timeline of an aggregate spending by consuming entities. In such exemplary scenarios, provisioning entity analysis system (e.g., provisioning entity analysis system 210) can generate a user interface (e.g., graph 930) that can represent an aggregate of consuming entity spending on a daily basis at a given provisioning entity. Alternatively, the aggregate consuming entity spending on a daily basis can be displayed as a graph-based representation where the independent axis (e.g., x-axis) can represent a day and the other axis can represent aggregate consuming entity spending on a daily basis, as depicted in graph 930.

In some embodiments, a user can select one or more filters (e.g., add new filter 905) to display an hourly spending by consuming entities. In such exemplary scenarios, provisioning entity analysis system (e.g., provisioning entity analysis system 210) can generate a user interface (e.g., heat map 940) that can represent consuming entity spending on an hourly basis at a given provisioning entity. Alternatively, consuming entity spending on an hourly basis can be displayed as a heat-map representation where different shades of gray-scale can be used to show different amount of spending on an hourly basis. In some embodiments, a color coded heat-map can be used where different colors can be used to show different amount of spending on an hourly basis. While FIG. 9 depicts a few representations of entity performance, it will be understood that those representations are merely exemplary and other representations are possible within the spirit and scope of this disclosure.

Figure 10A:
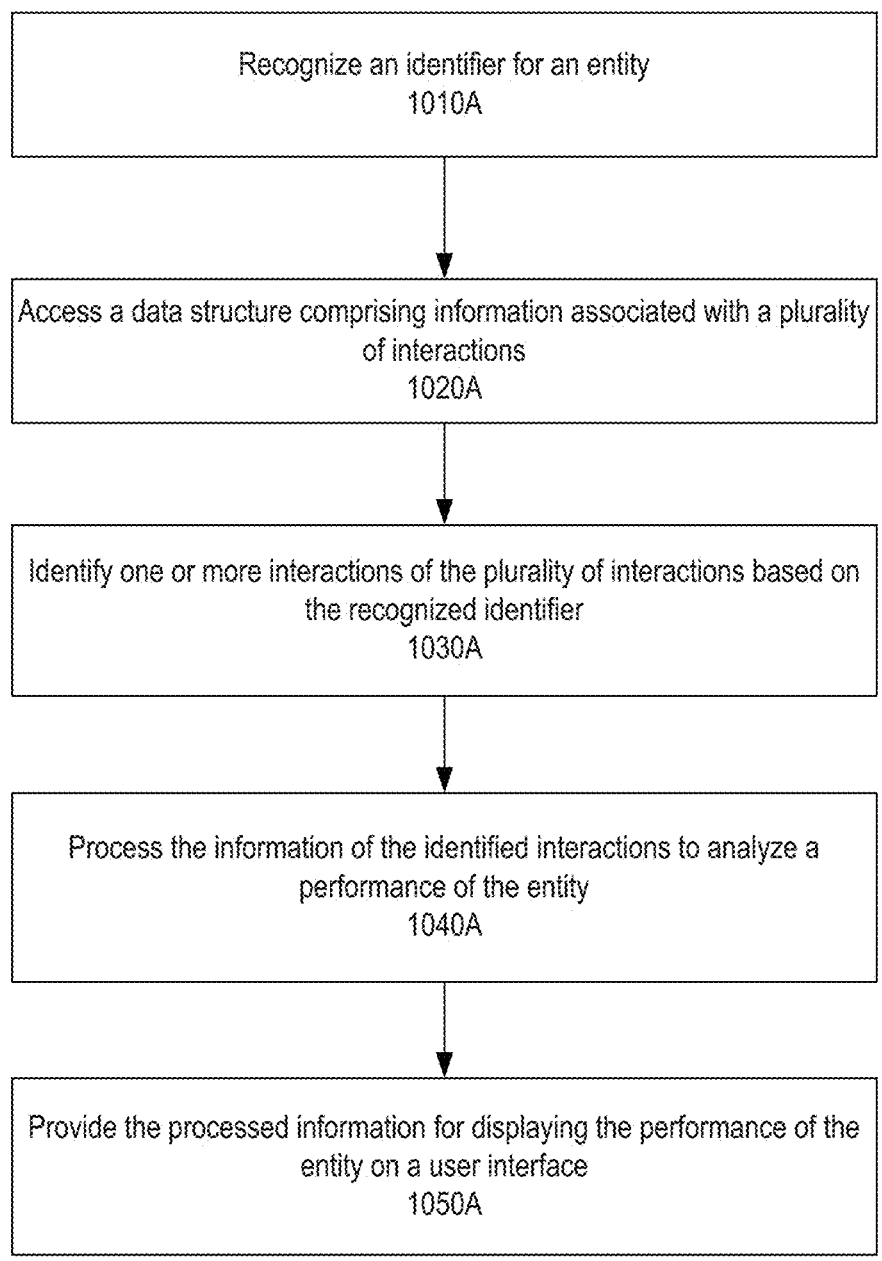
FIG. 10A is a flowchart representing an exemplary process for analyzing entity performance, consistent with the embodiments of the present disclosure.

FIG. 10A depicts a flowchart representing an exemplary process for analyzing entity performance, consistent with embodiments of the present disclosure. While the flowchart discloses the following steps in a particular order, it will be appreciated that at least some of the steps can be moved, modified, or deleted where appropriate, consistent with the teachings of the present disclosure. The analyzing of the entity performance can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1010A, an identifier associated with an entity can be recognized. In some embodiments, the entity can be a provisioning entity. Alternatively, the entity can be a consuming entity. In some embodiments, the identifier can be information associated with a provisioning entity identification category. Alternatively, the identifier can be information associated with a consuming entity identification category. It will be appreciated that other methods for recognizing an identifier associated with an entity are possible.

Next, in step 1020A, a data structure (e.g., data structure 400) comprising several categories of information and one or more interactions associated with a plurality of entities can be accessed. The data structure can represent information associated with a very large number of interactions. In some embodiments, the data structure can represent information for tens of billions of interactions (e.g., data structure 400 depicting 50 billion interactions). The data structure can be similar to the exemplary data structure 400 described in FIG. 4 above.

Next, in step 1030A, one or more interactions of the plurality of interactions can be identified based on the recognized identifier. In some embodiments, the identified interactions can be one or more interactions of the data structure that are associated with the recognized identifier of the entity. For example, the identified interactions can be one or more interactions associated with a provisioning entity identification information (e.g., provisioning entity identification category 440) or a consuming entity identification information category (e.g., consuming entity identification category 420). For an exemplary provisioning entity identification information of "Merchant 1," step 1030 can identify one or more interactions that are associated with a provisioning entity that can be identified with a name or code "Merchant 1."

In some embodiments, the accessed data structure can comprise several categories of information showing interactions associated with multiple entities. In such embodiments, the provisioning entity analysis system (e.g., provisioning entity analysis system 210) can identify some categories of the data structure that are relevant for analyzing the performance of the entity (e.g., provisioning entity) associated with the recognized identifier.

Next, in step 1040A, information associated with the identified interactions can be processed to analyze a performance of the entity. In some embodiments, processing the identified interactions can comprise creating a new data structure that is different from the data structure of step 1020A, and can comprise only the identified interactions of step 1030A or one or more subsets of those categories. Alternatively, processing the identified interactions is performed on the existing data structure of step 1020A (e.g., data structure 400).

In some embodiments, processing the information of the identified interactions can result in a multitude of useful insights regarding the behavior of consuming entities. Some of such insights, for example, can relate to the kinds of products bought by consuming entities, a location where consuming entities buy the products, a time as to when consuming entities buy the products, the frequency with which consuming entities buy the products, a location of residence of consuming entities, demographics information of consuming entities including their age and income level. It will be understood that the above-listed insights are merely exemplary and a number of other insights can be drawn within the scope and spirit of this disclosure.

Alternatively, processing the information of the identified interactions can result in a multitude of useful insights regarding the performance of provisioning entities. Some of such insights, for example, can relate to the kinds of products being sold by provisioning entities, a location where provisioning entities sell the products, a time as to when provisioning entities sell the products, a performance comparison between different locations of the same provisioning entity, and performance comparison between competing provisioning entities. It will be understood that the above-listed insights are merely exemplary and a number of other insights can be drawn within the scope and spirit of this disclosure.

In some embodiments, step 1040A can process information of a data structure that is updated in real-time. That is, processing of information can occur on the data structure that comprises up-to-date interaction data at the time of an execution of step 1040A. Alternatively, step 1040A can process information of a data structure that is not updated in real-time. That is, processing of information can occur on the data structure that does not comprise up-to-date interaction data at the time of an execution of step 1040A. For example, processing of information can occur on a data structure that is updated only periodically (e.g., on a daily or weekly basis) and not in real-time.

In some embodiments, the processed information can comprise analysis information of a first entity or a first group of entities of the plurality of entities and a second entity or a second group of entities of a plurality of entities. For example, a first entity of the one or more entities can be a provisioning entity (e.g., a home improvement store such as Lowes™) and a second entity of the one or more entities can be a provisioning entity (e.g., a home improvement store such as Home Depot™). In some embodiments, the second entity can be a competitor of the first entity. In some embodiments, the first or second group of entities of the plurality of entities can be defined such that the first or second group of entities can comprise similar characteristics. For example, the first or second group of entities can be all grocery stores within a given zip code or all Safeway™ locations within a city (e.g., San Jose, Calif.). Alternatively, the first or second group of entities can include all entities associated with the same MCC (e.g., 5542 for Automated Fuel Dispensers at a Gas Station) within a given zip code.

In some embodiments, for each entity of a plurality of entities, a group of entities (e.g., a first group of entities of the plurality of entities) associated with the entity can be identified or estimated such that the entity can analyze its own performance against the group of entities in aggregate. The group of entities can include a group of provisioning entities. For example, the group of provisioning entities associated with a first provisioning entity can be identified based on at least one of: a similarity between attributes of consuming entities that are associated with the first provisioning entity and consuming entities that are associated with other provisioning entities; a location information associated with the first provisioning entity and associated with other provisioning entities; information representing a market share associated with the first provisioning entity and a market share associated with the other provisioning entities; and information representing a wallet share associated with the first provisioning entity and a wallet share associated with the other provisioning entities. In some embodiments, the group of entities can be referred to as, for example, a cohort of entities, a set of entities, or an associated set of entities. It will be appreciated that the group of entities can be referred to by using other names.

A similarity between attributes of consuming entities that are associated with the first provisioning entity and consuming entities that are associated with other provisioning entities can be used to determine a group of provisioning entities associated with the first provisioning entity. For example, customer entity demographic information (e.g., age, gender, income, and/or location) can be analyzed between customer entities of the first provisioning entity and customer entities of the other provisioning entities to identify a group of provisioning entities that have similar customer entity demographic information. Location information associated with the first provisioning entity and with other provisioning entities can be analyzed to identify a group of provisioning entities associated with the first provisioning entity. For example, other provisioning entities that are located within a specified distance to a location of the first provisioning entity can be identified as part of the group of provisioning entities. Alternatively, other distance criteria such as, for example, same zip code, can be used to identify the group of provisioning entities. For example, a restaurant situated in an airport can be interested in analyzing its own performance relative to other restaurants situated within the same airport.

Information representing a market share associated with the first provisioning entity and a market share associated with the other provisioning entities can be used to identify a group of provisioning entities associated with the first provisioning entity. For example, a high-end bicycle store can be interested in comparing its performance against other high-end bicycle stores. In other words, a group of high-end bicycle stores can be identified based on a market share analysis of high-end bicycle stores. Information representing a wallet share associated with the first provisioning entity and a wallet share associated with the other provisioning entities can be used to identify a group of provisioning entities associated with the first provisioning entity. For example, a novelty late-night theatre can be interested in comparing its performance against other provisioning entities that also operate late-night (e.g., bars or clubs) and hence can likely compete with those entities for a consuming entity's time and money. An exemplary definition of wallet share can be a percentage of consuming entity spending over a period of time such as on a daily basis or a weekly basis etc.

In some embodiments, the group of provisioning entities can be identified by using a multi-timescale correlation comparison. One method of implementing the multi-timescale correlation comparison can be by analyzing interactions between a consuming entity and a first provisioning entity ("first provisioning entity interactions") with that of interactions between the consuming entity and a second provisioning entity ("second provisioning entity interactions"). For example, if the first provisioning entity interactions are correlated with the second provisioning entity interactions on a daily timescale but anti-correlated (or inversely correlated) on an hourly timescale, then the first provisioning entity and the second provisioning entity can be defined as complementary entities rather than competitive entities. In such scenarios, the second provisioning entity need not be part of a group of provisioning entities the first provisioning entity is interested in comparing against. Alternatively, if the first provisioning entity interactions are anti-correlated with the second provisioning entity interactions on a daily timescale but correlated on an hourly timescale, then the first provisioning entity and the second provisioning entity can be defined as competitive entities. In such scenarios, the second provisioning entity can be included in a group of provisioning entities the first provisioning entity is interested in comparing against.

In some embodiments, a competitor to the first entity can be identified or estimated based on at least one of: an MCC information associated with the first entity; a distance between a location of the first entity and a location of the competitor; and demographic information representing at least one of age, income, and gender associated with a consuming entity involved in interactions associated with the first entity.

In some embodiments, an identity of the first entity can be known and an identity of the second entity can be unknown. For example, the recognized identifier can be associated with the first entity and accordingly, an identify of the first entity can be known. In such embodiments, an identity of the second entity can be estimated based on information representing at least two attributes of the first entity. In some embodiments, the at least two attributes of the first entity can include an attribute representing a type of entity for the first identity and an attribute representing a location of the first entity. For example, knowing a type of the first entity (e.g., gas station) and location of the first entity (e.g., zip code), the data structure (e.g., data structure 400) can be analyzed to identify entities that are of the same type as that of the first entity and are in a proximity to the location of the first entity. If the estimation returns more than one possible choice for an identity of the second entity, the system can select one of the possible choices by selecting the entity that is closest in proximity to the first entity. Alternatively, other criteria can be used to select from the more than one possible choices. In some embodiments, attributes other than that of location and type of the first entity can be used to estimate the identity of the second entity.

Figure 10B:
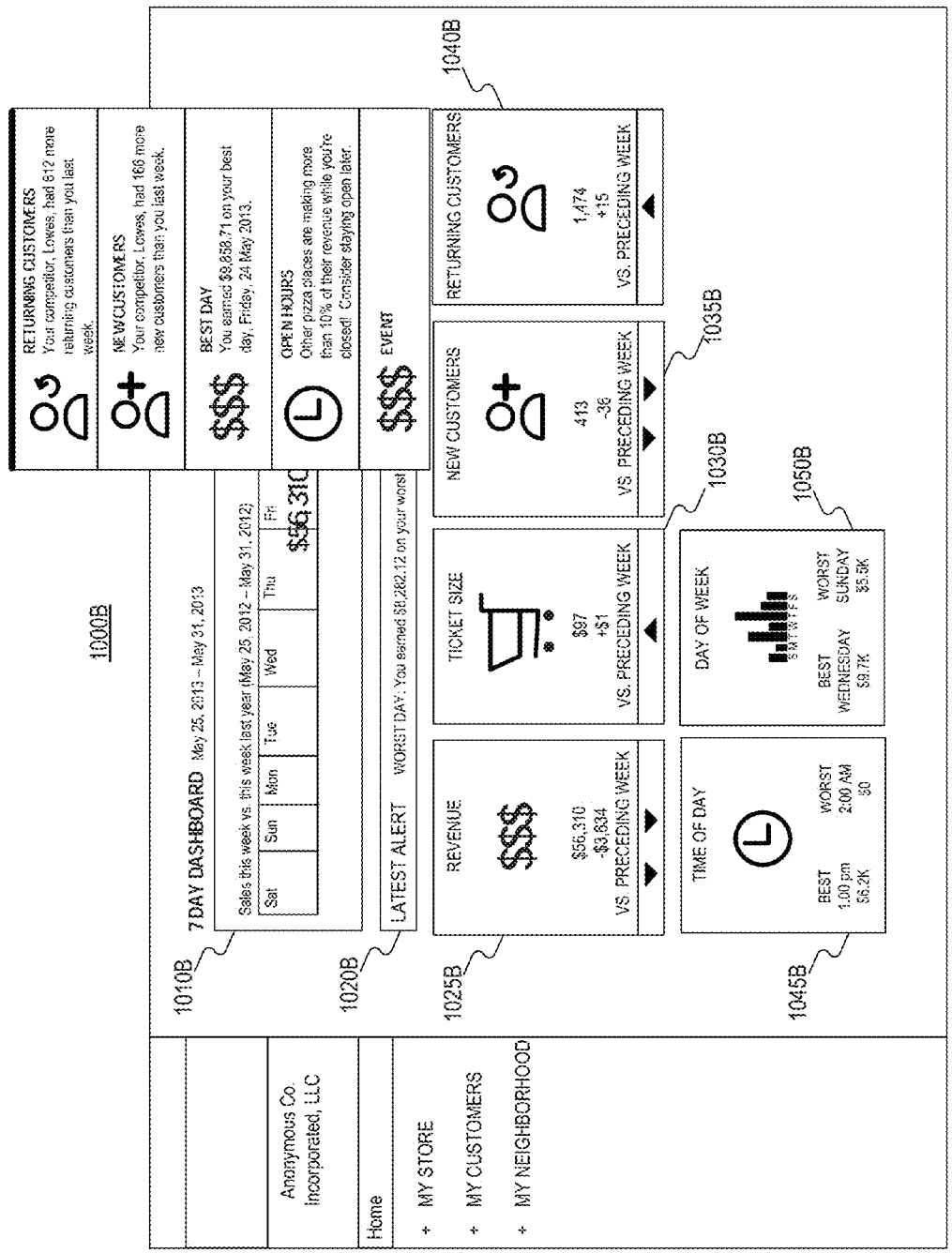
FIG. 10B is a screenshot of an exemplary user interface representing an entity performance, consistent with embodiments of the present disclosure.

Next, in step 1050A, the processed information can be provided for displaying the performance of the entity (e.g., provisioning entity) on a user interface. In some embodiments, the user interface can comprise a representation of a geographic region. The user interface can also comprise a representation of locations of the one or more entities overlaid on the geographic region; and further a representation of sub-geographic regions overlaid on a geographic region. An exemplary user interface is depicted in FIG. 10B. As shown in FIG. 10B, the user interface can include a dashboard showing a graphical representation of the performance of an entity based on recognizing an identifier for the entity.

More particularly, FIG. 10B shows an exemplary user interface 1000B that a provisioning entity analysis system (e.g., provisioning entity analysis system 210) can generate, according to some embodiments. User interface 1000B can include a dashboard (e.g., dashboard 1010B) that can depict a performance of an entity over a metric. For example, dashboard 1010B represents information of sales of the entity (e.g., a provisioning entity) over a 7-day period for the current week (May 25, 2013-May 31, 2013) compared to the same week of the previous year (May 25, 2012-May 31, 2012). In some embodiments, dashboard 1010B can represent information comparing the entity's actual revenue with the entity's expected revenue. For example, the provisioning entity can input an expected revenue for a period of time (e.g., weekly, quarterly, or yearly). After receiving information regarding the expected revenue, the provisioning entity analysis system can analyze interaction data to analyze the entity's performance relative to the expected revenue. An outcome of such comparative analysis can be represented with an exemplary bar graph or a pie chart on user interface 1000B. Alternatively, the entity's expected revenue information can be inferred without having to receive an external input representing the expected revenue. For example, the provisioning analysis system can analyze interaction data of the data structure to estimate a number for the entity's expected revenue.

In some embodiments, dashboard 1010B can be represented as a bar graph using two different fills, one fill representing sales of the current week and another representing sales from last year. It will be understood that other representations of dashboard 1010A are possible. Alternatively, the dashboard can be preconfigured to analyze interaction data for a period of time such as, for example, 7-days, one month, one quarter, one year, etc.

In some embodiments, user interface 1000B can also include a box for representing an alert (e.g., latest alert 1020B) that can indicate certain performance metrics of the entity. For example, latest alert 1020B includes information to indicate that the entity's worst day within the preconfigured period of time is May 31, 2013. A different entity performance metric can be included in latest alert 1020B. Alternatively, user interface 1000B can include user interface elements representing information associated with entity performance metrics such as revenue (e.g, revenue 1025B), amount of interaction (e.g., ticket size 1030B), new consuming entities (new consuming entities 1035B), returning consuming entities (e.g., returning consuming entities 1040B), time of interaction in a day (e.g., time of day 1045B), and interactions during a day of the week (e.g., day of week 1050B). For example, each of the above-described user interface elements can be depicted as rectangular box with an icon and some information representing the performance metric of the entity. It will be understood that in some embodiments, user interface elements can be depicted using different approaches such as, for example, charts, maps, histograms, numbers etc.

Figure 11:
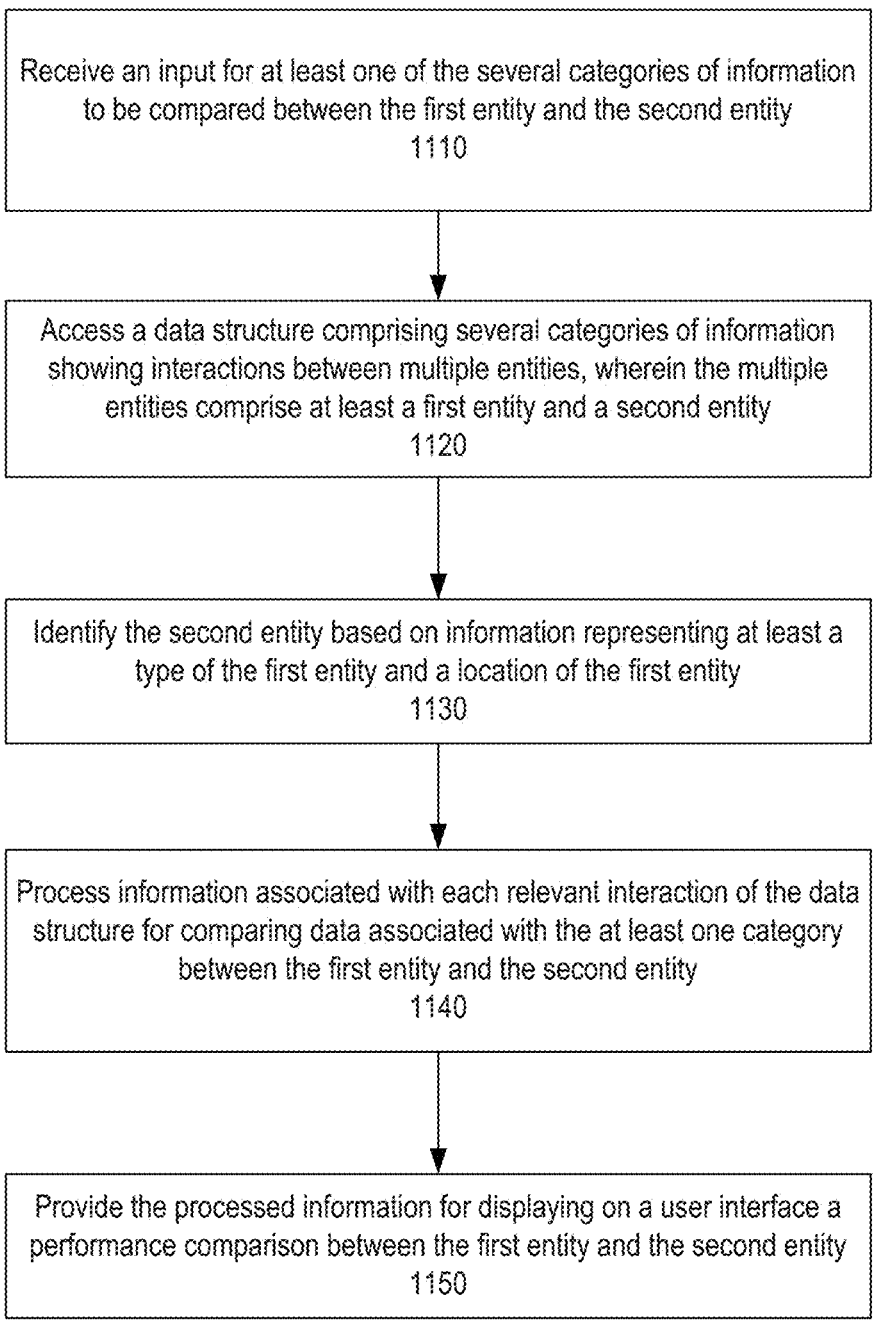
FIG. 11 is a flowchart representing an exemplary process for comparing entity performance, consistent with the embodiments of the present disclosure.

FIG. 11 depicts a flowchart representing an exemplary process for comparing entity performance, consistent with embodiments of the present disclosure. While the flowchart discloses the following steps in a particular order, it will be appreciated that at least some of the steps can be moved, modified, or deleted where appropriate, consistent with the teachings of the present disclosure. The comparing of the entity performance can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1110, an input for at least one category of information to be compared between a first entity and a second entity can be received at a provisioning entity analysis system implementing a process for comparing a performance between the first entity and a second entity. In some embodiments, the input can be received from a provisioning entity (e.g., a merchant like Lowes™), which can be interested in analyzing their performance relative to a competitor (e.g., HomeDepot™) Alternatively, a competitor to the first entity can be identified or estimated based on at least one of: an MCC information associated with the first entity; a distance between a location of the first entity and a location of the competitor; and demographic information representing at least one of age, income, and gender associated with a consuming entity involved in interactions associated with the first entity.

In some embodiments, the input can be received from a first entity, where an identity of the first entity can be known. In some embodiments, an identity of the second entity can be provided. For example, the user of the first entity can provide an identity of the second entity. Alternatively, an identity of the second entity is not provided. In exemplary embodiments where an identity of the second entity is not provided, an identity of the second entity can be estimated as described below.

In some embodiments, the received input can comprise a selection to represent data associated with at least one of: demographics; geographic; time; and transactions. Alternatively, the received input can comprise a selection to represent data associated with at least one of: charts; histograms; maps; numbers; and time. In some embodiments, the received input can be similar to one or more filter selections (e.g., add new filter 705) described in FIG. 6. An exemplary screenshot of a user interface comparing a performance of the first entity with that of the second entity can be shown in FIG. 12, described below.

Next, in step 1120, a data structure (e.g., data structure 400) comprising several categories of information showing interactions associated with multiple entities can be accessed. The data structure can represent information associated with a very large number of interactions (e.g., data structure 400 of FIG. 4. depicting 50 billion interactions). In some embodiments, the multiple entities can include at least the first entity (e.g., a first provisioning entity such as Lowes™) and the second entity (e.g., a second provisioning entity such as HomeDepot™).

Next, in step 1130, an identity of the second entity can be estimated based on information representing at least two attributes of the first entity. In some embodiments, the at least two attributes of the first entity can include an attribute representing a type of entity for the first identity and an attribute representing a location of the first entity. For example, knowing a type of the first entity (e.g., gas station) and location of the first entity (e.g., zip code), the data structure (e.g., data structure 400) can be analyzed to identify entities that are of the same type as that of the first entity and are in a proximity to the location of the first entity. If the estimation returns more than one possible choice for an identity of the second entity, the system can select one of the possible choices by selecting the entity that is closest in proximity to the first entity. Alternatively, other criteria including, attributes other than that of location and type of the first entity can be used to estimate the identity of the second entity.

Next, in step 1140, relevant interaction information associated with the at least one category of the data structure can be processed to compare a performance of the first entity with that of the second entity. In some embodiments, the processing step 1140 can be very similar to processing step 640 described above. For example, step 1140 can involve two processing operations (e.g., processing operation of step 640), one for processing the information associated with the at least one category of the first entity and another one for processing the information associated with the at least one category of the second entity. After performing such operations, step 1140 can then compare the processed information from processing the first entity with that of the second entity.

Next, in step 1150, the processed information can be provided for displaying a comparison between a performance of the first entity with that of the second entity. Exemplary user interface is depicted in FIG. 12 that illustrates a performance comparison between the first and second entities.

Figure 12:
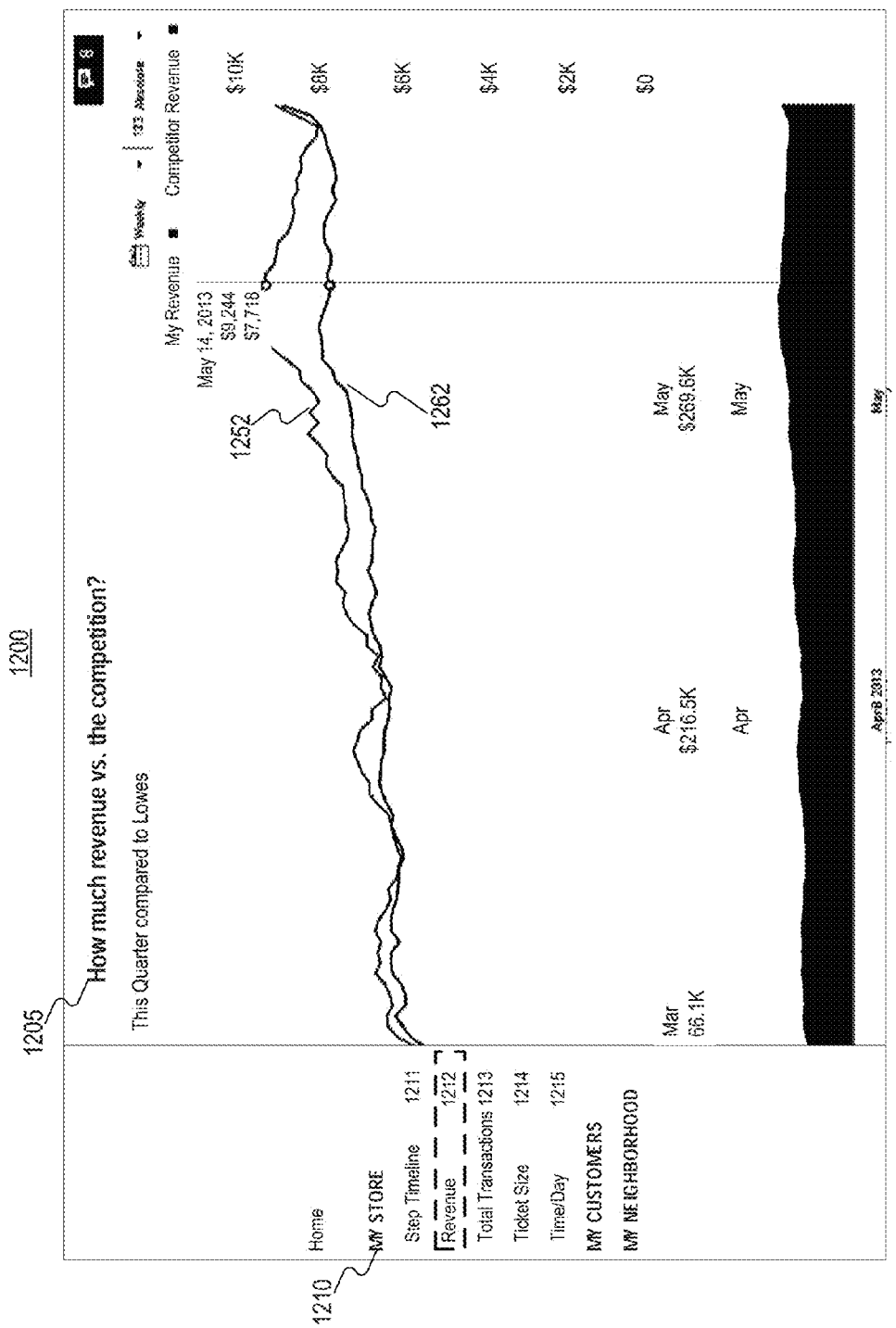
FIG. 12 is a screenshot of an exemplary user interface representing a comparison of entity performance, consistent with embodiments of the present disclosure

FIG. 12 shows a user interface 1200 generated by a provisioning entity analysis system (e.g., provisioning entity analysis system 210), according to some embodiments. In some embodiments, user interface 1200 includes an option to add one or more inputs for categories to be compared between entities. For example, user interface 1200 can include categories representing timeline 1211, revenue 1212, total transactions 1213, ticket size 1214, and time/day 1215. It will be understood that other categories can be included in user interface 1200.

User interface 1200 can depict two graphs (e.g., graph 1252 and graph 1262) to represent a performance comparison between the first entity and the second entity. For example, graph 1252 can represent a performance of the first entity for the selected category revenue 1212. In the exemplary embodiment depicted in user interface 1200, the first entity intends to compare its own revenue performance with that of one of its competitor over a given period of time (e.g., over the current quarter). Graph 1252 can represent revenue of the first entity over the current quarter whereas graph 1262 can represent revenue of the second entity (competitor to the first entity) over the same current quarter. It will be understood that in some embodiments, entity performance can be represented using different approaches such as, for example, charts, maps, histograms, numbers etc. In some embodiments, where an identity of the second entity is not known, an identity of the second entity can be estimated using the exemplary process described in FIG. 11.

Figure 13:
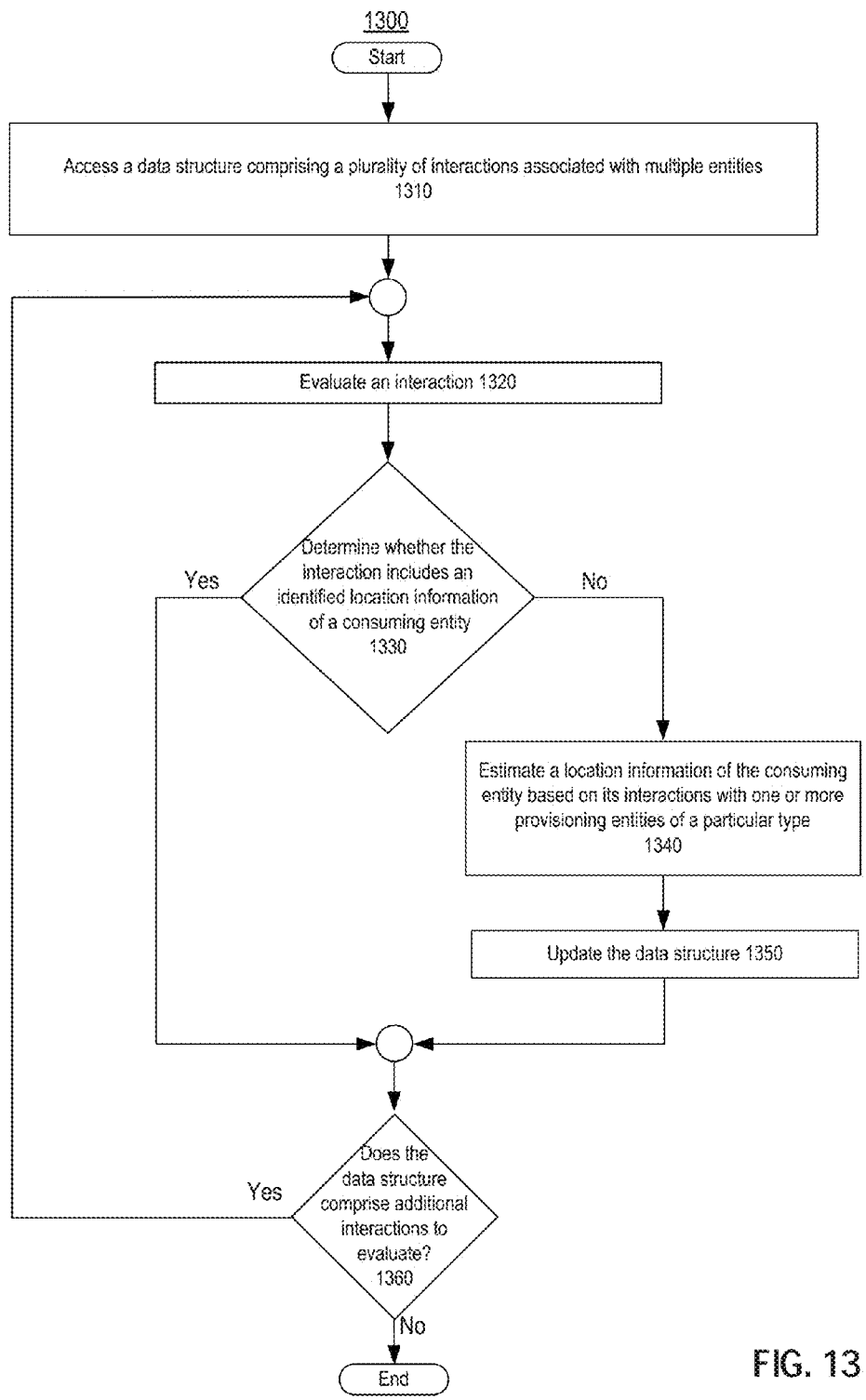
FIG. 13 is a flowchart representing an exemplary process for estimating a consuming entity's location, consistent with the embodiments of the present disclosure.

FIG. 13 depicts a flowchart representing an exemplary process 1300 for estimating a location of a consuming entity, consistent with embodiments of the present disclosure. While the flowchart discloses the following steps in a particular order, it will be appreciated that at least some of the steps can be moved, modified, or deleted where appropriate, consistent with the teachings of the present disclosure. Process 1300 can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1310, a data structure (e.g., data structure 400) comprising a plurality of interactions associated with multiple entities can be accessed. In some embodiments, the accessed data structure can comprise a plurality of categories of information showing interactions associated with multiple entities. The data structure can be similar to the exemplary data structure 400 described with reference to FIG. 4 above. The plurality of interactions of the data structure can include information associated with a consuming entity and a provisioning entity (e.g., a first provisioning entity). Each such interaction of the data structure can include at least one attribute of the consuming entity and at least one attribute of the provisioning entity. In some embodiments, the at least one attribute of the consuming entity can include a location information of the consuming entity. For some consuming entities, the location information may not be known or identified.

Moreover, in some embodiments, the at least one attribute of the provisioning entity can include an identification information of the provisioning entity. Alternatively, the at least one attribute of the provisioning entity can include an attribute other than an identification information of the provisioning entity, such as a type of the provisioning entity.

Next, in step 1320, an interaction of the data structure can be evaluated. Next, in step 1330, a determination can be made for the interaction of the data structure as to whether the interaction includes an identified location information of the consuming entity. In some embodiments, the determination can include analyzing whether the categories of information associated with a location information of the consuming entity (e.g., consuming entity location category 430) are populated or not. If it turns out that the categories of information associated with a location information of the consuming entity are populated, then the determination can return a positive indication to signify that the at least one attribute of the consuming entity includes a location information of the consuming entity and the process can then move to step 1360. If, on the other hand, the categories of information associated with a location information of the consuming entity are not populated, then the determination can return a negative indication to signify that the interaction does not include a location information of the consuming entity and the process can then move to step 1340.

In some embodiments, where the categories of information associated with a location information of the consuming entity are populated, the determination can further include verifying that the populated data is valid data that signifies a location information before the process can move to step 1360. For example, for the category of information representing zip code (e.g., zip code sub-category 456), if the populated data is 94085, it can be verified as a valid data and the process can then move step 1360. On the other hand, if the populated data is 940850, it can be verified as an invalid data for zip code as zip codes, at least in the United States, are supposed to be only five decimal numerical digits, and the process can then move to step 1340 described below. It will be understood that other methods to determine whether the interaction includes a location information of the consuming entity can be implemented within the scope and spirit of this disclosure.

Next, if the interaction of the data structure does not include an identified location information of the consuming entity, at step 1340, an estimation can be performed to determine location information of the consuming entity based on its interactions with one or more provisioning entities (e.g., second provisioning entity, for purposes of simplicity) of a particular type (e.g., type of provisioning entity category 460). For example, the second provisioning entity can be of the type including a gas station, a pharmacy, restaurant, or a grocery store. In some embodiments, location information of the consuming entity can be estimated by analyzing interactions between the consuming entity and the second provisioning entity. For example, interactions between the consumer entity and a type of provisioning entity that represents gas stations can be analyzed such that the gas station at which the consuming entity most frequently fills up gas can be identified as a location of the consuming entity. This is because it can be reasonable to assume that the consuming entity can frequently fill up gas at a gas station that is in a proximity to the residential location of the consuming entity. In some embodiments, interactions between the consumer entity and a type of provisioning entities that represent gas stations can result in similar number of interactions between two different gas stations in two different locations (e.g., zip codes). In such embodiments, one method of estimating a location of the consuming entity is to then analyze interactions between the consuming entity and a third provisioning entity that can represent grocery stores because it can be reasonable to assume that the consuming entity would more often than not shop for groceries at a location closer to residential location of the consuming entity. Moreover, in some embodiments, the estimating of a location can take into consideration the date (e.g., weekend) and or time (e.g., typical times before or after work) of an interaction with a type of provisioning entity. Based on analyzing interactions with the third provisioning entity (such as grocery stores) and combining such analysis with that of the interactions with the second provisioning entity (such as gas stations), an estimation can be made regarding a location of the consuming entity.

In some embodiments, step 1340 can estimate a location information of the consuming entity after the determination returns that the at least one attribute of the consuming entity includes an invalid location information of the consuming entity by using similar techniques as described above. It will be understood that the above-recited estimation techniques are merely exemplary and not intended to be limiting.

Next, in step 1350, the data structure can be updated with an estimated location information of the consuming entity. In some embodiments, data associated with only the evaluated interaction can be updated. Alternatively, data associated with all interactions associated with the consuming entity can be updated irrespective of whether those interactions were previously evaluated or not. Next, in step 1360, a determination can be made whether the data structure comprises additional interactions that are to be evaluated. If the determination returns an answer in the positive, signifying that there are additional interactions that are to be evaluated, the process can go back to step 1320 to evaluate another interaction and further to repeat the process comprising steps 1320 through 1360, as described above. On the other hand, if the determination returns an answer in the negative, signifying that there are no additional interactions that are to be evaluated, the process can end.

In some embodiments, a provisioning entity analysis system can resolve the name of a provisioning entity. A data structure storing information associated with billions of interactions can include millions of provisioning entities and it is possible that some of the names of the provisioning entities are not consistent. For example, the name of provisioning entity "McDonalds's" can be indicated by a number of combinations such as, "McDonald's," "Mc Donalds," "mcdonalds," "Mcdonald's," etc. While each of the above-recited names can be intended to indicate the same entity, some processing can be necessary before the system can analyze all such names as the same entity. Exemplary methods for resolving a name of provisioning entities are described in U.S. Non-Provisional patent application Ser. No. 13/827,491, titled Resolving Similar Entities From A Transaction Database filed on Mar. 14, 2013, the entirety of which is expressly incorporated herein by reference.

An exemplary method of resolving a provisioning entity name can include a number of factors including, but not limited to, categories of information associated with interactions, analyzing interactions associated with competitive and/or complementary provisioning entities. Such exemplary method can result in a significant uplift in accuracy in resolving the name of provisioning entities. In some embodiments, a percentage accuracy in resolving the name of provisioning entities can be increased to high nineties (e.g., 97%).

Figure 14:
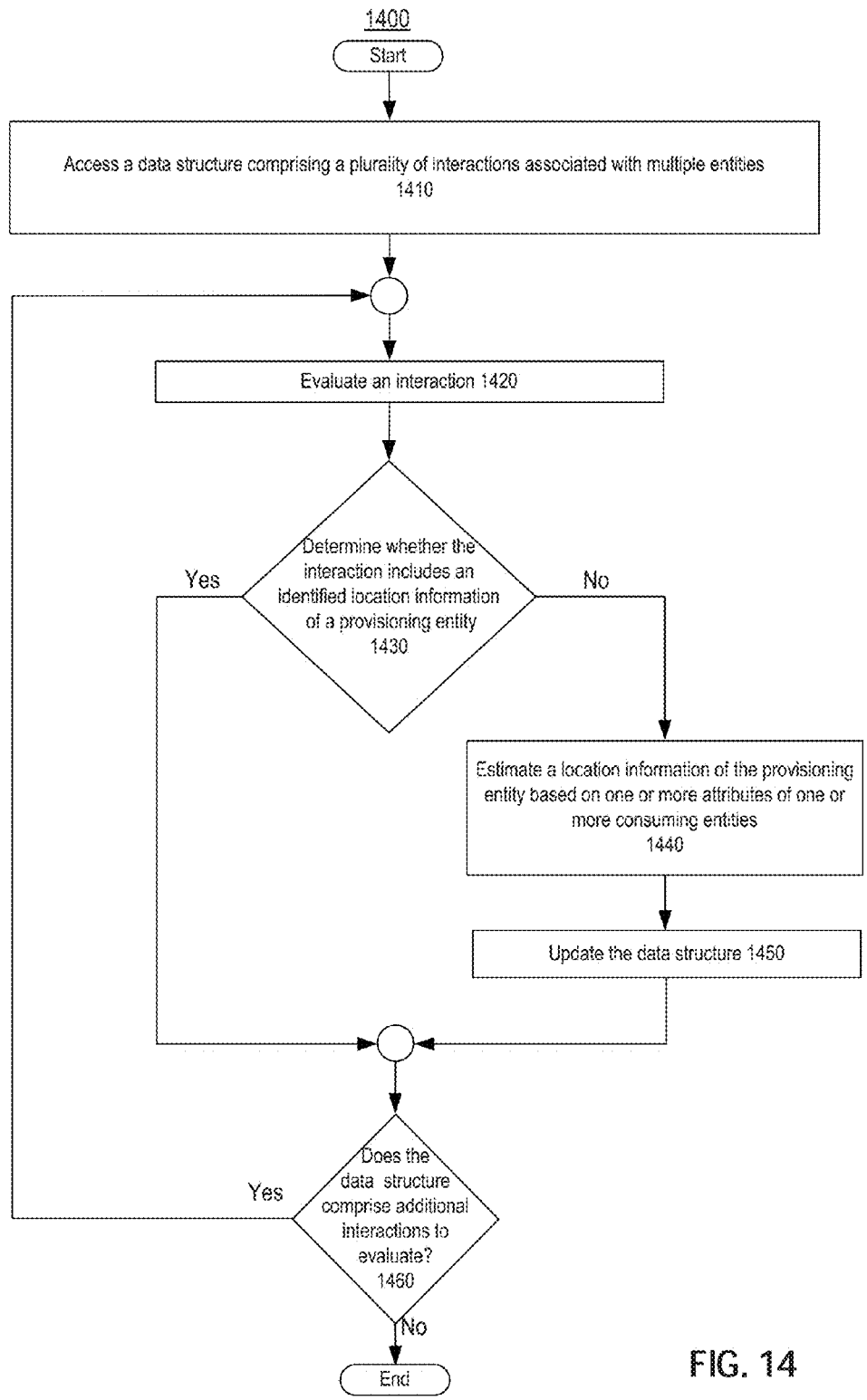
FIG. 14 is a flowchart representing an exemplary process for estimating a provisioning entity's location, consistent with the embodiments of the present disclosure.

FIG. 14 depicts a flowchart representing an exemplary process for estimating a location of a provisioning entity, consistent with embodiments of the present disclosure. While the flowchart discloses the following steps in a particular order, it will be appreciated that at least some of the steps can be moved, modified, or deleted where appropriate, consistent with the teachings of the present disclosure. Process 1400 can be performed in full or in part by a provisioning entity analysis system (e.g., provisioning entity analysis system 210). It is appreciated that some of these steps can be performed in full or in part by other systems (e.g., such as those systems identified above in FIG. 2).

In step 1410, a data structure (e.g., data structure 400) comprising a plurality of interactions associated with multiple entities can be accessed. In some embodiments, the accessed data structure can comprise a plurality of categories of information showing interactions associated with multiple entities. The data structure can be similar to the exemplary data structure 400 described with reference to FIG. 4 above. The plurality of interactions of the data structure can include a consuming entity and a provisioning entity. Each such interaction of the data structure can include at least one attribute of the consuming entity and at least one attribute of the provisioning entity. In some embodiments, the at least one attribute of the consuming entity can include a location information of the consuming entity. For some consuming entities, the location information may not be known or identified.

Moreover, in some embodiments, the at least one attribute of the provisioning entity can include an identification information of the provisioning entity. In some embodiments, the at least one attribute of the provisioning entity can include an attribute other than an identification information of the provisioning entity.

Next, in step 1420, an interaction of the data structure can be evaluated. Next, in step 1430, a determination can be made for the interaction of the data structure as to whether the interaction includes an identified location information of the provisioning entity. In some embodiments, similar to the step 1330 of FIG. 13, the determination can include analyzing whether the categories of information associated with a location information of the provisioning entity are populated or not. If it turns out that the categories of information associated with a location information of the provisioning entity are populated, then the determination can return a positive indication to signify that the at least one attribute of the provisioning entity includes an identified location information of the provisioning entity and the process can then move to step 1460. If, on the other hand, the categories of information associated with a location information of the provisioning entity are not populated, then the determination can return a negative indication to signify that the interaction does not include a location information of the provisioning entity and the process can move to step 1440.

In some embodiments, where the categories of information associated with a location information of the provisioning entity are populated, the determination can further include verifying that the populated data is valid data that signifies a location information before the process moves to step 1460. For example, for the category of information representing zip code (e.g., zip code sub-category 456), if the populated data is 94085, it can be verified as a valid data and the process can then move to step 1460. On the other hand, if the populated data is 940850, it can be verified as an invalid data for zip code as zip codes, at least in the United States, are supposed to be only five decimal numerical digits and the process can then move to step 1440 as described below. It will be understood that other methods to determine whether the interaction includes a location information of the provisioning entity can be implemented within the scope and spirit of this disclosure.

Next, if the interaction of the data structure does not include an identified location information of the provisioning entity, step 1440 can estimate a location information of the provisioning entity based on one or more attributes of one or more consuming entities. In some embodiments, step 1440 can estimate a location information of the provisioning entity based on one or more attributes of one or more consuming entities and further based on one or more attributes of the provisioning entity. For example, the one or more attributes of the one or more consuming entities can be a location information of the one or more consuming entities and the one or more attributes of the provisioning entity can be an identification information of the provisioning entity (e.g., provisioning entity identification category 440). In some embodiments, a determination can be made based on identification information of the provisioning entity to find out whether the provisioning entity has more than one location. If the determination returns an answer in the negative, signifying that the provisioning entity only has one location, information representing such location can be identified by performing a search query over the Internet using a search engine (e.g., Google Search™).

In some embodiments, when the determination returns an answer in the positive, signifying that there is more than one location for the provisioning entity, a location information of the provisioning entity can be estimated based on at least a location information of the consuming entity and an identification information of the provisioning entity. For example, knowing a location information of the consuming entity (e.g., zip code of the consuming entity), a search query can be requested to find out a location information of the provisioning entity that is closest to the location of the consuming entity. In some embodiments, the location information returned by the search query can be an estimated location information of the provisioning entity. Alternatively, when there is more than one location for the provisioning entity, a location information of the provisioning entity can be estimated by looking at a frequency of interactions between the consuming entity and each location of the provisioning entity. For example, a provisioning entity can be the grocery store, Safeway™, which can have multiple locations in a given zip code (e.g., 94086) of the consuming entity. If the location of the Safeway™ where one or more interactions with a consuming entity occurred is unknown, interactions between the same consuming entity and all Safeway™ locations within the given zip code of the consuming entity can be analyzed such that the Safeway™ location that is involved with the most number of interactions can be selected as an estimated location of the Safeway™ for the one or more interactions. It will be understood that the above-recited estimation techniques are merely exemplary and not intended to be limiting.

Next, in step 1450, the data structure can be updated with an estimated location information of the provisioning entity. In some embodiments, data associated with only the evaluated interaction can be updated. Alternatively, data associated with all interactions associated with the consuming entity and the provisioning entity can be updated irrespective of whether those interactions were previously evaluated or not. Next, in step 1460, a determination can be made whether the data structure comprises additional interactions that are to be evaluated. If the determination returns an answer in the positive, signifying that there are additional interactions that are to be evaluated, the process can go back to step 1420 to evaluate another interaction and further to repeat the process comprising steps 1420 through 1460, as described above. On the other hand, if the determination returns an answer in the negative, signifying that there are no additional interactions that are to be evaluated, the process can end.

Figure 15:
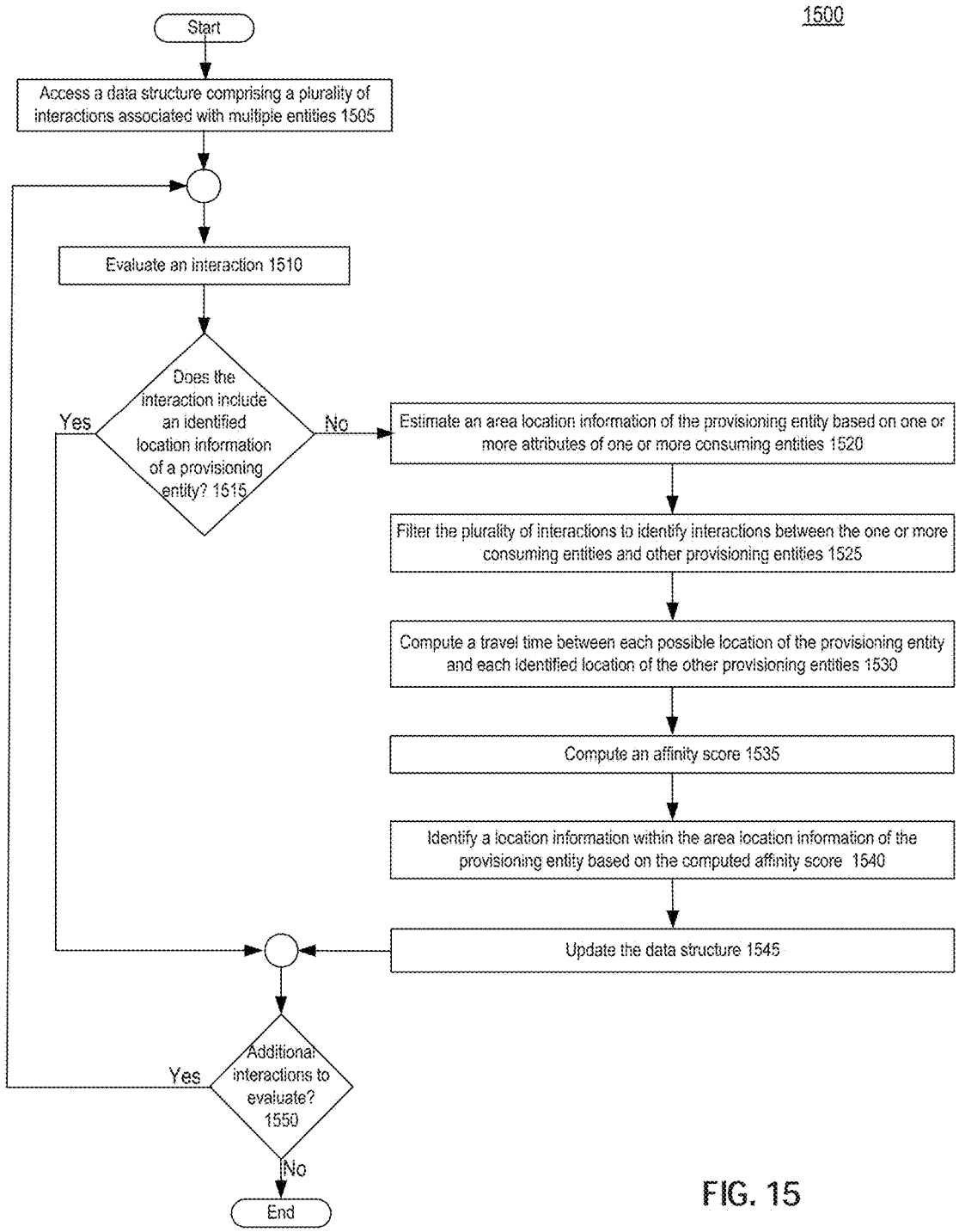
FIG. 15 is a flowchart representing an exemplary process for estimating a provisioning entity's location, consistent with the embodiments of the present disclosure.

FIG. 15 depicts a flowchart representing an exemplary process for estimating a location of a provisioning entity, consistent with embodiments of the present disclosure. While the flowchart discloses the following steps in a particular order, it will be appreciated that at least some of the steps can be moved, modified, or deleted where appropriate, consistent with the teachings of the present disclosure. Process 1500 can be performed in full or in part by a provisioning entity analysis system (e.g., provisioning entity analysis system 210). It is appreciated that some of these steps can be performed in full or in part by other systems (e.g., such as those systems identified above in FIG. 2).

The exemplary process of FIG. 15 can depict a multi-step process for estimating location information of a provisioning entity. Initially, an area location information can be estimated to represent a location information of the provisioning entity broadly. For example, an area location information for a grocery store like Safeway™ can be as broad as a state (e.g., California) or county (e.g., Santa Clara County) such that Safeway™ can comprise multiple possible locations within the area location. Later, a location information can be estimated to identify a specific location of the provisioning entity from its multiple possible locations within the area location. For example, if the area location information represents Santa Clara County comprising of ten possible Safeway™ locations, the estimated location information can represent one of the ten possible locations within Santa Clara County using either a street address or other unique identifier for the location (e.g., zip code if there is only one store location for the zip code). An exemplary multi-step process is described below.

In step 1505, a data structure (e.g., data structure 400) comprising a plurality of interactions associated with multiple entities can be accessed. In some embodiments, the accessed data structure can comprise a plurality of categories of information showing interactions associated with multiple entities. The data structure can be similar to the exemplary data structure 400 described with reference to FIG. 4 above. The plurality of interactions of the data structure can include consuming entities and provisioning entities. Each such interaction of the data structure can include at least one attribute of the consuming entity and at least one attribute of the provisioning entity. The at least one attribute of the consuming entity can include location information of the consuming entity. For some consuming entities, the location information may not be known or identified. Moreover, in some embodiments, the at least one attribute of the provisioning entity can include an identification information of the provisioning entity. Alternatively, the at least one attribute of the provisioning entity can include an attribute other than an identification information of the provisioning entity.

The provisioning entity analysis system can receive an input that can be used in a process to fill in any missing categories of information associated with an interaction. For example, the received input can be "canonical data" that can be used to estimate identification information of the provisioning entity. An exemplary canonical data can comprise data that can be received from external to the provisioning entity analysis system (e.g., Yelp™). For example, if a provisioning entity associated with an interaction is an Italian restaurant, the provisioning entity category 460 can be represented by an MCC 5812 signifying it as a restaurant but might not be able to signify that it is an Italian restaurant. In such a scenario, canonical data such as Yelp™ review information can be analyzed to further identify the provisioning entity as an Italian restaurant. Another example for applying received canonical data can be to differentiate between an entity that is no longer in business from an entity that might have changed its name. In this example, canonical data can be received from an external source (e.g., Factual™) that can comprise a "status" flag as part of its data, which can signify whether the entity is no longer in business.

Next, in step 1510, an interaction of the data structure can be evaluated. Next, in step 1515, a determination can be made for the interaction of the data structure as to whether the interaction includes an identified location information of the provisioning entity. In some embodiments, similar to the step 1430 of FIG. 14, the determination can include analyzing whether the categories of information associated with a location information of the provisioning entity are populated or not. If it turns out that the categories of information associated with a location information of the provisioning entity are populated, then the determination can return a positive indication to signify that the at least one attribute of the provisioning entity includes an identified location information of the provisioning entity and the process can then move to step 1555. If, on the other hand, the categories of information associated with a location information of the provisioning entity are not populated, then the determination can return a negative indication to signify that the interaction does not include location information of the provisioning entity and the process can move to step 1520.

In some embodiments, where the categories of information associated with location information of the provisioning entity are populated, the determination can further include verifying that the populated data is valid data that signifies a location information before the process moves to step 1555. For example, for the category of information representing zip code (e.g., zip code sub-category 456), if the populated data is 94085, it can be verified as a valid data and the process can then move to step 1555. On the other hand, if the populated data is 094085, it can be verified as an invalid data for zip code as zip codes, at least in the United States, are typically only five decimal numerical digits and the process can then move to step 1520 as described below. It will be appreciated that other methods to determine whether the interaction includes location information of the provisioning entity can be implemented within the scope and spirit of this disclosure.

Next, if the interaction of the data structure does not include identified location information of the provisioning entity, step 1520 can estimate an area location information of the provisioning entity based on one or more attributes of one or more consuming entities. In some embodiments, step 1520 can estimate the area location information of the provisioning entity based on one or more attributes of one or more consuming entities. Alternatively, step 1520 can estimate the area location information of the provisioning entity based on one or more attributes of one or more consuming entities and further based on one or more attributes of the provisioning entity. For example, the one or more attributes of the one or more consuming entities can be a location information of the one or more consuming entities and the one or more attributes of the provisioning entity can be an identification information of the provisioning entity (e.g., provisioning entity identification category 440). Alternatively, a determination can be made based on identification information of the provisioning entity to find out whether the provisioning entity has more than one location. If the determination returns an answer in the negative, signifying that the provisioning entity only has one location, information representing such location can be identified by performing a search query over the Internet using a search engine (e.g., Google Search™) and such information can be identified as an estimated first location information of the provisioning entity.

In some embodiments, when the determination returns an answer in the positive, signifying that there is more than one possible location for the provisioning entity, an area location information of the provisioning entity can be estimated based on at least a location information of the consuming entity and an identification information of the provisioning entity. For example, knowing a location information of the consuming entity (e.g., zip code of the consuming entity), a search query can be requested to find out the area location information of the provisioning entity that is within a predetermined distance (e.g., within the same zip code) to the location of the consuming entity. The location information returned by the search query can be an estimated first location information of the provisioning entity.

Next, in step 1525, the plurality of interactions can be filtered to identify other interactions (e.g., interactions other than the first interaction) between the one or more consuming entities and other provisioning entities (i.e., provisioning entities other than the provisioning entity associated with the interaction and with an unidentified location). For example, step 1525 can filter other interactions such that interactions without an indication of location information associated with the other provisioning entities need not be analyzed. In some embodiments, the filtered interactions can be analyzed to filter provisioning entities based on a received canonical input data. For example, if the received canonical input data comprises an identification information that might be missing in data structure 400, the system can filter the interactions further to only analyze those interactions associated with provisioning entities with an identification information that meet the criteria set by the received canonical data. It will be appreciated that other forms of canonical data can be received within the scope of this disclosure.

Figure 16A:
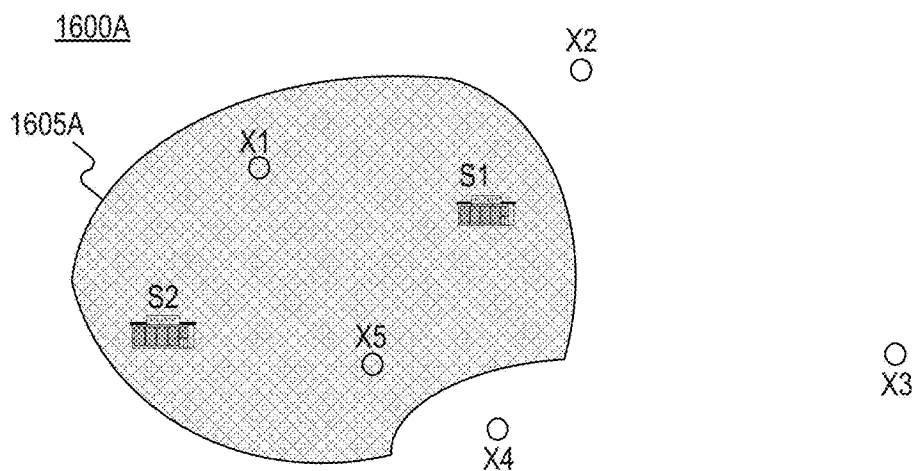
FIGS. 16A, 16B, and 16C are block diagrams representing a method of computing travel times between two provisioning entities, consistent with the embodiments of the present disclosure.

Next, in step 1530, a travel time can be computed between a location of a first provisioning entity to that of a location of a second provisioning entity. In some embodiments, the first provisioning entity can be the provisioning entity with an estimated area location and the second provisioning entity can be any provisioning entity other than the first provisioning entity. For each interaction of step 1510 and its associated consuming entity, the second provisioning entity can be any provisioning entity other than the first provisioning entity that is associated with other interactions of the consuming entity. Step 1530 can be explained with the block diagrams of FIGS. 16A, 16B, and 16C, which depicts two provisioning entities, S1 and S2, five interactions, X1-X5, and exemplary travel times (e.g., $T_{S1-X1}$). Provisioning entities S1 and S2 can be two different locations within a chain of stores associated with the same provisioning entity and situated within an area location information estimated in step 1520. For example, S1 and S2 can be two different locations of Safeway™ situated within an estimated area location (e.g., zip code 94086). The area location information can be depicted with a shaded region and labeled as element 1605A in FIGS. 16A, 16B, and 16C. As shown in FIG. 16A, the five interactions, X1-X5, can represent interactions between the consuming entity associated with the interaction of step 1510 and a provisioning entity other than S1 or S2. While FIGS. 16A, 16B, and 16C, depict locations of two provisioning entities and locations of five interactions, it will be appreciated that this disclosure is applicable to embodiments involving any number of provisioning entities and any number of interactions.

Figure 16B:
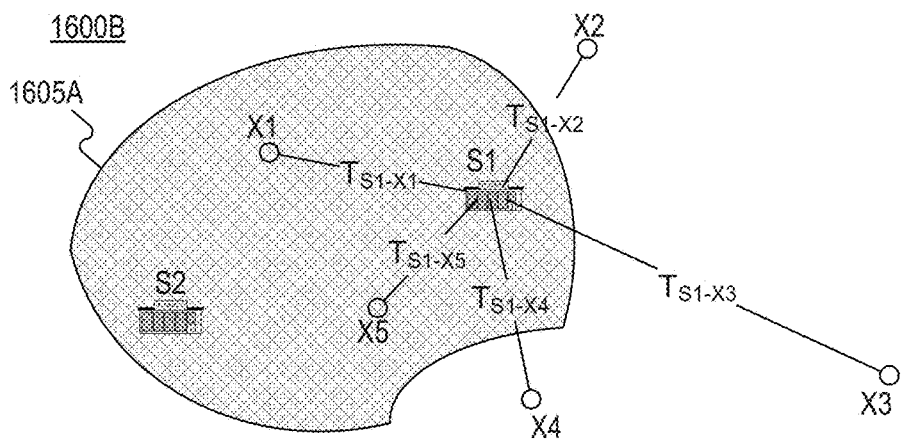

FIG. 16B depicts travel times between the Safeway™ location, S1, and a provisioning entity involved in each of the interactions, X1-X5. While the travel times are illustrated as aerial travel times, it is appreciated that the travel times can take into consideration roads, sidewalks, bike lanes, etc. For example, travel time between the location S1 and location of provisioning entity involved in interaction X1, can be represented by the line $T_{S1-X1}$. Travel time $T_{S1-X1}$ can be computed using real-time traffic conditions or based on historical traffic conditions. Similarly, travel times can be computed between S1 and each location of provisioning entities associated with interactions X2 through X5. Such travel times can be labeled as $T_{S1-X2}$ through $T_{S1-X5}$, as depicted in FIG. 16B.

Figure 16C:
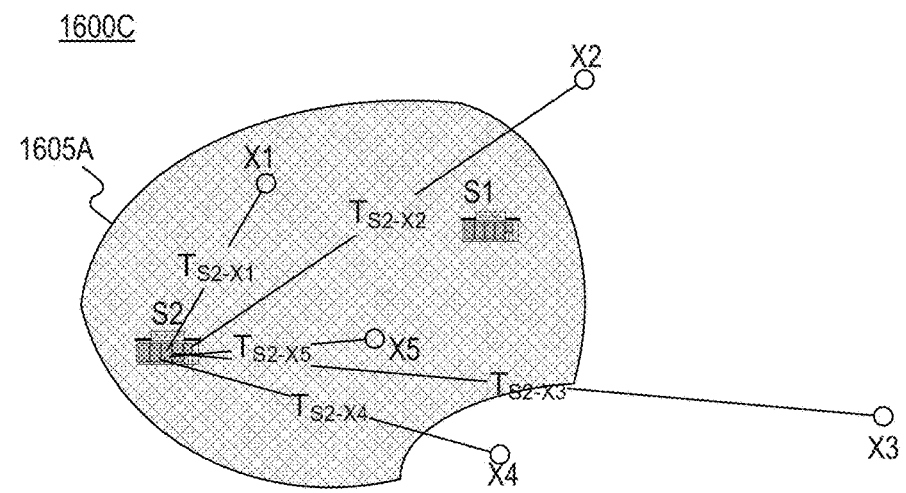

FIG. 16C depicts travel times between the other possible Safeway™ location, S2, and a provisioning entity involved in each of the interactions, X1-X5. This process can be very similar to that of FIG. 16B described above. For example, travel time between the location S2 and location of provisioning entity involved in interaction X1, can be represented by the line $T_{S2-X1}$. Travel time $T_{S2-X1}$ can be computed using real-time traffic conditions or based on historical traffic conditions. Similarly, travel times can be computed between S2 and each location of provisioning entities associated with interactions X2 through X5. Such travel times can be labeled as $T_{S2-X2}$ through $T_{S2-X5}$, as depicted in FIG. 16C.

Next, referring back to FIG. 15, in step 1535, an affinity score can be computed. In some embodiments, an affinity score can be computed for each possible location of the provisioning entity within the estimated area location. The computed affinity score can be based on the computed travel times such that the affinity score can have an inverse proportionality with computed travel times such that the lower the travel time the higher an affinity score. For example, based on the exemplary travel times depicted in FIGS. 16A, 16B, and 16C, it is possible that the affinity score associated with location S1 is likely higher than that of location S2 because travel times associated with S1 are lower than that of S2. Affinity score can be computed based on an average travel time for all interactions. Alternatively, affinity score can be computed by aggregating travel times of all interactions for each location S1 and S2. It will be appreciated that the above-described methods are merely exemplary and other methods of computing an affinity score based on travel times are possible within the scope of this disclosure. Alternatively, the computed affinity score can be normalized (e.g., can be normalized to comprise a value between 0 and 1, with 0 representing no affinity and 1 representing maximum possible affinity). Moreover, while the affinity score can have an inverse relationship with the computed travel times, it is appreciated that the affinity score can have a proportional relationship to the computed travel times.

Next, in step 1540, the computed affinity score can be used to estimate a location information within the estimated area location for the provisioning entity without an identified location information. For example, a location can be estimated by selecting the location which has the highest affinity score amongst all possible locations within the area location. That is, in the exemplary embodiment of FIG. 16, location S1 can be selected as the affinity score associated with location S1 is likely higher than that of location S2, as described above. It will be appreciated that other methods of estimating a second location information based on an affinity score are possible. Alternatively, the computed affinity score can be used in conjunction with an algorithm to estimate a second location information within the area location information.

In some embodiments, when there is more than one possible location for the provisioning entity without an identified location information, a location information within the area location of the provisioning entity can be estimated by analyzing interactions between the consuming entity and other provisioning entities within the location of the consuming entity (e.g., zip code of the consuming entity) that are closely spaced in time relative to the interaction that does not include an identified location information of the provisioning entity. For example, a first interaction that does not include an identified location information of the provisioning entity can include a timestamp (e.g., time of interaction category 480) associated with the first interaction. To estimate a location information for the provisioning entity associated with the first interaction, the system can analyze other interactions (e.g., interactions other than the first interaction) associated with the consuming entity that occurred within the same location of the consuming entity (e.g., zip code of the consuming entity), occurred within a short time interval of the timestamp of the first interaction (e.g., within 10 minutes of the timestamp), and which further include an identified location information for the provisioning entities associated with the other interactions.

Alternatively, when there is more than one possible location for the provisioning entity, a location information within the area location of the provisioning entity can be estimated by looking at a frequency of interactions between the consuming entity and each possible location of the provisioning entity. For example, a provisioning entity can be the grocery store, Safeway™, which can have multiple locations in a given city (e.g., Sunnyvale Calif.) of the consuming entity. Interactions between the consuming entity and all Safeway™ locations within the given city of the consuming entity can be analyzed such that the Safeway™ location that is involved with the most number of interactions can be selected as an estimated location within the area location of the Safeway™ for the one or more interactions. It will be understood that the above-recited estimation techniques are merely exemplary and not intended to be limiting Next, an accuracy check of the estimated location information within the area location can be performed. In some embodiments, the accuracy check can comprise verification that the estimated location information is one of the possible locations within the estimated area location of the provisioning entity. Alternatively, the accuracy check can comprise verification that the estimated location information is a valid location information. For example, if the estimated location information is a street address, then the accuracy check can involve verifying that the estimated street address is a valid street address based on an Internet-based search using a search engine (e.g., Google Search™).

Next, in step 1545, the data structure can be updated with an estimated location information of the provisioning entity. In some embodiments, the data structure can be updated with either an estimated area location information or an estimated location within the area location information. Alternatively, the data structure can be updated with both the estimated area location information and the estimated location information within the area location. In some embodiments, data associated with only the evaluated interaction can be updated. Alternatively, data associated with all interactions associated with the consuming entity and the provisioning entity can be updated irrespective of whether those interactions were previously evaluated or not. Next, in step 1550, a determination can be made whether the data structure comprises additional interactions that are to be evaluated. If the determination returns an answer in the positive, signifying that there are additional interactions that are to be evaluated, the process can go back to step 1510 to evaluate another interaction and further to repeat the process comprising steps 1510 through 1550, as described above. On the other hand, if the determination returns an answer in the negative, signifying that there are no additional interactions that are to be evaluated, the process can end.

In some embodiments, a provisioning entity analysis system can predict a purchasing pattern of consuming entities. For example, a provisioning entity (e.g., a large national retailer in the grocery business like Safeway™) can be interested in predicting purchasing patterns of consuming entities in order to make decision such as opening new stores or closing existing stores. One method of predicting purchasing patterns can be to analyze interactions of consuming entities with the provisioning entity. For example, if Safeway™ is interested in opening new store by predicting purchasing patterns of their customers of an existing location, the customer interactions at the existing location can be analyzed to understand where the customers are located by processing location information of the customers. Based on the processed location information of the customers of the existing location, Safeway™ might be able to make a decision on a location for their new location.

Another method of predicting purchasing patterns can be to analyze interactions between the consuming entities and other provisioning entities, where the other provisioning entities can be either a competitor of or complementary to the provisioning entity. For example, if Safeway™ is interested in opening new store by predicting purchasing patterns of their customers of an existing location, interactions of the customers of the existing locations that are associated with a competitive entity or a complementary entity can be analyzed. An exemplary complementary entity can be a gas station or a pharmacy because it can be reasonable to assume that consumers frequently shop at a pharmacy or a gas station that is close to their residential location. Accordingly, by analyzing interactions that are associated with a complementary entity to estimate a residential location information of consumers, Safeway™ can make a decision on a location for their new location.

FIGS. 17-26 are screenshots of exemplary user interfaces, consistent with the embodiments of the present disclosure. These user interfaces can be provided based on an analysis of a data structure (e.g., data structure 400 of FIG. 4) performed by a provisioning entity analysis system (e.g., provisioning entity analysis system 210). FIG. 17 illustrates an exemplary user interface 1700 that a provisioning entity analysis system (e.g., provisioning entity analysis system 210) can generate, according to some embodiments. In some embodiments, the exemplary user interface includes a dashboard, e.g a small business portal dashboard (SBP) dashboard, that can depict a performance of an entity over a metric. For example, the SBP dashboard represents revenue information of the entity (e.g., a provisioning entity) for the current week (May 26, 2013-Jun. 2, 2013). In some embodiments, the SBP dashboard represents revenue information comparing the entity's actual revenue to the entity's goal revenue for the week. For example, the provisioning entity can enter a goal revenue for a period of time (e.g., weekly, quarterly, or yearly). After receiving information regarding the expected revenue, the provisioning entity analysis system can analyze interaction data to analyze the entity's performance relative to the goal revenue. An outcome of such comparative analysis can be represented with an exemplary bar graph or pie chart. For example, the middle portion of FIG. 17 depicts that the entity has received $48,078 in revenues for the current week, and the entity's goal revenue for that week is $63,933.

In some embodiments, user interface 1700 can include a plurality of user interface elements representing information associated with entity performance metrics such as revenue, ticket size, new customers, and returning customers. For example, as shown in FIG. 17, each of the above-described user interface elements can be depicted as a rectangular box with an icon and some information representing the performance metric of the entity. The entity can customize what metrics are displayed and how those metrics are displayed. The user interface elements, when clicked on, can provide access to other user interfaces, depicting additional information for the selected performance metric.

User interface 1700 can include a sidebar with expandable labels depicting, for example, "My Store," "My Customers," and "My Neighborhood." Each of these labels can provide access to additional user interfaces that depict additional information for these metrics. For example, clicking on the "My Store" label can expand the label to show submenus corresponding to "Revenue," "Total Transactions," "Ticket Size," "Busiest Days," and "Busiest Hours." Each of these submenus can provide access to another user interface, providing additional information for each category.

Figure 18:
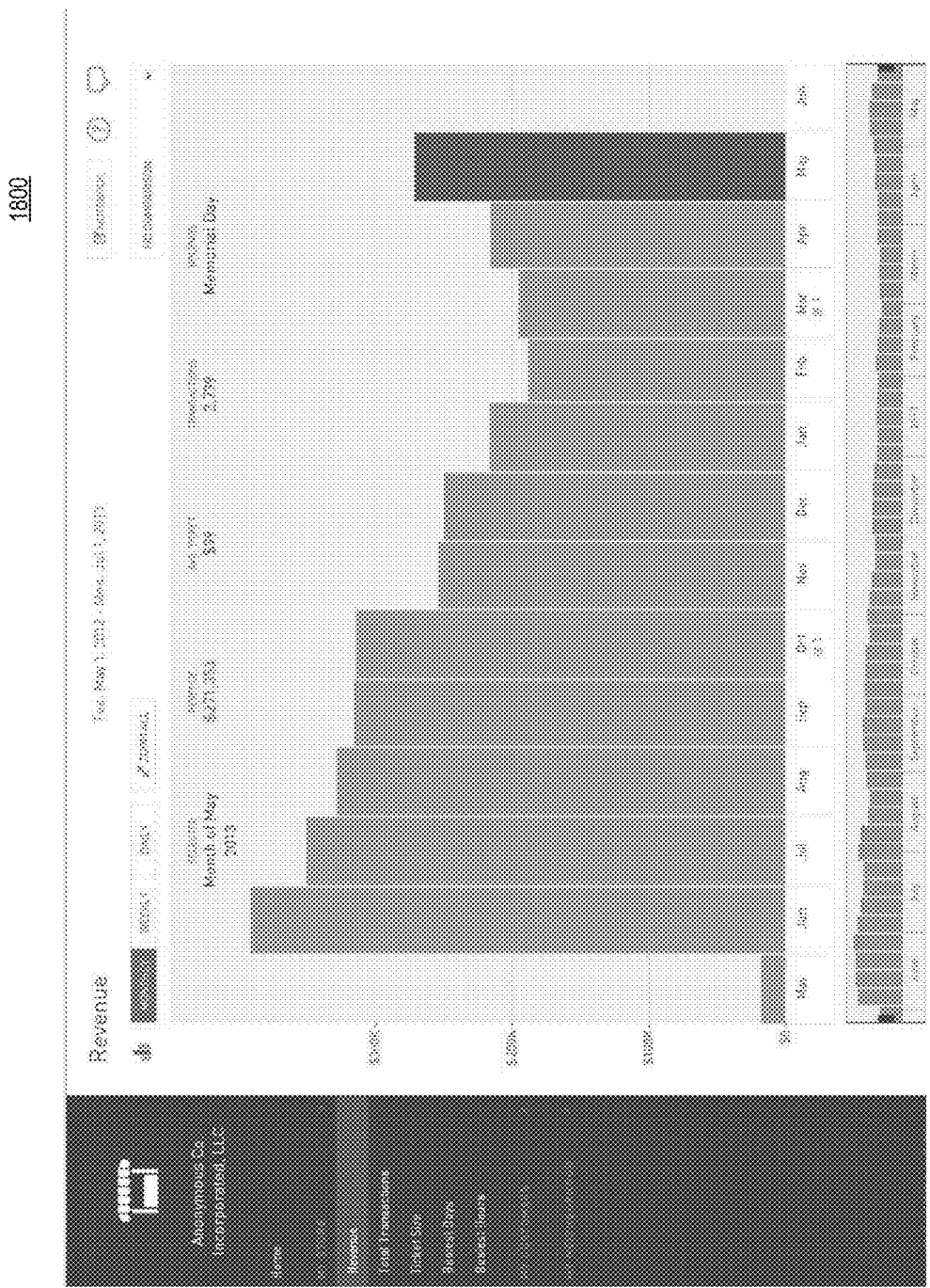

FIG. 18 shows a screenshot of an exemplary user interface 1800 that represents revenue depicted temporally, consistent with some embodiments. A provisioning entity analysis system (e.g., provisioning entity analysis system 210) can generate exemplary user interface 1800. User interface 1800, for example, can be accessed by an entity selecting "Revenue" in the sidebar (e.g., "Revenue" submenu of user interface 1700 of FIG. 17). User interface 1800 can represent revenue information in a chart, such as the bar chart shown in the top panel of FIG. 18. In some embodiments, each bar in the bar chart can represent revenues for a period of time (e.g., a day, week, month, quarter, or year). The granularity or time period for each bar based on the selection of the "Monthly," "Weekly," and "Daily" boxes in the top left portion of the bar chart.

In some embodiments, user interface 1800 allows an entity to select a particular bar or time period of interest. For example, the entity can select the "May" bar. To indicate that "May" has been selected, user interface 1800 can display that month in a different color. In some embodiments, user interface 1800 can also display additional information for the selected bar. For example, as shown in FIG. 18, user interface 1800 can display the month selected, the revenue for that month, the average ticket size, the number of transactions, and the names of holidays in that month, if any. In some embodiments, user interface 1800 can depict comparisons of revenue information. For example, user interface 1800 can display additional lines or bars (not shown), which represent revenue competitor revenue, industry revenue, or entity revenue from another time period. In some embodiments, user interface 1800 can include a bottom panel depicting a bar chart of revenue for a longer period of time, such as the past twelve months. User interface 1800 can highlight the region currently depicted in the top panel by changing the color of the corresponding bars in the bottom panel. In some embodiments, user interface 1800 can allow an entity to drag the highlighted region on the bottom panel to depict a different time period in the top panel.

User interface 1800 can also allow an entity to access additional user interfaces by selecting, for example, the "Total Transactions," "Ticket Size," "Busiest Days," or "Busiest Hours" submenus in the sidebar. In some embodiments, these user interfaces (not shown) can display information in the same manner as user interface 1800. For example, a user interface for "Total Transaction" can represent transaction information in a chart, such as a bar chart shown in the top panel of FIG. 18. In this user interface, the bars in the bar chart can represent the total number of transactions for a period time (e.g., one month). User interfaces accessed through the "Ticket Size," "Busiest Days," and "Busiest Hours" can display information similarly. In some embodiments, the bars in these user interfaces can represent a percentage for a period time (e.g., 15% of sales occur on Tuesday).

Figure 19:
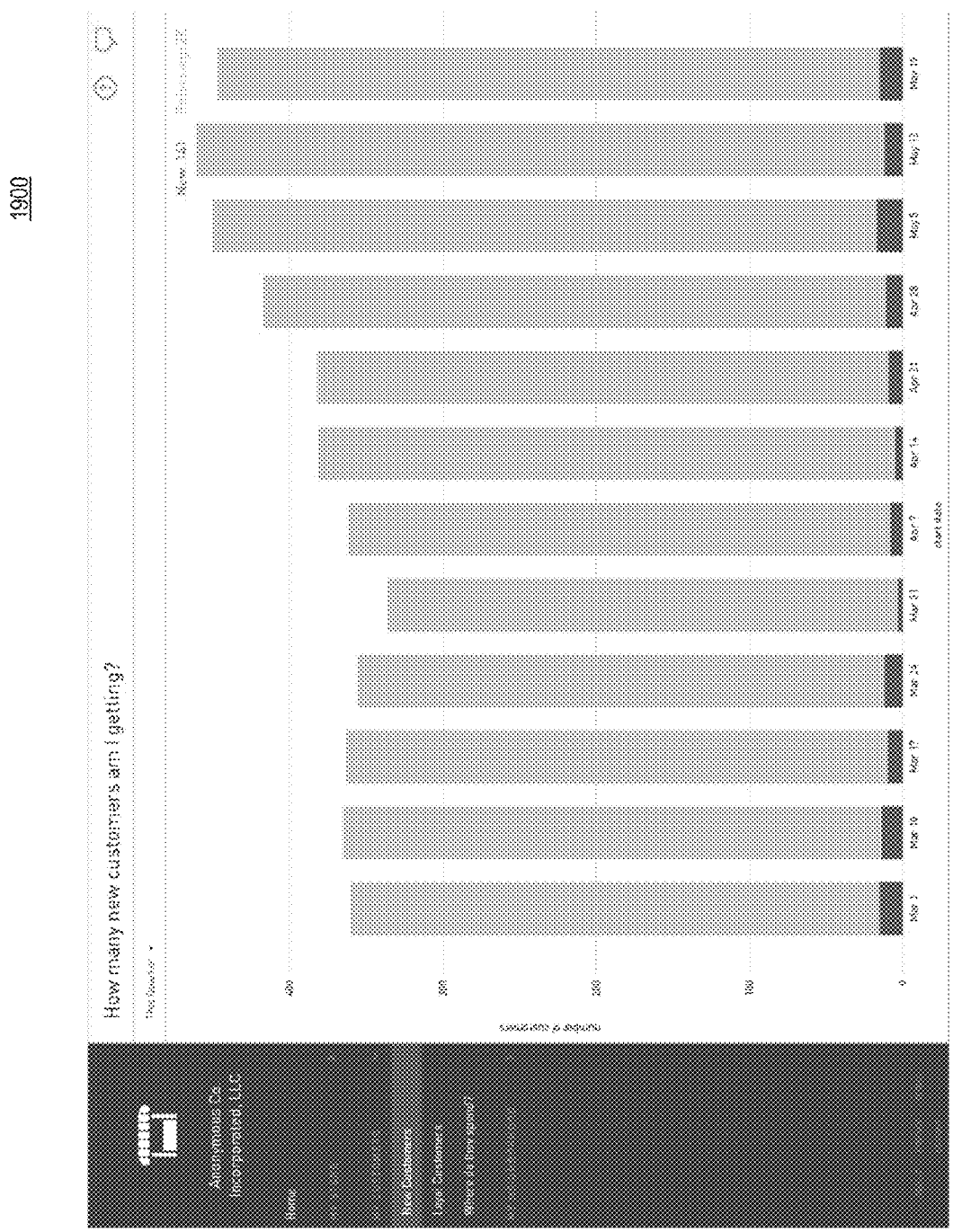

FIG. 19 depicts a screenshot of an exemplary user interface representing new customer acquisition numbers over a selected period, consistent with some embodiments. A provisioning entity analysis system (e.g., provisioning entity analysis system 210) can generate exemplary user interface 1900. In some embodiments, user interface 1900 is accessible by expanding "My Customers" in the sidebar and selecting the "New Customers" submenu. User interface 1900 can depict customer metrics for a selected period of time. For example, user interface 1900 can display customer metrics for a selected quarter. User interface 1900 can use, for example, a bar graph to represent the customer metrics wherein each bar represents the number of customers for a subset period of time, (e.g., a week) within the longer period of time (e.g., a quarter).

User interface 1900 can also depict new customers in one color and returning customers in a different color to distinguish between the different types of customers. As an example, in FIG. 19, returning customers are represented by the upper, lighter portions of the bar, whereas new customers are represented by the lower, darker portions. In some embodiments, user interface 1900 can depict the total number of new customers and returning customers for a selected time period, as shown in the top right portion of user interface 1900. User interface 1900 can also allow an entity to access additional user interfaces (such as user interface 2000 and user interface 2100 described below) by selecting, for example, the "Loyal Customers" or "Where do they spend?" submenus.

Figure 20:
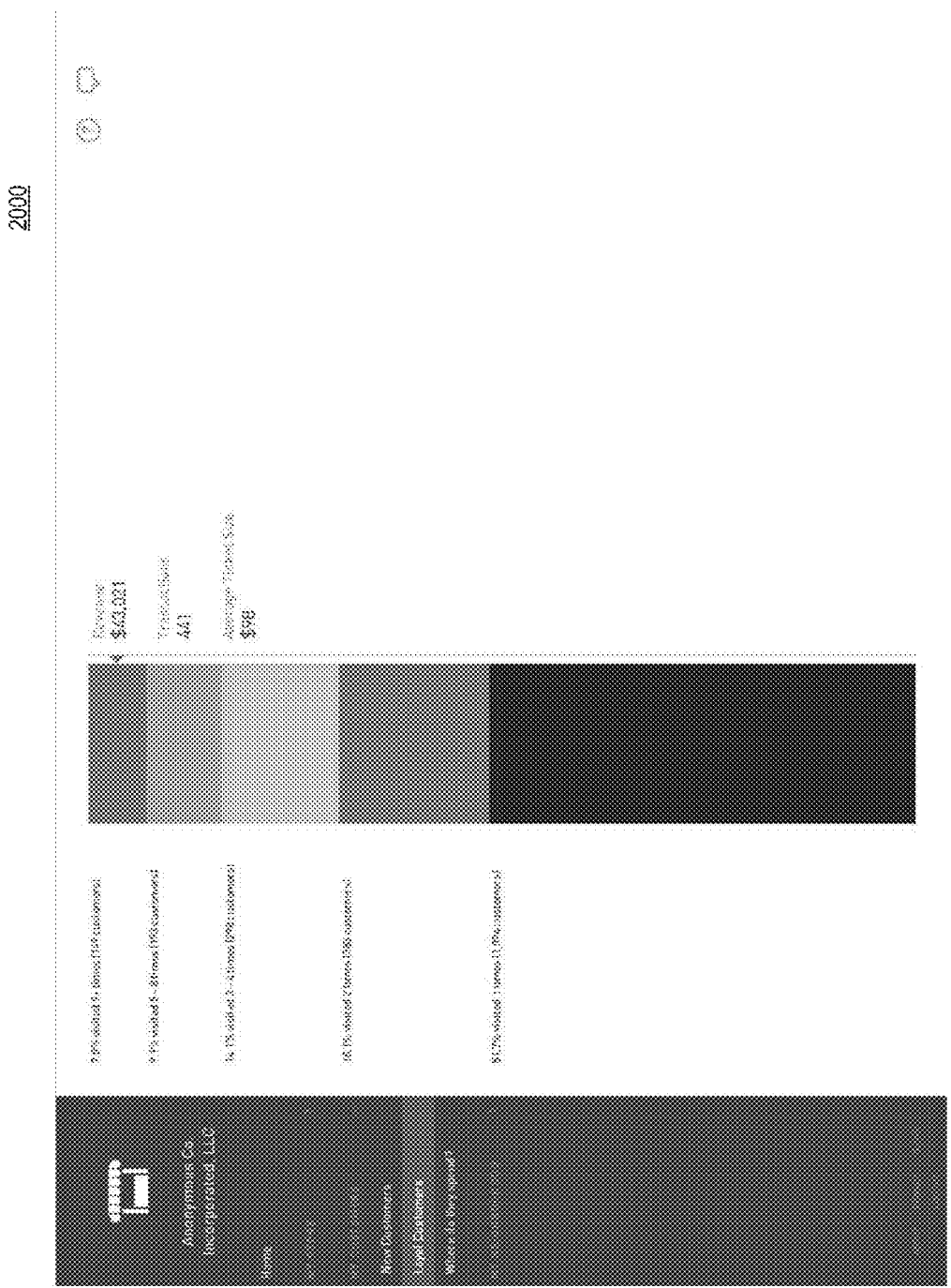

FIG. 20 depicts a screenshot of an exemplary user interface 2000 representing loyal customer information, consistent with some embodiments. A provisioning entity analysis system (e.g., provisioning entity analysis system 210) can generate exemplary user interface 2000 In some embodiments, user interface 2000 can be accessed based on the selection of the "Loyal Customers" submenu in the sidebar. User interface 2000 can depict performance metrics relating to revenue from returning customers. In some embodiments, user interface 2000 represents this information as a stacked bar graph. A section of the stacked graph can represent the number of customers who visited an entity a certain number of times. For example, the bottom section of the stacked bar chart depicted in FIG. 20 can represent the number of customers who visited once. In some embodiments, a section of the stacked graph can represent the number of customers whose visits fall within a range of times, (e.g., "3-4 times" or "9+ times"). User interface 2000 can depict each section as a percentage (e.g. 7.0% of customers), as a number (e.g. 149 customers), or as a combination thereof (e.g., 149 customers, 7.0%).

In some embodiments, user interface 2000 can depict additional information for a section selected by the entity. For example, the entity can select the "9+ times" section at the top of the stacked bar graph in FIG. 20 to display additional information about those customers. This information can include the total revenue from those customers, the total number of transactions with those customers, and the average ticket size of those customers.

Figure 21:
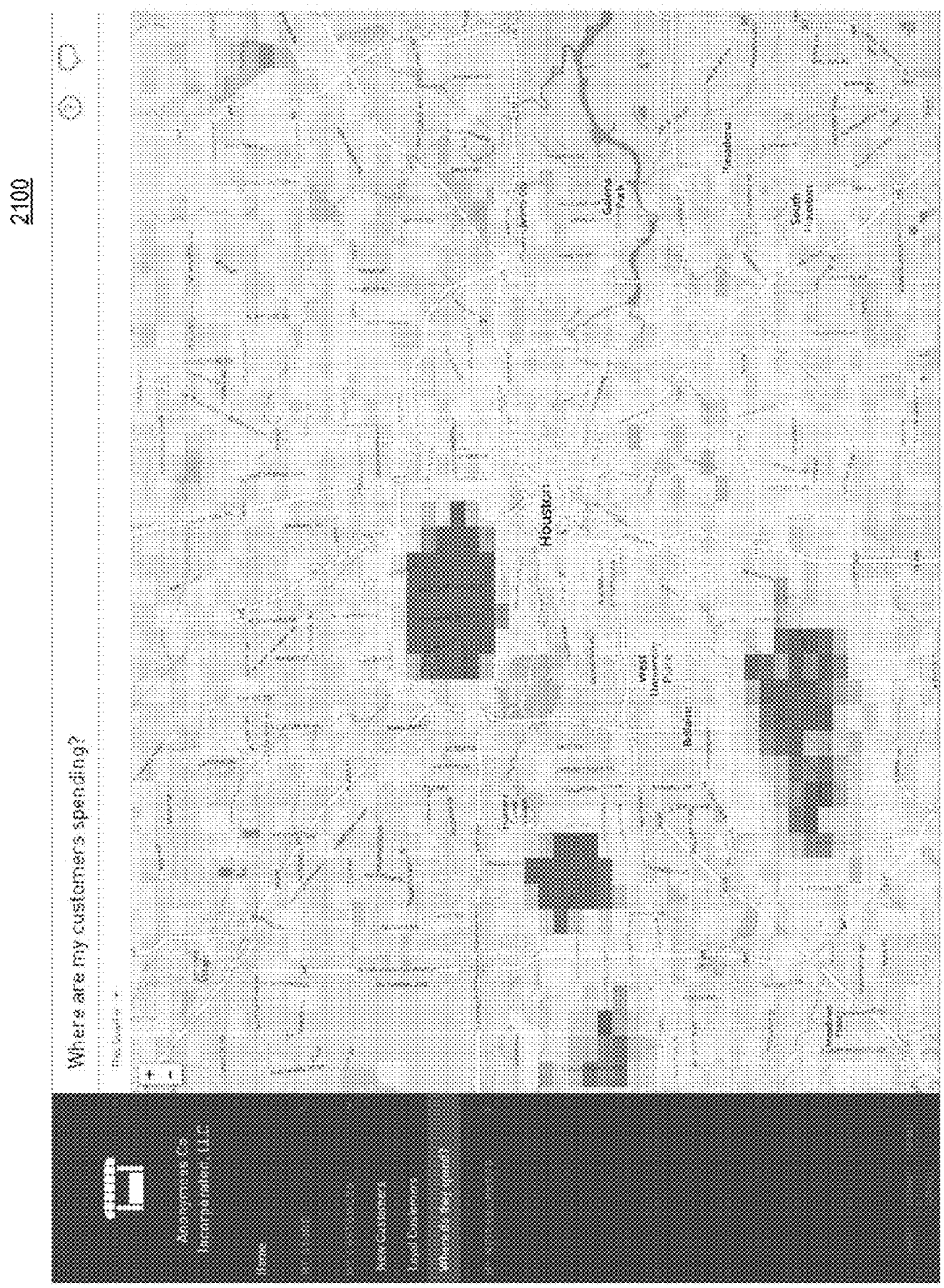

FIG. 21 depicts a screenshot of an exemplary user interface 2100 representing customer spending habits for specific geographic regions. A provisioning entity analysis system (e.g., provisioning entity analysis system 210) can generate exemplary user interface 2100. In some embodiments, user interface 2100 can be accessed based on the selection of the "Where do they spend" submenu in the sidebar. User interface 2100 can depict a geographic region. User interface 2100 can also depict locations where customers spend overlaid on the geographic region, e.g. a heat map. For example, the shaded regions overlaid on the geographic region in FIG. 21 can depict the regions where customers spend.

Different shades of gray-scale can be used to show different amounts of spending (e.g., darker shaded regions can depict regions where customers spend more). Alternatively, a color coded heat-map can be used where different colors can be used to show different amounts of spending. In some embodiments, the geographic granularity (e.g., district, city, county, metropolitan area, state) of user interface 2100 is selectable. User interface 2100 can also depict spending habits for the geographic region for different temporal periods. For example, user interface 2100 can depict customer spending for the current month, quarter, previous quarter, or any other time period.

Figure 22:
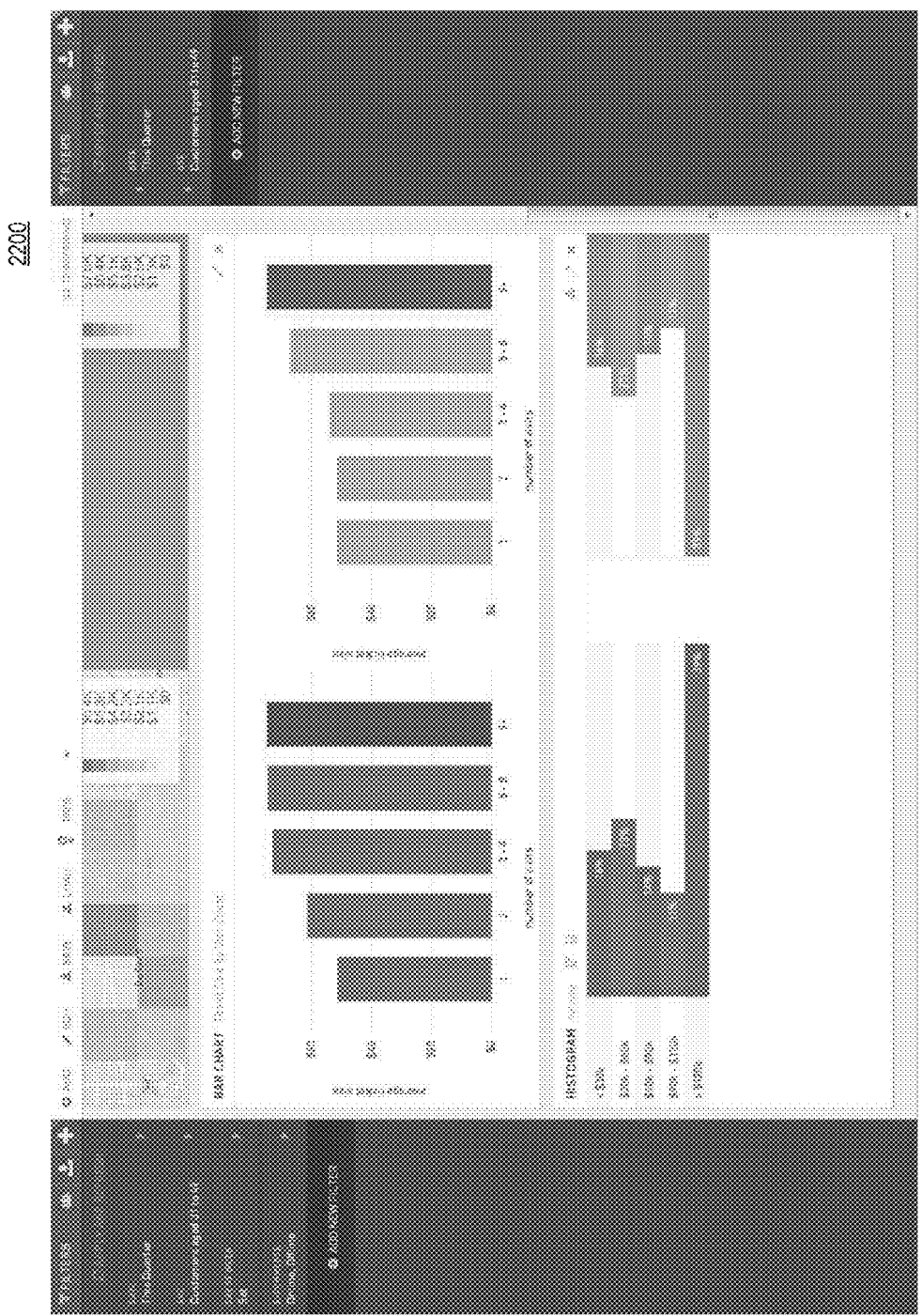

FIG. 22 depicts a screenshot of an exemplary user interface 2200 representing entity performance using one or more filter selections including demographics, geographic location, time period, and transactions. A provisioning entity analysis system (e.g., provisioning entity analysis system 210) can generate exemplary user interface 2200. In some embodiments, an entity can utilize user interface 2200 to compare how different variables (e.g., time, demographics, location, etc.) affect entity performance metrics (e.g., revenues, ticket size, etc.). In some embodiments, user interface 2200 can depict entity performance using a bar chart or histograms. For example, the bar charts in the middle of FIG. 22 depict the average ticket size based on the number of times a customer visits. The bar chart on the left side of FIG. 22 depicts this information for the current quarter, for customers aged 31 to 49, for sales on Saturday, whereas the bar chart on the right depicts the same information for the current quarter, for customers, aged 31 to 49, for every day of the week. User interface 220 allows an entity to use these bar charts to determine the effect the day of the week has on the number of tickets and the average ticket size.

In some embodiments, user interface 2200 can depict additional customer information, such as income, as a histogram. As shown in FIG. 22, the histogram can represent customer demographics for the selected filters. In some embodiments, user interface 220 can depict a delta (not shown in FIG. 22) representing a difference between similar categories in each histogram. The depiction of the delta can be in the area between the left and right histograms such as shown in U.S. application Ser. No. 14/289,596 at FIG. 17, the depiction of which is incorporated by reference. For example, if 16% of the entity's customers had an income less than $30,000 for the first filter selections, and only 11% had an income less than $30,000 for the second filter selections, user interface 2200 can display a 5% delta to the left, representing the difference between the filter selections.

Figure 23:
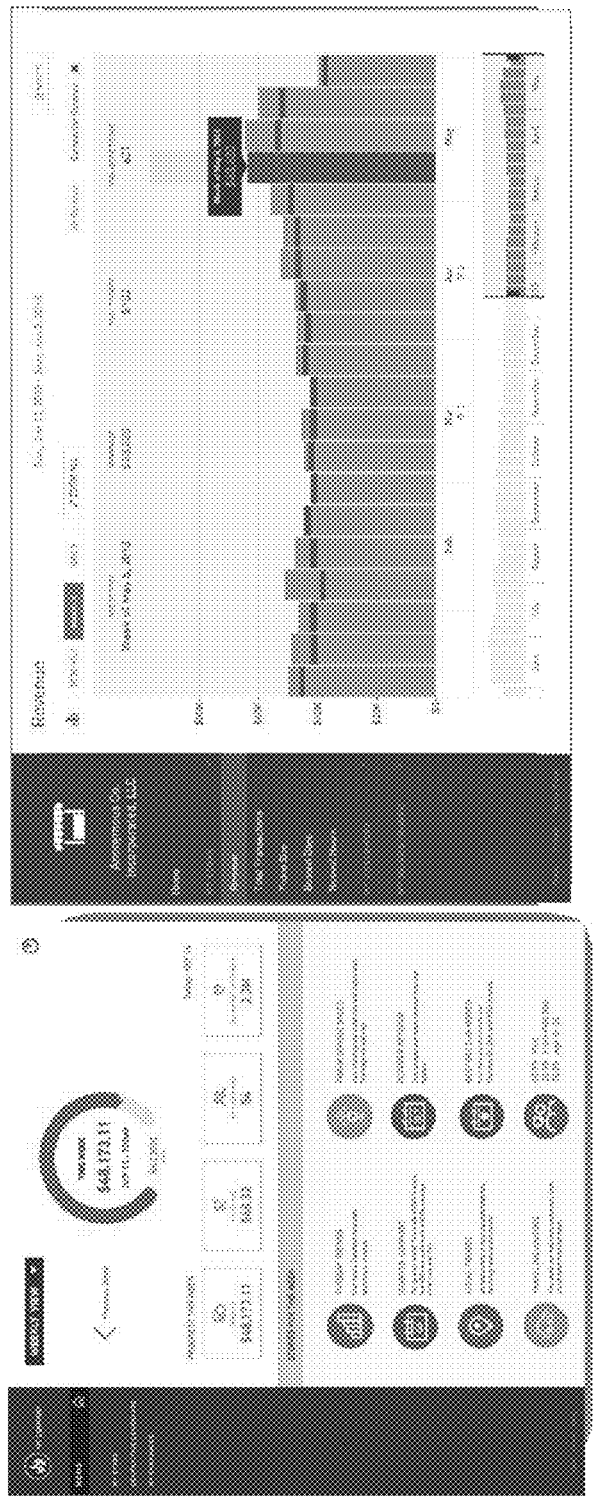

FIG. 23 depicts a screenshot of an two exemplary user interfaces. A provisioning entity analysis system (e.g., provisioning entity analysis system 210) can generate these exemplary user interfaces. The left panel of FIG. 23 shows a user interface that can depict business insights for the entity (e.g., what customers buy, where they buy, when they buy, how often they buy, where they live, how much they make, etc.). For example, user interface 2300 can depict insights such as temporal trends, temporal summaries, geographical trends, whether customers are on vacation, and customer demographics. An entity can use these insights to predict future spending, to target specific customers, to determine when to have sales, to determine when to order additional inventory, etc. The right panel of FIG. 23 shows a user interface that can depict an exemplary temporal graph of revenues. This bar chart is similar to the bar chart described above with respect to FIG. 18. In some embodiments, the user interface in the right panel can allow an entity to compare its revenues to other entities. For example, the lines on each bar in the right panel of FIG. 23 represent competitor revenue for the selected time period. In some embodiments, these lines can represent industry revenue or entity revenue from another time period. In some embodiments, the user interface shown in the right panel of FIG. 23 can include a bottom panel depicting a bar chart of revenue for a longer period of time, such as the past twelve months. The user interface can highlight the region currently depicted in the top panel by changing the color of the corresponding bars in the bottom panel. In some embodiments, the user interface allows an entity to drag the highlighted region on the bottom panel to depict a different time period in the top panel.

Figure 24:
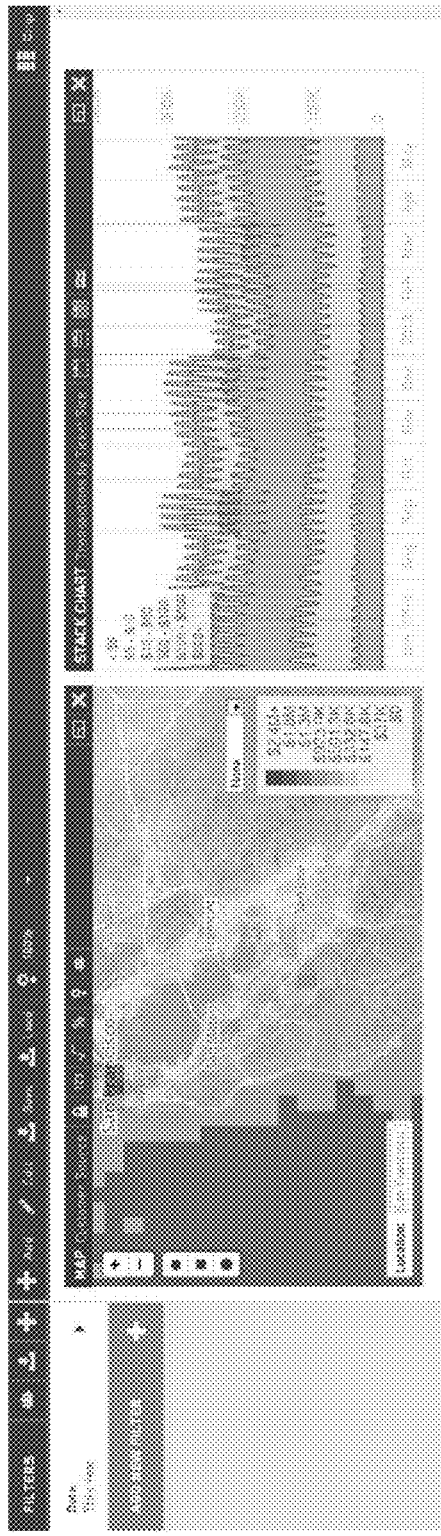

FIG. 24 depicts a screenshot of an exemplary user interface 2400 including a heat-map representation (e.g., the left panel) and graph-based representation (e.g., the right panel) of entity performance. A provisioning entity analysis system (e.g., provisioning entity analysis system 210) can generate exemplary user interface 2400. In some embodiments, the entity can select one or more filters (e.g. "Add New Filter" shown in the sidebar) to display a timeline of customer. For example, user interface 2400 can represent customer spending on a daily basis. In some embodiments, user interface 2400 can represent customer spending with a heat map, such as the heat map shown in the left panel of FIG. 24. The heat map can be used to accurately predict the geographic locations of future customer spending. In some embodiments, customer spending can be represented as a graph-based representation where the independent axis (e.g., x-axis) can represent a period of time and the dependent axis can represent customer spending, as depicted in the right panel of FIG. 24. In some embodiments, the graph-based representation can be used as a predictive chart to predict future customer spending.

Figure 25:
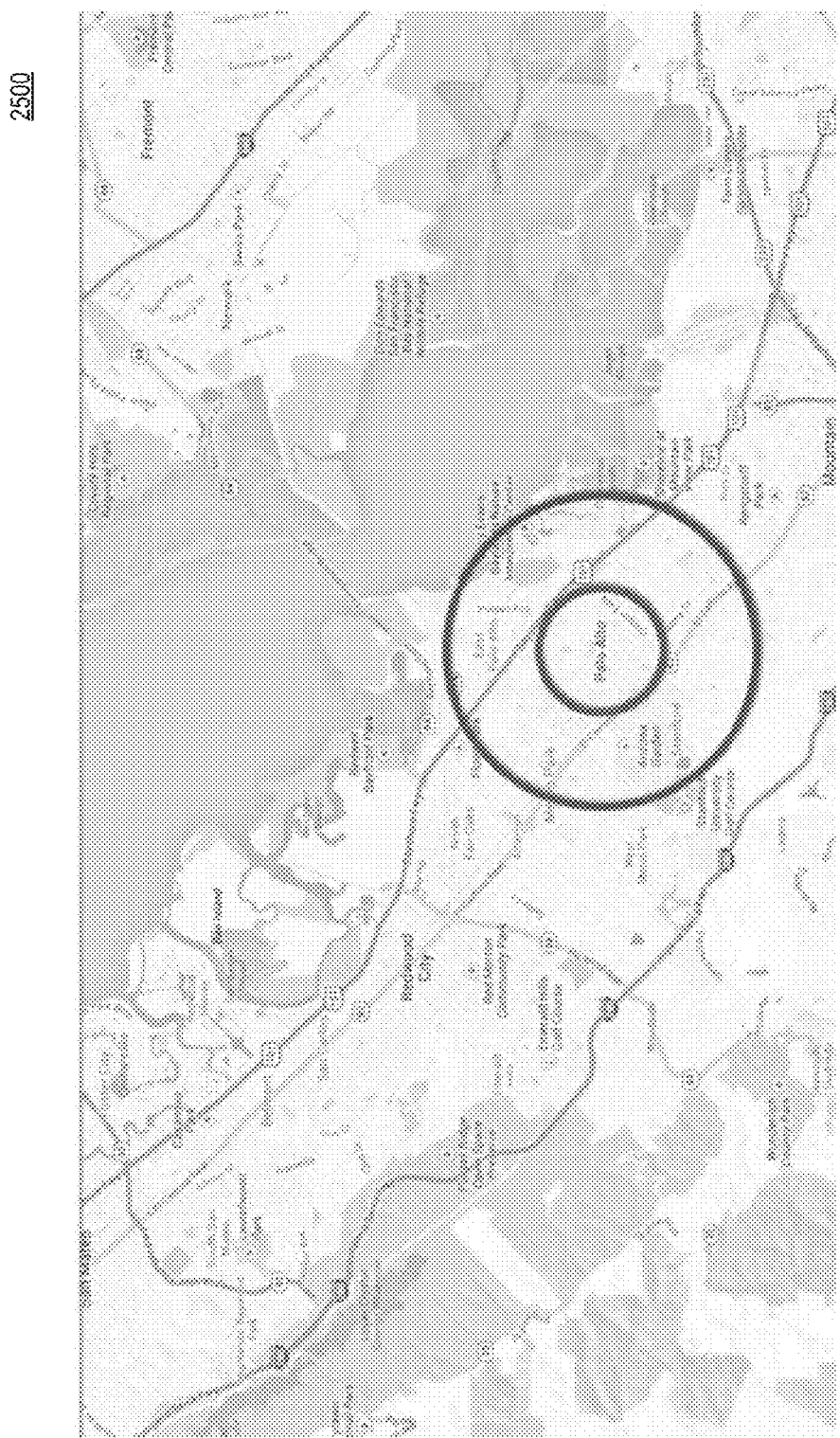

FIG. 25 depicts a screenshot of an exemplary user interface 2500 representing inferred customer location. A provisioning entity analysis system (e.g., provisioning entity analysis system 210) can generate exemplary user interface 2500. In some embodiments, user interface 2500 can represent customer location inferred from persistent information (e.g., the centroid of the customer's medical transactions or the median of the customer's retail food and pharmacy stores transactions). In some embodiments, user interface 2500 can represent customer location inferred from contextual information (e.g. localized small-ticket spending in severe weather or spending after an inferred move). In some embodiments, user interface 2500 can represent temporal customer location (e.g., permanent, temporary, seasonal, etc.).

In some embodiments, customer location can be represented by a circle of a particular distance, wherein the provisioning entity analysis system infers that the customer is located within that circle. For example, in FIG. 25, the inner circle represents a two mile range and the outer circle represents a five mile range. In some embodiments, user interface 2500 can depict a confidence metric corresponding to the accuracy of inferred customer location (e.g., 75-80% confident that the customer is within the inner circle and 90-95% confident that the customer is located in the outer circle).

Figure 26:
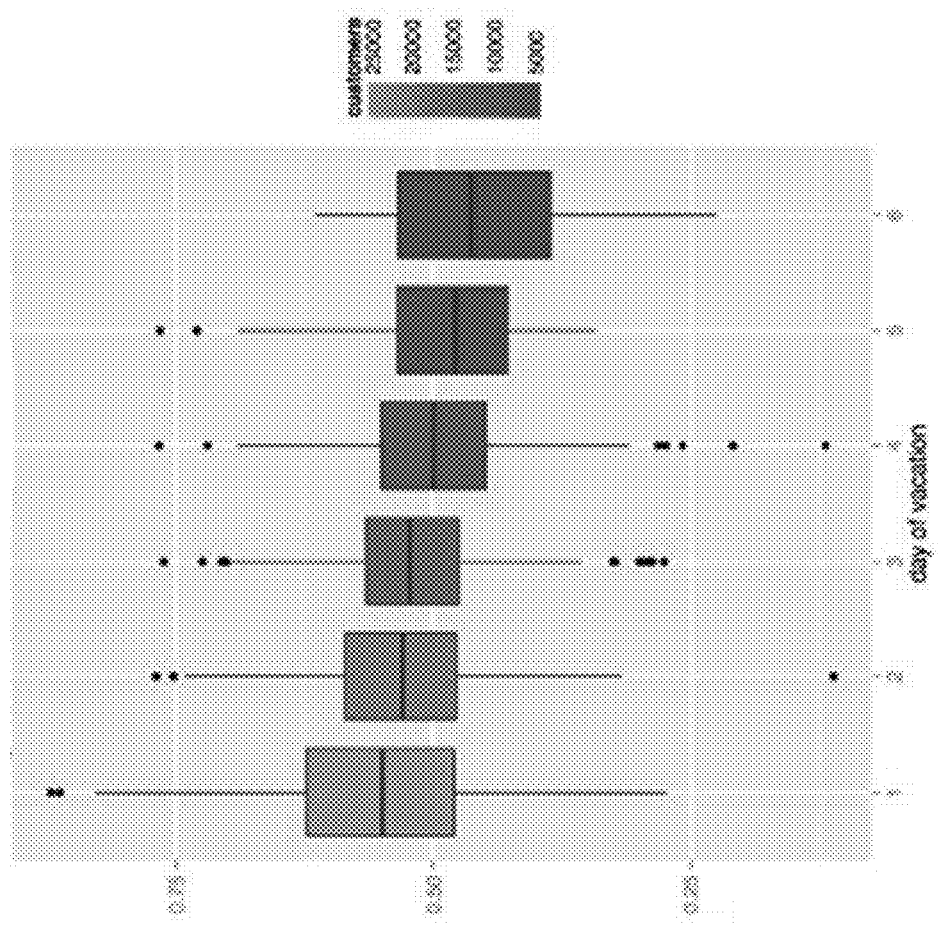

FIG. 26 depicts a screenshot of an exemplary user interface 2600 representing predictive travel and vacation spending. Entities, such as resorts and travel destinations, can use this information to predict vacation patterns, enabling them to develop targeted marketing and to inform future restaurant and service selection. A provisioning entity analysis system (e.g., provisioning entity analysis system 210) can generate exemplary user interface 2600. The provisioning entity analysis system can use the inferred customer locations described above to determine whether certain transactions qualify as travel or vacation spending. In some embodiments, user interface 2600 can depict travel or vacation spending as a chart. For example, as shown in FIG. 26, user interface 2600 can represent this information as a scatter chart with confidence intervals. The independent axis (e.g., x-axis) of the chart can represent the day of vacation. The dependent axis can represent the average range of percentage of travel spending that is spent on restaurants.

In the foregoing specification, embodiments have been described with reference to numerous specific details that can vary from implementation to implementation. Certain adaptations and modifications of the embodiments described herein can be made. Therefore, the above embodiments are considered to be illustrative and not restrictive.

What is claimed is:

1. A system for analyzing entity performance, the system comprising:
   a memory that stores a set of instructions;
   one or more processors configured to execute the set of instructions that cause the one or more processors to:
   receive a request from a user computer via a network with one or more filter selections;
   access a data structure in the memory, the data structure comprising a plurality of categories of information showing interactions related to multiple entities;
   identify a set of categories of the plurality of categories within the data structure based on the one or more filter selections, the set of categories within the data structure includes location information related to at least one of the multiple entities, wherein the plurality of the categories of the data structure include at least one of: an interaction number category, a consuming entity identification category, a consuming entity location category, a provisioning entity identification category, a provisioning entity location category, a type of provisioning entity category, an interaction amount category, and a time of interaction category;
   determine the location information of the at least one of the multiple entities to update the data structure, wherein the location information is determined based on a computed affinity score that is based on computed travel times so that the affinity score can have an inverse proportionality with computed travel times such that a higher affinity score can have a lower travel time, wherein the computed affinity score is used to estimate the location information within an estimated area location for the provisioning entity without an identified location information, wherein the determining includes verifying that a populated category of the plurality of categories is valid data that signifies the location information;
   update the data structure with the determined location information within the area location;
   process the location information of the identified set of categories to analyze a performance of one or more entities of the multiple entities in accordance with the one or more filter selections; and
   provide the processed location information to display the performance of the one or more entities on a graphical user interface of the user computer.

2. The system of claim 1, wherein at least one of the computed travel times includes a computed travel time between two provisioning entities.

3. The system of claim 1, wherein the user interface includes one or more of:
   a representation of a geographic region;
   a representation of one or more locations of the one or more entities overlaid on the geographic region; and
   a representation of sub-geographic regions overlaid on the geographic region.

4. The system of claim 1, wherein the one or more filter selections are mapped to one or more of the plurality of categories of the data structure.

5. The system of claim 1, wherein the set of instructions further cause the one or more processors to analyze performance of a first entity or a first group of entities of the one or more entities, and a second entity or a second group of entities of the one or more entities.

6. A method for analyzing entity performance, the method comprising:
   receiving, from a user computer via a network, a request with one or more filter selections;
   accessing, by a server computer, a data structure in a memory, the data structure comprising a plurality of categories of information showing interactions related to multiple entities;
   identifying, by the server computer, a set of categories of the plurality of categories within the data structure based on the one or more filter selections, wherein the set of categories within the data structure includes location information related to at least one of the multiple entities, wherein the plurality of categories of the data structure include at least one of: an interaction number category, a consuming entity identification category, a consuming entity location category, a provisioning entity identification category, a provisioning entity location category, a type of provisioning entity category, an interaction amount category, and a time of interaction category;
   determining, by the server computer, the location information of the at least one of the multiple entities to update the data structure, wherein the location information is determined based on a computed affinity score that is based on computed travel times so that the affinity score can have an inverse proportionality with computed travel times such that a higher affinity score can have a lower travel time, wherein the computed affinity score is used to estimate the location information within an estimated area location for the provisioning entity without an identified location information, wherein the determining includes verifying that a populated category of the plurality of categories is valid data that signifies the location information;

updating, by the server computer, the data structure with the determined location information within the area location;

processing, by the server computer, the location information of the identified set of the plurality of categories to analyze a performance of one or more entities of the multiple entities in accordance with the one or more filter selections; and providing the processed location information to display the performance of the one or more entities on a graphical user interface of the user computer.

7. The method of claim 6, wherein at least one of the computed travel times includes a computed travel time between two provisioning entities.

8. The method of claim 6, wherein the user interface includes one or more of:
a representation of a geographic region;
a representation of one or more locations of the one or more entities overlaid on the geographic region; and
a representation of sub-geographic regions overlaid on the geographic region.

9. The method of claim 6, wherein the one or more filter selections are mapped to one or more of the plurality of categories of the data structure.

10. The method of claim 6, wherein the one or more filter selections are associated with a particular user interface of a plurality of user interfaces, the particular user interface displays a representation associated with the one or more filter selections overlaid on a geographic region.

11. The method of claim 6, further comprising analyzing performance of a first entity or a first group of entities of the one or more entities, and a second entity or a second group of entities of the one or more entities.

12. A non-transitory computer-readable medium storing a set of instructions that are executable by one or more processors of one or more servers to cause the one or more servers to perform a method for analyzing entity performance, the method comprising:

receiving, from a user computer via a network, a request with one or more filter selections;

accessing, by a server computer, a data structure in a memory, the data structure comprising a plurality of categories of information showing interactions related to multiple entities;

identifying, by the server computer, a set of categories of the plurality of categories within the data structure based on the one or more filter selections, wherein the set of categories within the data structure includes location information related to at least one of the multiple entities, wherein the plurality of categories of the data structure include at least one of: an interaction number category, a consuming entity identification category, a consuming entity location category, a provisioning entity identification category, a provisioning entity location category, a type of provisioning entity category, an interaction amount category, and a time of interaction category;

determining, by the server computer, the location information of the at least one of the multiple entities to update the data structure, wherein the location information is determined based on a computed affinity score that is based on computed travel times so that the affinity score can have an inverse proportionality with computed travel times such that a higher affinity score can have a lower travel time, wherein the computed affinity score is used to estimate the location information within an estimated area location for the provisioning entity without an identified location information, wherein the determining includes verifying that a populated category of the plurality of categories is valid data that signifies the location information;

updating, by the server computer, the data structure with the determined location information within the area location;

processing, by the server computer, the location information of the identified set of the plurality of categories to analyze a performance of one or more entities of the multiple entities in accordance with the one or more filter selections; and providing the processed location information to display the performance of the one or more entities on a graphical user interface of the user computer.

13. The non-transitory computer-readable medium of claim 12, wherein at least one of the computed travel times includes a computed travel time between two provisioning entities.

14. The non-transitory computer-readable medium of claim 12, wherein the user interface includes one or more of:
a representation of a geographic region;
a representation of one or more locations of the one or more entities overlaid on the geographic region; and
a representation of sub-geographic regions overlaid on the geographic region.

15. The non-transitory computer-readable medium of claim 12, wherein the one or more filter selections are mapped to one or more of the plurality of categories of the data structure.

16. The non-transitory computer-readable medium of claim 12, wherein the one or more filter selections are associated with a particular user interface of a plurality of user interfaces, the particular user interface displays a representation associated with the one or more filter selections overlaid on a geographic region.

17. The non-transitory computer-readable medium of claim 12, wherein the instructions further cause the one or more servers to analyze performance of a first entity or a first group of entities of the one or more entities, and a second entity or a second group of entities of the one or more entities.

* * * * *